(12) United States Patent
Deolalikar et al.

(10) Patent No.: US 9,165,258 B2
(45) Date of Patent: Oct. 20, 2015

(54) GENERATING TRAINING DOCUMENTS

(71) Applicant: HEWLETT-PACKARD DEVELOPMENT COMPANY, L.P., Houston, TX (US)

(72) Inventors: Vinay Deolalikar, Cupertino, CA (US); Hernan Laffitte, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 13/709,773

(22) Filed: Dec. 10, 2012

(65) Prior Publication Data

US 2014/0164297 A1 Jun. 12, 2014

(51) Int. Cl.
*G06N 99/00* (2010.01)
*G06K 9/46* (2006.01)
*G06K 9/00* (2006.01)

(52) U.S. Cl.
CPC .......... *G06N 99/005* (2013.01); *G06K 9/00442* (2013.01); *G06K 9/00463* (2013.01); *G06K 9/4676* (2013.01)

(58) Field of Classification Search
USPC ......................................... 706/12, 16, 20, 25
See application file for complete search history.

(56) References Cited

U.S. PATENT DOCUMENTS

| | | | |
|---|---|---|---|
| 6,182,058 | B1 | 1/2001 | Kohavi |
| 7,028,250 | B2 | 4/2006 | Ukrainczyk et al. |
| 2012/0197627 | A1 | 8/2012 | Shi et al. |

FOREIGN PATENT DOCUMENTS

WO WO-2006091306 8/2006

OTHER PUBLICATIONS

Yao et al., Nonparametric Bayesian Word Sense Induction [online], Jun. 2011 [retrieved on Sep. 8, 2014]. Retrieved from the Internet:<URL:http://www.cs.jhu.edu/~vandurme/papers/YaoVanDurmeACL2011.pdf>.*

Minka et al., Expectation-Propagation for the Generative Aspect Model [online], 2002 [retrieved on Dec. 16, 2014]. Retrieved from the Internet:<URL:http://www.google.com/url?sa=t&rct=j&q=&esrc=s&frm=1&source=web&cd=3&cad=rja&uact=8&ved=0CC4QFjAC&url=http%3A%2F%2Fresearch.microsoft.com%2Fen-us%2Fum%2Fpeople%2Fminka%2Fpapers%2Faspect>.*

(Continued)

*Primary Examiner* — Jeffrey A Gaffin
*Assistant Examiner* — Nathan Brown, Jr.
(74) *Attorney, Agent, or Firm* — Trop, Pruner & Hu, P.C.

(57) ABSTRACT

A method of generating training documents for training a classifying device comprises, with a processor, sampling from a distribution of words in a number of original documents, and creating a number of pseudo-documents from the distribution of words, the pseudo-documents comprising a similar distribution of words as the original documents. A device for classifying textual documents comprises a processor; and a memory communicatively coupled to the processor, the memory comprising a sampling module to, when executed by the processor, determine the distribution of words in a number of original documents, a pseudo-document creation module to, when executed by the processor, create a number of pseudo-documents from the distribution of words, the pseudo-documents comprising a similar distribution of words as the original documents, and a training module to, when executed by the processor, train the device to classify textual documents based on the pseudo-documents.

15 Claims, 49 Drawing Sheets

(56) References Cited

OTHER PUBLICATIONS

Ganiz, M.C. et al.; Jul. 2011; "Higher Order Naive Bayes a Novel Non-IID Approach to Text Classification".
Halloran, J.; Dec. 21, 2009; "Classification: Naive Bayes vs. Logistic Regression".
Breiman, L. Bagging predictors. Machine Learning 24,2 (1996), 123-140.
Chawla, N. V. et al., Smote: Synthetic minority over-sampling technique. J. Artif. Intell. Res. (JAIR) 16 (2002), 321-357.
Craven, M. et al., Learning to extract symbolic knowledge from the world wide web, Sep. 1998 (51 pages).
Domingos, P. et al., On the optimality of the simple bayesian classifier under zero-one loss, 1997 (30 pages).
Forman, G. et al., Learning from little: Comparison of classifiers given little training, 2004 (14 pages).
Friedman, J. H. On bias, variance, 0/1—loss, and the curse-of-dimensionality. Data Min. Knowl. Discov. 1 (Jan. 1997), 55-77.
Joachims, T.. Text categorization with support vector machines: learning with many relevant features, 1998 (7 pages).
Kim, S.-B. et al., Effective methods for improving naive bayes text classifiers, 2002 (10 pages).
Lewis, D. D. Naive (bayes) at forty: The independence assumption in information retrieval. In Proceedings of the 10th European Conference on Machine Learning (London, UK, 1998), Springer-Verlag, pp. 4-15.
McCallum, A. et al., A comparison of event models for naive bayes text classification. In AAAI-98 workshop on learning for text categorization (1998), AAAI Press, pp. 41-48.
Metsis, V. et al., Spam filtering with naive baye—which naive bayes? In CEAS (2006), vol. 387 (9 pages).
Nigam, K. et al., Text classification from labeled and unlabeled documents using em, Machine Learning 39, 2/3 (2000) (34 pages).
Peng, F. et al., Augmenting naive bayes classifiers with statistical language models. Inf. Retr. 7,2003 (39 pages).
Raina, R. et al., Constructing informative priors using transfer learning, In Proceedings of the 23rd international conference on Machine learning (Pittsburgh, Pennsylvania, 2006), ACM (8 pages).
Rennie, J. D. M. et al., Tackling the poor assumptions of naive bayes text classifiers, In in Proceedings of the Twentieth International Conference on Machine Learning (2003) (8 pages).
Rennie, J. D. M. Improving multi-class text classification with naive bayes. Master's thesis, Massachusetts Institute of Technology, 2001 (50 pages).
Schneider, K.-M. Techniques for improving the performance of naive bayes for text classification. Computational Linguistics and Intelligent Text Processing 3406/2005, i (2005), 682-693.
Sebastiani, F. Machine learning in automated text categorization. ACM Comput. Surv. 34 (Mar. 2002), 1-47.
Yang, Y. et al., A re-examination of text categorization methods. In Proceedings of the 22nd International Conference on Research and Development in Information Retrieval (1999) (8 pages).
Zhang, T. et al., Text categorization based on regularized linear classification methods. Inf. Retr. 4,1 (2001), 5-31.
Zhu, X, Semi-supervised learning, published in Encyclopedia of Machine Learning, 2009 (10 pages).

\* cited by examiner

GENERATING TRAINING DOCUMENTS

BACKGROUND

The amount of documents containing text has exponentially grown since the advent of computer networking. Individuals and business entities are disseminating more and more information in the form of textual documents via networks such as the Internet. These textual documents may be associated with a myriad of individual and corporate activities including, for example, the sale of goods and services, the reporting of news, and, in general, the sharing of ideas.

Classification of these textual documents by topic, for example, may assist in the archiving, retrieval, and dissemination of the textual documents. In this manner, an interested individual may obtain a copy of a number of textual documents associated with a particular topic. However, classification of textual documents by, for example, their topic is extremely time consuming and cost-ineffective for an individual or business entity even with the assistance of a computing device. In order to classify a textual document, typically an individual reads or reviews the textual document and stores that document in a manner that indicates that the textual document belongs to a particular topic, or a computing system searches for key words within the document to sort that document by topic.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
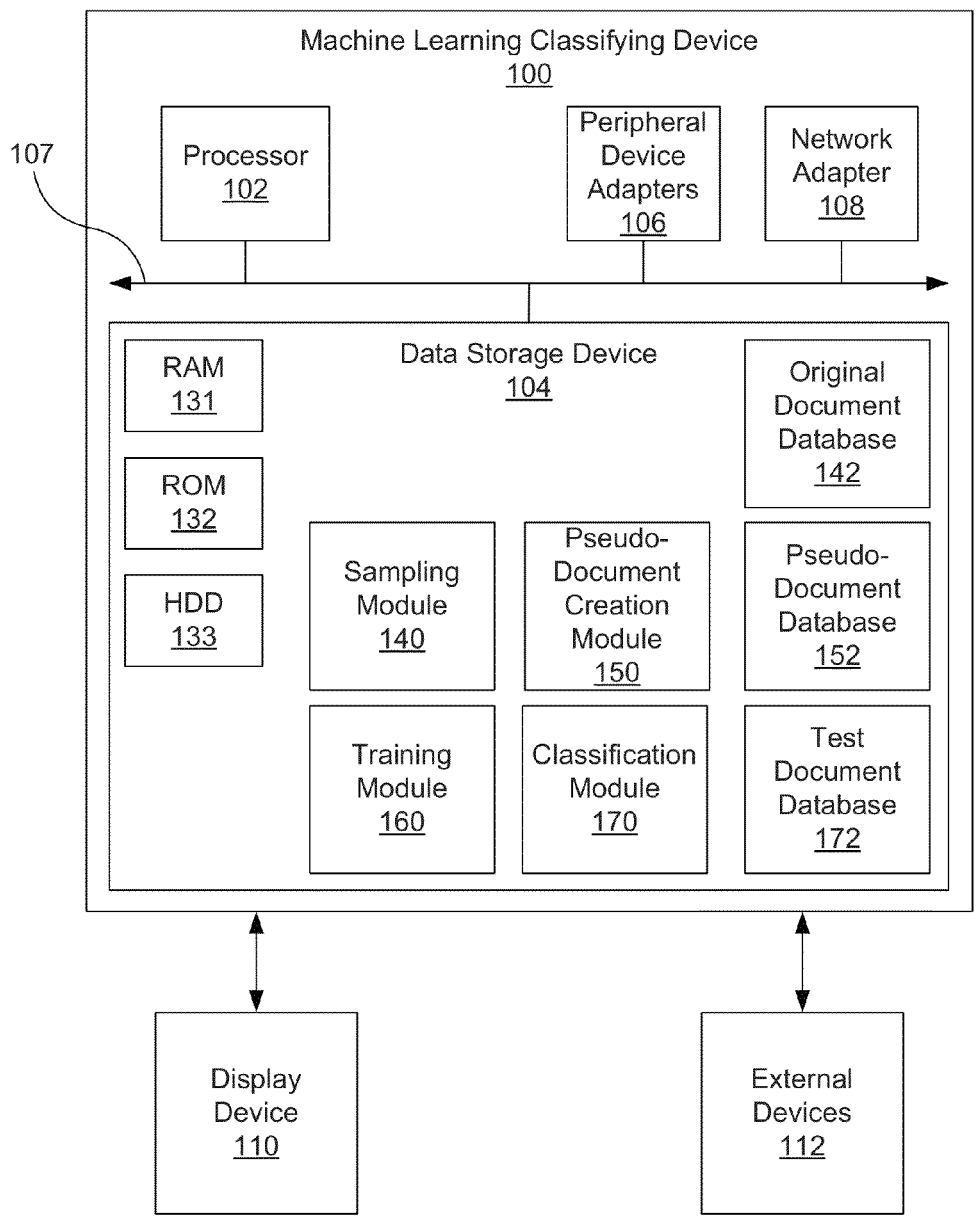
FIG. 1 is a block diagram of a machine learning classifying device for classifying textual documents, according to one example of the principles described herein.

The present systems and methods provide for the classification of textual documents. In some situations, a relatively limited number of test documents are available to a computing system to train the computing system to classify the textual documents. Without a sufficient number of training documents, the classification system may not be able to correctly classify documents as being relevant to, for example, a specific topic.

The present classification system samples a distribution of words within a number of original documents. The distribution of words is used to create pseudo-documents. The pseudo-documents comprise the same or similar distribution of words as a number of the original documents. These pseudo-documents are then used as test documents to train the computing system to classify textual documents.

More specifically, the present systems and methods provide for generation of training documents for training a classifying device. The method may comprise, with a processor, sampling from a distribution of words in a number of original documents, and creating a number of pseudo-documents from the distribution of words, the pseudo-documents comprising a similar distribution of words as the original documents. A device for classifying textual documents may comprise a processor, and a memory communicatively coupled to the processor. The memory may comprise a sampling module to, when executed by the processor, determine the distribution of words in a number of original documents, a pseudo-document creation module to, when executed by the processor, create a number of pseudo-documents from the distribution of words, the pseudo-documents comprising a similar distribution of words as the original documents, and a training module to, when executed by the processor, train the device to classify textual documents based on the pseudo-documents.

Further, a computer program product for classifying documents is also disclosed. The computer program product may comprise a computer readable storage medium comprising computer usable program code embodied therewith. The computer usable program code may comprise computer usable program code to, when executed by a processor, determine the distribution of words in a number of original documents, computer usable program code to, when executed by a processor, create a number of pseudo-documents from the distribution of words, computer usable program code to, when executed by a processor, train a classifying device to classify textual documents based on the pseudo-documents, and computer usable program code to, when executed by a processor, classify a number of test documents.

Naïve Bayes text classifiers may be used in classification of textual documents because of their simplicity, ease of implementation, ease of model interpretation, speed, and range of applications on which they yield surprisingly good results. Some research on textual document classification focuses on learning when adequate training samples are given, and naïve Bayes is no exception. Often, enterprise applications of textual document classification suffer from scarce training data with less than, for example, 100 samples per class or category, with very few instances of training data (e.g., less then 20) being common.

There has been limited work on improving naïve Bayes in situations where scarce training data is available, except when using the general technique of semi-supervised learning. Semi-supervised learning assumes an abundance of unlabelled data and makes some assumptions on the underlying generative model. In general, neither the naïve Bayes approach nor semi-supervised learning hold for enterprise applications.

The present disclosure introduces Bootstrap Intra-Document Sampling (BIDS). BIDS is an approach to dealing with the scarcity of training data for Bayesian classification. BIDS is based on statistical principles, is conceptually simple, easy to implement, fast in performance, and requires no additional resources including unlabelled data. Furthermore, BIDS makes no assumptions on the model.

BIDS is based on the observation that the Bootstrap distribution is itself a multinomial distribution, and therefore matches the multinomial event model for text that underlies naïve Bayes. Exploiting this correspondence, BIDS treats each document as a probabilistic entity: an instantiation of an underlying distribution on words. BIDS then draws bootstrap samples of this underlying distribution by re-sampling from the document to create a number of pseudo-documents. The original set of training documents, together with their corresponding pseudo-documents, may be both used to train the naïve Bayes classifier.

Extensive empirical studies included herein show that BIDS consistently improves the accuracy of naïve Bayes. This is true especially when training data is very scarce. Naïve Bayes utilizing the present BIDS systems and methods beats support vector machines (SVM) in accuracy on a majority of standard benchmarks. BIDS is a general approach that can be applied to other problems in Bayesian classification such as learning from imbalanced training data. BIDS may also be used to augment meta-learners such as boosting, bagging, and semi-supervised learning.

As described above, text classification technology has great practical importance given the massive amount of text that is generated in various domains such as the world-wide-web, enterprise documents, newsfeeds, email, digital libraries, medical records, and many others. If a system is given sufficient training data in the form of, for example, labeled documents, classifiers based on machine learning or statistics can be trained to automatically classify unlabelled documents with high accuracy.

However, in a great many real-world applications, training data is either prohibitively costly, or simply impossible to obtain. The lack of adequate training data is a fundamental hurdle preventing the wider deployment of text classification technologies in various enterprises. The potential market for such technologies is vast, but the questions as to where to get the training data is a bottleneck to tapping this potential. To provide some perspective, in one example described in Table 1, the number of training samples available for each class in an application from 2012 is shown. In this example, each class split into sub-classes, making a total of 32 sub-classes. In this example, the class "IT strategy/initiatives" comprises two sub-classes; "IT competitiveness" and "IT initiatives," each having only two training samples. The number of training samples per sub-class averaged less than four, and the mode for the number of samples per sub-class was two. This is the practical reality of a large number of enterprise text classification applications. Clearly, this is a far cry from classification with 5-fold or 10-fold cross-validation, where 80-90% of the data is available for training.

TABLE 1

Number of training samples available for each class

| Class | # | Class | # |
| --- | --- | --- | --- |
| IT strategy/initiatives | 4 | Financials | 36 |
| brand/perception | 2 | Market/geo. Presence/share | 42 |
| business/strategy | 96 | Market recognition/awards | 4 |
| business environment | 2 | Products/services offerings | 36 |

Of the many classifiers that have been proposed for the task of text classification, a "baseline" may be the naïve Bayes probabilistic classifier. The naïve Bayes classifier has several advantages that make it attractive for enterprise applications. It is easy to implement, and can be trained fast. But an aspect of naïve Bayes that makes it attractive for enterprise applications is that it is transparent, and can be used for diagnostics. The user can easily understand the classifier, and can therefore troubleshoot it easily. In comparison, a solved model of a SVM is often hard to interpret. This difference is especially important in situations where the data is periodically being updated, the classes are still changing, or the system is still under construction.

However, naïve Bayes is significantly less accurate on text classification than, for example, SVMs. This is in contrast to several lower-dimensional applications where it does have surprisingly good performance. Therefore, the present systems and methods overcome the shortcomings of naïve Bayes classifier by improving the performance of the naïve Bayes classifier when very little training data is available.

In some situations, semi-supervised learning where a classifier is trained with little training data, and some amount of unlabelled data is labeled by the classifier and added to training data to re-learn may be used to grapple with the paucity of training data. Semi-supervised learning assumes that unlabelled data is abundant. This assumption is motivated largely by online sources of data, but may not hold in enterprise applications. Moreover, semi-supervised learning with naïve Bayes and the expectation-maximization (EM) algorithm makes assumptions such as assumptions that the data is generated by a mixture model whose components correspond to classes. These assumptions are made on the model, and generally harm accuracy when these assumptions are not met. While semi-supervised learning is effective other complimentary techniques may be developed that do not require making assumptions, and can work in tandem with semi-supervised learning.

As mentioned above, the present systems and methods utilize Bootstrap Intra-Document Sampling (BIDS); a technique that significantly improves the performance of naïve Bayes when training data is very scarce. BIDS is based on well-established statistical re-sampling principles, and requires no additional assumptions on the generative model of the text beyond those already made by naïve Bayes. BIDS is extremely easy to implement, and fast to incorporate. Conceptually, BIDS compliments semi-supervised learning, and can conceivably be used in cascade with it.

Thus, the present systems and methods consider bootstrapping each training sample itself. Bootstrapping is found useful in bagging where multiple classifiers are trained on bootstrapped training data sets, and then combined. There are two central differences between bagging and BIDS. In BIDS, there is only one classifier, whereas in bagging, multiple classifiers are combined. Secondly, in bagging, the set of training samples is bootstrapped, not each sample itself.

Bootstrapping is also used in evaluating classifiers. The bootstrapping itself is more akin to bagging, and multiple versions of the classifier are trained with re-samples of the set of training data. Note that in both the applications above, it is not necessary to "match" the generative model of each training data with the Bootstrap's sampling design, in the manner described herein. The problem of training classifiers with very little training data has received surprisingly scant attention in literature.

Thus, the present systems and methods are directed to a technique called BIDS that is based on established statistical principles to generate more training data from existing training data. The present systems and methods provide consistent and significant improvement to the accuracy of the Naïve Bayes classifier in a regime of immense practical importance; namely, when training data is very scarce. BIDS is conceptually simple, and extremely easy to implement. BIDS makes Naïve Bayes the most accurate classifier in this regime. When mated with the other benefits of Naïve Bayes, it makes Naïve Bayes a natural choice for enterprise applications with scarce training data.

As used in the present specification and in the appended claims, the term "original documents" is meant to be understood broadly as any document provided to a classifying system or device that is used to assist in the training of the classifying system or device. These original documents may be provided to the classifying system or device in order to provide to the classifying system or device with examples or training data. The classifying system or device uses this training data, either directly or indirectly, to learn how to classify textual documents.

As used in the present specification and in the appended claims, the term "test documents" is meant to be understood broadly as any document that is to be classified by a classifying system or device. In one example, the test documents are presented for classification to the classifying system or device after the classifying system or device has undergone a training phase in which the above described original documents are used as training data, either directly or indirectly, to teach the classifying system or device how to classify textual documents such as these test documents.

As used in the present specification and in the appended claims, the term "pseudo-documents" is meant to be understood broadly as any document derived from the above-defined original documents. As described in more detail below, these pseudo-documents are used as examples or training data to teach the classifying system or device how to classify textual documents. In one example, these pseudo-documents may be used by the classifying system or device alone or in combination with the original documents, to provide the training of the classifying system or device. In one example, the pseudo-documents comprise a similar distribution of words as the original documents. In another example, the pseudo-documents comprise the same or approximately the same distribution of words as the original documents. In still another example, the pseudo-documents comprise a randomly perturbed value of the frequency of occurrence of words, phrases, or combinations thereof as the original documents. In this example, the random perturbed value is the mean or average of the distribution of words within the original documents.

As used in the present specification and in the appended claims, the terms "classifier," "machine learning classifier," "machine learning classifying device," or similar language is meant to be understood broadly as any hardware device or a combination of hardware devices and software that classifies a number of textual documents by topic or category. In the present specification, the machine learning classifying device further utilizes pseudo-documents created from a number of original documents to learn how to categorize a number of test documents, as will be described in more detail below.

Still further, as used in the present specification and in the appended claims, the term "distribution of words" or similar language is meant to be understood broadly as the frequency of occurrence of individual words, phrases, or a combination thereof that appear within a document. Thus, as mentioned above, the distribution of words in an original document may comprise the number of times each individual word appears within the original document. This distribution of words is used to create a number of pseudo-documents.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Throughout the below description, an example of classifying a number of documents in a news reporting scenario is described in which a number of people such as reporters prepare a number of textual documents. After being produced, these textual documents are classified by a machine learning classifying device in order to obtain a number of cataloged textual documents arranged by topics such as, for example, economy, sports, and politics, among many other topics.

In the above example, a number of documents are classified based on training data provided to the machine learning classifying device. The training data provides the machine learning classifying device with example data from which it can make a determination as to the topic of a textual document. The machine learning classifier searches for text, groups of text, patterns of text, or combinations thereof within the documents, and compares that text with a number of pre-assigned topics or categories available such as the above listed economy, sports, and politics, among others in classifying the textual documents into categories by, for example, topic.

Thus, although a news reporting scenario is described herein, this scenario is simply an example scenario in which the present systems and methods may be utilized. Any system or scenario that may benefit from the classification of documents may benefit from the present systems and methods.

Turning now to the figures, FIG. 1 is a block diagram of a machine learning classifying device (100) for classifying textual documents, according to one example of the principles described herein. The machine learning classifying device (100) is a computing device that performs the methods described herein. In one example, the methods provided by the machine learning classifying device (100) are provided as a service over a network by, for example, a third party. In this example, the services provided by the machine learning classifying device (100) may be provided as software as a service (SaaS), infrastructure as a service (IaaS), other forms of network services, or a combination thereof. In another example, the machine learning classifying device (100) is executed by a local administrator.

In one example, the machine learning classifying device (100) is a mobile computing device such as, for example, a mobile phone, smart phone, personal digital assistant (PDA), or a laptop computer with the capability of performing the methods described herein. In another example, the machine learning classifying device (100) is a desktop computing device. In another example, the machine learning classifying device (100) may be provided as a service by a network computing resource provider, an administrator, or a third party, among other entities. In this example, the machine learning classifying device (100) may be executed on a single computing device, or may be distributed and executed across a number of devices located at any number of locations.

To achieve its desired functionality, the machine learning classifying device (100) comprises various hardware components. Among these hardware components may be a number of processors (102), a number of data storage devices (104), a number of peripheral device adapters (106), and a number of network adapters (108). These hardware components may be interconnected through the use of a number of busses and/or network connections. In one example, the processor (102), data storage device (104), peripheral device adapters (106), and a network adapter (108) may be communicatively coupled via bus (107).

The processor (102) may include the hardware architecture to retrieve executable code from the data storage device (104) and execute the executable code. The executable code may, when executed by the processor (102), cause the processor (102) to implement at least the functionality of receiving a number of original documents, deriving a number of pseudo-documents from the original documents, utilizing the derived pseudo-documents to learn how to classify a test document into a category, and classify a number of test documents based on the learning, according to the methods of the present specification described herein. In the course of executing code, the processor (202) may receive input from and provide output to a number of the remaining hardware units.

The data storage device (104) may store data such as executable program code that is executed by the processor (102) or other processing device. As will be discussed, the data storage device (104) may specifically store a number of applications that the processor (102) executes to implement at least the functionality described above.

The data storage device (104) may include various types of memory modules, including volatile and nonvolatile memory. For example, the data storage device (104) of the present example includes Random Access Memory (RAM) (131), Read Only Memory (ROM) (132), and Hard Disk Drive (HDD) memory (133). Many other types of memory may also be utilized, and the present specification contemplates the use of many varying type(s) of memory in the data storage device (104) as may suit a particular application of the principles described herein. In certain examples, different types of memory in the data storage device (104) may be used for different data storage needs. For example, in certain examples the processor (102) may boot from Read Only Memory (ROM) (132), maintain nonvolatile storage in the Hard Disk Drive (HDD) memory (133), and execute program code stored in Random Access Memory (RAM) (131).

Generally, the data storage device (104) may comprise a computer readable storage medium. For example, the data storage device (104) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The hardware adapters (106) in the machine learning classifying device (100) enable the processor (102) to interface with various other hardware elements, external and internal to the machine learning classifying device (100). For example, peripheral device adapters (106) may provide an interface to input/output devices, such as, for example, display device (110) or access other external devices (112). The display device (110) may be provided to allow a user to interact with and implement the functionality of the machine learning classifying device (100).

The peripheral device adapters (106) may also create an interface between the processor (102) and a printer, the display device (110), or other media output device. The network adapter (108) may provide an interface to other computing devices within, for example, a network, thereby enabling the transmission of data between the machine learning classifying device (100) and these other devices.

The machine learning classifying device (100) further comprises a number of modules used in training the machine learning classifying device (100) and classifying of test documents. The various modules within the machine learning classifying device (100) may be executed separately. In this example, the various modules may be stored as separate computer program products. In another example, the various modules within the machine learning classifying device (100) may be combined within a number of computer program products; each computer program product comprising a number of the modules.

The machine learning classifying device (100) may comprise a sampling module (140) to, when executed by the processor (102), receive a number of original documents, determine a distribution of words within the original documents, and store those original documents in an original document database (142). In one example, the sampling module (140) is stored within the data storage device (104) of the machine learning classifying device (100), and is accessible and executable by the processor (102).

The machine learning classifying device (100) may further comprise a pseudo-document creation module (150). The pseudo-document creation module (150) creates a number of pseudo-documents based on the distribution of words, and stores the pseudo-documents in the pseudo-document database (152).

The machine learning classifying device (100) may further comprise a training module (160). The training module (160) utilizes a number of documents to train a classification module (170) associated with the machine learning classifying device (100). These documents comprise, for example, the original documents stored in the original document database (142), the pseudo-documents stored in the pseudo-document database (152), or combinations of the original documents and the pseudo-documents. As will be described below in more detail, the training of the classification module (170) may be achieved by capturing characteristics of interest of the original documents' and the pseudo-documents' to underlying probability distribution, and identifying the probability distribution as training data. This training data may be utilized as instances of the possible relations between observed variables in documents to be characterized such as the above-described test documents.

The machine learning classifying device (100) may further comprise a classification module (160). The classification module (160), after being trained, classifies a number of test documents into a category. In this manner, a test document may be stored within the test document database (172) based on the category into which that test document is assigned by the classification module (170). In this manner, searching for a test document on a particular topic, for example, may be more easily achieved by searching within a number of categories within the test document database (172) that are associated with that topic.

As described above, BIDS generates new training data from existing training data such as the original documents using re-sampling. Thus, BIDS assists the classifier to form its parameter estimates. Re-sampling is used in statistics to generate more samples from a given sample, usually for the purpose of obtaining distributions of various functionals of interest on the data (such as the mean, variance, and so on). The present disclosure treats a single original document as a sample from an underlying probabilistic process, and therefore re-sample from the original document to generate more text documents called pseudo-documents that also come from the same underlying probabilistic process. Furthermore, if the re-sampling design matches the generative model of the text, then the parameter estimation will benefit from the smoothing done by the re-sampling.

The present systems and methods provide a number of advantages. One such advantage is that the BIDS approach disclosed herein generates new training data from existing data that matches Bayesian classification in a fundamental way. Further, BIDS demonstrates extremely good performance in situations of scarce training data, bridging the gap between naïve Bayes and SVM. Still further, empirical validation also yields a comparison of classifiers in the region of scarce training data, that is valuable in and of itself.

The term "naïve Bayes" refers to a family of probabilistic classifiers all of whom employ the simplification that given the class, features are independent. The present disclosure describes multinomial naïve Bayes (MNB), which may be posited as the version of naïve Bayes most appropriate for text classification. MNB treats a document D as the result of |D| draws of a |V| valued multinomial, where V is the vocabulary.

Two variants of the MNB model which differ in how they treat word frequencies may be utilized by the present systems and methods. The first of these two variants of the MNB model may be called an Integer Multinomial (IMN) event model. In this model, let |D| denote the number of tokens, counted with multiplicity, in document D. Furthermore, let $V=\{t_1, \ldots, t_{|V|}\}$ be the vocabulary of category c. In the IMN model, a document D is represented as a vector $D=\{x_1, x_2, \ldots, x_{|V|}\}$, where $x_i$ is the number of occurrences of token $t_i$ in D. The generative model is as follows: each document D in class c is seen as being generated by picking |D| tokens independently, with probability of picking the token $t_i$ given by $P(t_i|c)$. Therefore, the probability $P(D|c)$ of the document D arising from the class c under this generative model is given by the multinomial distribution as follows:

$$P(D|c) = P(|D|) \cdot |D|! \cdot \prod_{i=1}^{|V|} \frac{P(t_i|c)}{x_i!} \quad \text{Eq. 1}$$

For simplicity, it may be assumed that the length of a document is independent of the class.

A prior distribution $P_C$ is assigned to the classes, and then derive the following maximum aposteriori (MAP) classification rule that labels D with the class l(D) having the largest posterior probability $$l(D) = \underset{c}{\operatorname{argmax}} \left[ \log Pc(c) = \sum_i x_i \log P(t_i|c) \right] \quad \text{Eq. 2}$$

Parameters $P(t_i|c)$ are estimated for each token $t_i$ and each class c, using the training data. This is done by counting the occurrences of the token $t_i$ in all documents of the class c, and using a Laplacean prior as follows:

$$\hat{P}(t_i|c) = \frac{1 + N_{ci}}{|V| + N_c} \quad \text{Eq. 3}$$

where $N_{ci}$ is the total number of occurrences of token $t_i$ in documents of class c, and $N_c$ is the total number of word occurrences in the class c, including multiplicities.

The second variant of the MNB model is a Boolean Multinomial (BMN) Event Model. When a term occurs frequently in a document due to burstiness, the IMN model may assign an unreasonably high posterior log-odds ratio to the document. The BMN model avoids this by replacing the frequency count $x_i$ of token $t_i$ by $\min\{x_i,1\}$. Namely, BMN counts each word occurrence only once.

An approach to dealing with scarcity of training data for Bayesian classification and the associated BIDS will now be described in more detail. Let X be a random variable whose distribution function is $F_X$. In one example, a user may be interested in some parameter θ of the distribution $F_X$ that is obtained by some statistical functional g, so that $\theta = g(F_X)$. Let $X_n$ denote a sample of size n drawn from $F_X$. Namely, $X_n = (X_1, \ldots, X_n)$, where $X_i$ are i.i.d. with distribution $F_X$. Let the empirical distribution function (EDF) of $X_n$ be denoted by $F_n(x, X_n)$.

$$F_n(x, X_n) \rightarrow F(x) \text{ as } n \rightarrow \infty \quad \text{Eq. 4}$$

Eq. 4 is the Glivenko-Cantelli theorem. In words, the empirical distribution converges almost surely to the true distribution. This gives us the basis for the "plug-in" principle: A simple estimator $\hat{\theta}$ of θ is given by plugging in the EDF in place of F. Therefore, $\hat{\theta} = g(F_n)$.

In many applications, a system may not have the luxury of drawing additional samples from the population to generate the EDF. Often, there exists exactly one sample from the population. Bootstrap re-sampling or simply "bootstrap" is an approach that can be used to generate more "samples" of the population, provided that the re-sampling design is identical to the manner in which the original sample was generated.

The basic idea of the bootstrap is to use the sample as an approximation of the population. Therefore, in order to approximate samples from the population, take samples $X^{*(1)}, \ldots, X^{*(m)}$ with replacement from the data itself. In this way, an EDF $F_m^*$ is generated. The plug-in principle may be employed, and the parameter θ(F) by $\hat{\theta}(F_m^*)$ is estimated.

The idea of statistical language models is that a piece of text is viewed as an instantiation of an underlying probabilistic model. The "naïve" in the Naïve Bayes classifier comes from the assumption that the occurrence of words is independent given the class, and is, therefore, determined entirely by the $P(t_i|c)$. As demonstrated above, this results in a multinomial generative model. At this point, the correspondence with Bootstrap re-sampling is introduced. Bootstrap re-sampling also is, effectively, a multinomial sampling since it assumes independence of samples. In other words, the "sampling design" for Bootstrap re-sampling matches that for multinomial Naïve Bayes. A text document is viewed as being an instantiation of an underlying simple language model. Because of this additional Bootstrap samples from this document may be drawn since the generative model of the text for Naïve Bayes classification matches the generative model of the Bootstrap re-sampling. Therefore, more "documents" are drawn from this one sample, and this will provide the system with as many such "documents" as necessary.

Bootstrap Intra-Document Sampling (BIDS), expressed as BIDS[D,B], views each training document D as a sample of words from an underlying language model. BIDS[D,B] then samples without replacement from this data (i.e., from the original document) to generate B "pseudo-documents." The BIDS[D,B] pseudo-code is given as follows:

---
Pseudo-code 1: BIDS[D, B] for text documents
---
Data: Text Document D
Result: $D^{*(1)}, D^{*(2)}, \ldots, D^{*(B)}$: B Bootstrap
       Resampled Versions of D
for i = 1, 2, . . . , B do
    Create empty pseudo-document $D^{*(i)}$;
    // Sampling with replacement;
    for j = 1, 2, . . . , |D| do
        Generate random integer k between 1 and |D|
        uniformly with probability $\frac{1}{|D|}$;
        Add word at $k^{th}$ position in D, to $D^{*(i)}$;
    end
    Return $D^{*(i)}$;
end
---

The classifier is now trained with the original training data, along with the output of BIDS.

---
Pseudo-code 2: Using BIDS to train a Classifier
---
Data: Classifier; Set T of training documents
for D ∈ T do
        Call BIDS[D,B];
end
Train Classifier with
T ∪ $\{D^{*(1)}, D^{*(2)}, \ldots, D^{*(B)}: D \in T\}$
---

As to setting parameter values, from extensive empirical testing, it seems to be a safe option to set the value of k=8 or k=16. Lower values of k may not maximize the effect of BIDS, and higher values may not yield significant additional improvement.

The property that mates BIDS to Naïve Bayes is that the latter uses a parameter estimate of the underlying language model in order to build the classifier. In a parameter estimation problem where the sampling design matches Bootstrap sampling, a more robust parameter estimate is obtained by using Bootstrap re-samples of the document. This is because the inter-sample variations that result from the Bootstrap allow the classifier to learn the parameters of the underlying model with more generality, and avoid over fitting to the single sample (D) that was drawn from it initially. In other words, in addition to the estimates of the form $\hat{P}(t_i|c)$ in Eq. 3 above, estimates $$\hat{P}^{*(1)}(t_i|c), \hat{P}^{*(2)}(t_i|c), \ldots \hat{P}^{*(B)}(t_i|c) \quad \text{Eq. 5}$$

also exist to enable the classifier to learn the class more robustly.

In contrast, non-parametric classifiers such as SVM and k-Nearest-Neighbor (k NN) have a more "geometric" approach to classification. Accordingly, as will be demonstrated below, these classifiers do not benefit from BIDS.

There are several advantages of using BIDS. First, BIDS makes no assumptions about the model: it is truly non-parametric. This is in contrast with semi-supervised learning, where some assumptions about the underlying model must be made to match unlabelled data to it. Second, BIDS is conceptually simple and extremely easy to implement. The present implementation took 85 lines in PERL programming language. Although PERL is described here as being the program language used to write the present implementation, any other programming language may be used. Third, BIDS is fast. Specifically, BIDS adds $O(\Sigma_{D \in T}|D|)$ time to training the classifier, and nothing to testing or running the trained classifier.

Figure 2:
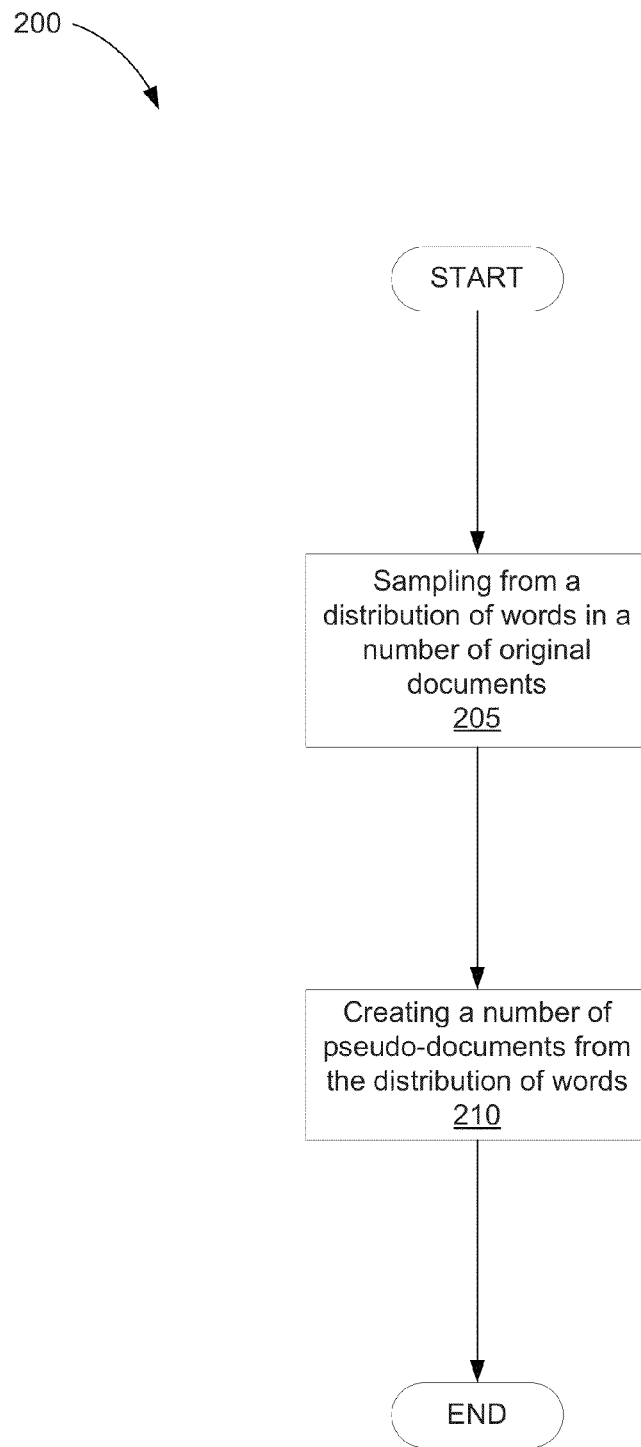
FIG. 2 is a flow chart showing a method of generating training documents for training a classifying device, according to one example of the principles described herein.

Turning now again to the figures, FIG. 2 is a flow chart (200) showing a method of generating training documents for training a classifying device (100), according to one example of the principles described herein. The method of FIG. 2 may begin with the processor (102) of the machine learning classifying device (100) executing the sampling module (140) to sample (block 205) from a distribution of words in a number of original documents. The original documents may be stored in the original document database (142), and retrieved from the original document database (142) by the processor (102).

As described above, the present systems and methods may be employed in situations where scarce training data is available. In one example, between 1 and 10 original documents may be presented to a user. In many situations, this relatively low number of original documents may be insufficient to train the machine learning classifying device (100). Therefore, processor obtains the distribution of words from these original documents.

The processor (102) of the machine learning classifying device (100) executes the pseudo-document creation module (150) to create (block 210) a number of pseudo-documents from the distribution of words obtained at block 205. As defined above, the term "pseudo-documents" is meant to be understood broadly as any document derived from the original documents. In one example, the pseudo-documents may comprise a similar distribution of words as the original documents. In this example, a similar distribution of words is meant to be understood broadly as any distribution of words within a deviation of the distribution of words within an original document. For example, the similar distribution of words may be any number of standard deviations (a) away from the actual distribution of words within the original document.

In still another example, the pseudo-documents may comprise the same distribution of words as an original documents. In this example, the pseudo-documents comprise all the words within the original document in the same individual frequency relative to the original document.

In another example, distribution of words may include a distribution of phrases, words, or a combination thereof. In this example, the distribution of words as described above may include a number of phrases. For example, if the machine learning classifying device (100) were learning to classify sports-related test documents using a number of sports-related original documents and sports-related pseudo-documents, the distribution of words derived from the sports-related original documents to derive the sports-related pseudo-documents may include the phrase "national football league" as a phrase, "quarterback" as a word, or a combination of both the phrase and the word. This example allows for the inclusion of phrases that provide additional context to the machine learning classifying device (100).

In still another example, in some situations, more than one original document may be provided in order to train the machine learning classifying device (100). In one example, the processor (102) may execute the sampling module (140) and pseudo-document creation module (150) to combine distributions of words from two or more of the original documents. In this example, a hyperset of distributions of words is created from which a number of pseudo documents may be created via block 210. In another example, the processor (102) may execute the sampling module (140) and pseudo-document creation module (150) to sample the distribution of words from each original document individually. In this example, individual sets of distributions of words are created from which a number of pseudo documents may be created individually via block 210. In still another example, a combination of the two above examples may be utilized.

In still another document, the pseudo-documents may be unintelligible to a human. In this example, although the pseudo-documents may contain a same or similar distribution of words as compared to the original documents, the words or phrases within the pseudo-documents may not be ordered in an intelligible manner or in a manner in which a human may be able to understand the pseudo-documents.

The number of pseudo-documents created (block 210) from a number of original documents may be between 10 and 40. In another example, the number of pseudo-documents created (block 210) from a number of original documents may be between 16 and 32. These pseudo-documents are used as examples or training data to teach the machine learning classifying device (100) how to classify textual documents. In one example, these pseudo-documents may be used by the classifying system or device alone or in combination with the original documents, to provide the training of the classifying system or device.

Figure 3:
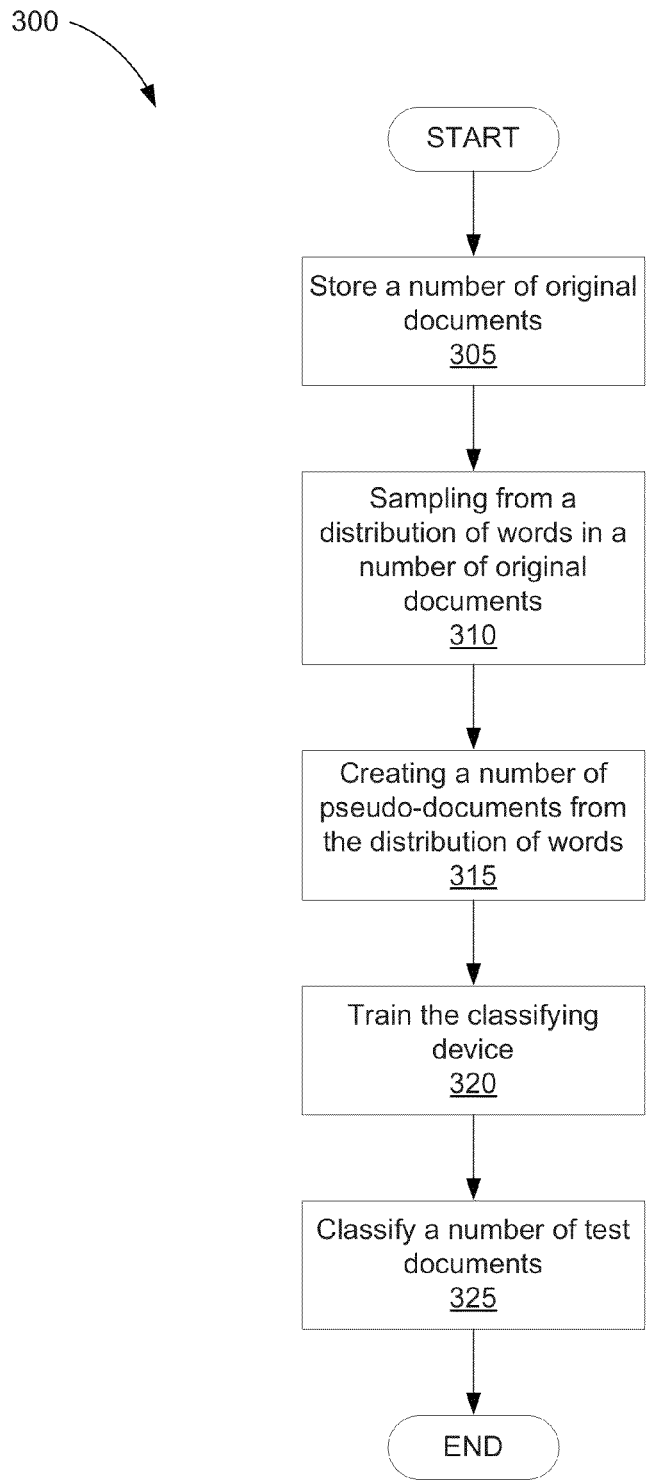
FIG. 3 is a flow chart showing a method of generating training documents for training a classifying device, according to another example of the principles described herein.
Figure 4:
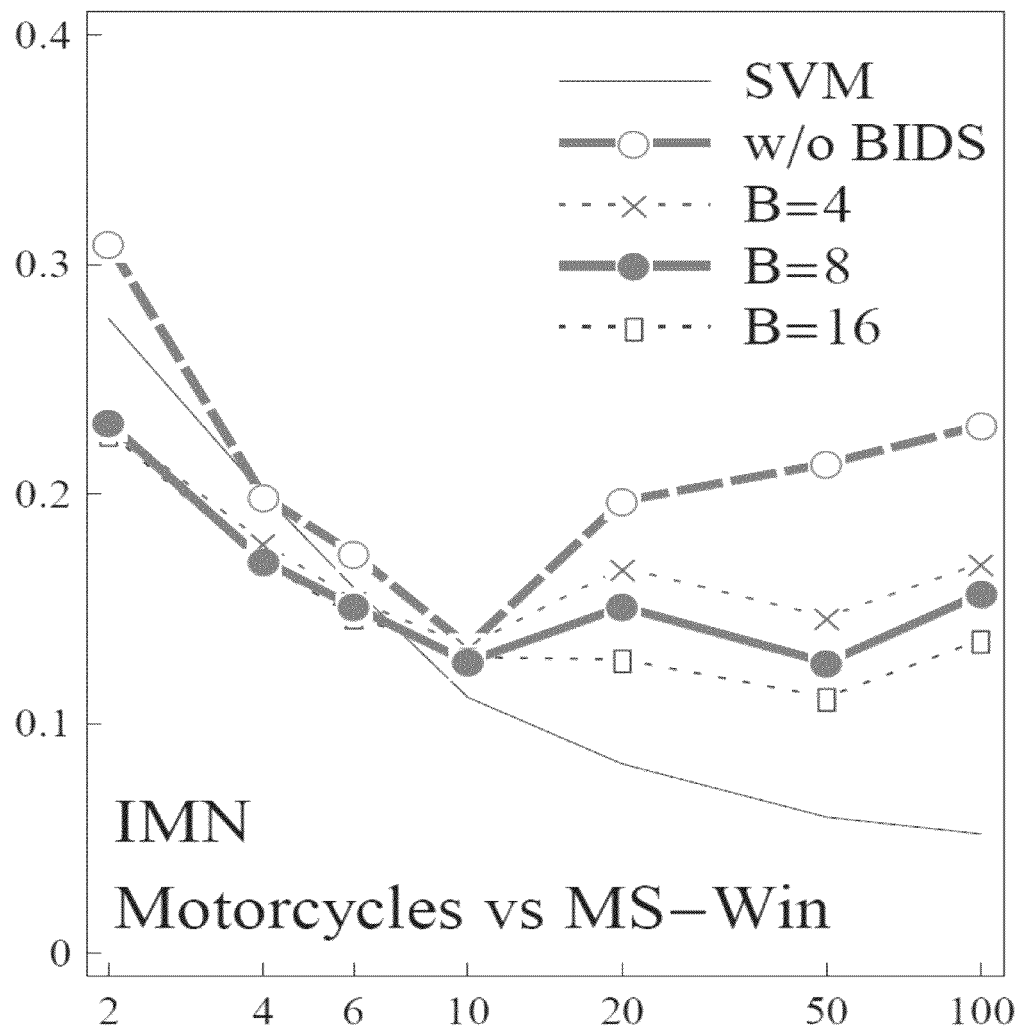
FIGS. 4 through 23 show a number of charts depicting the results for binary problems for a 20Newsgroups data set, according to an example of the principles described herein.
Figure 5:
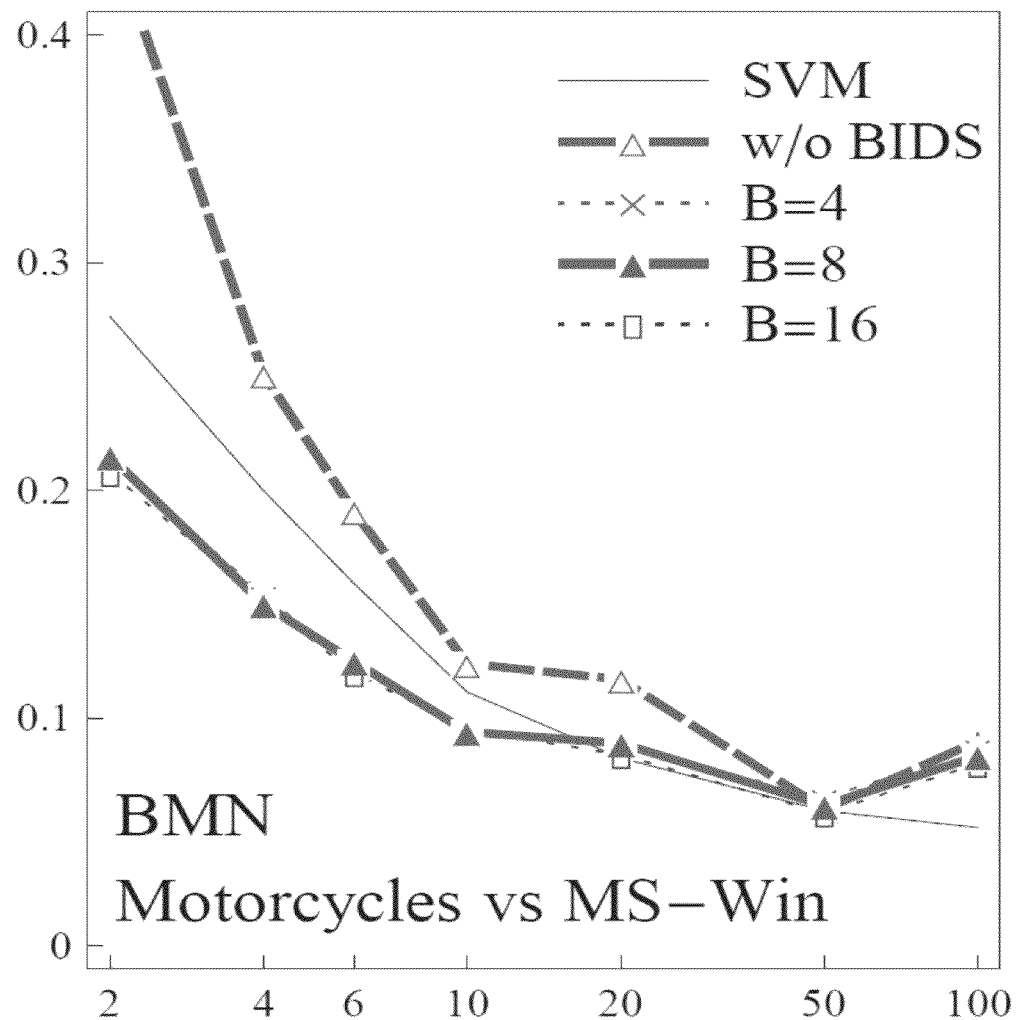
Figure 6:
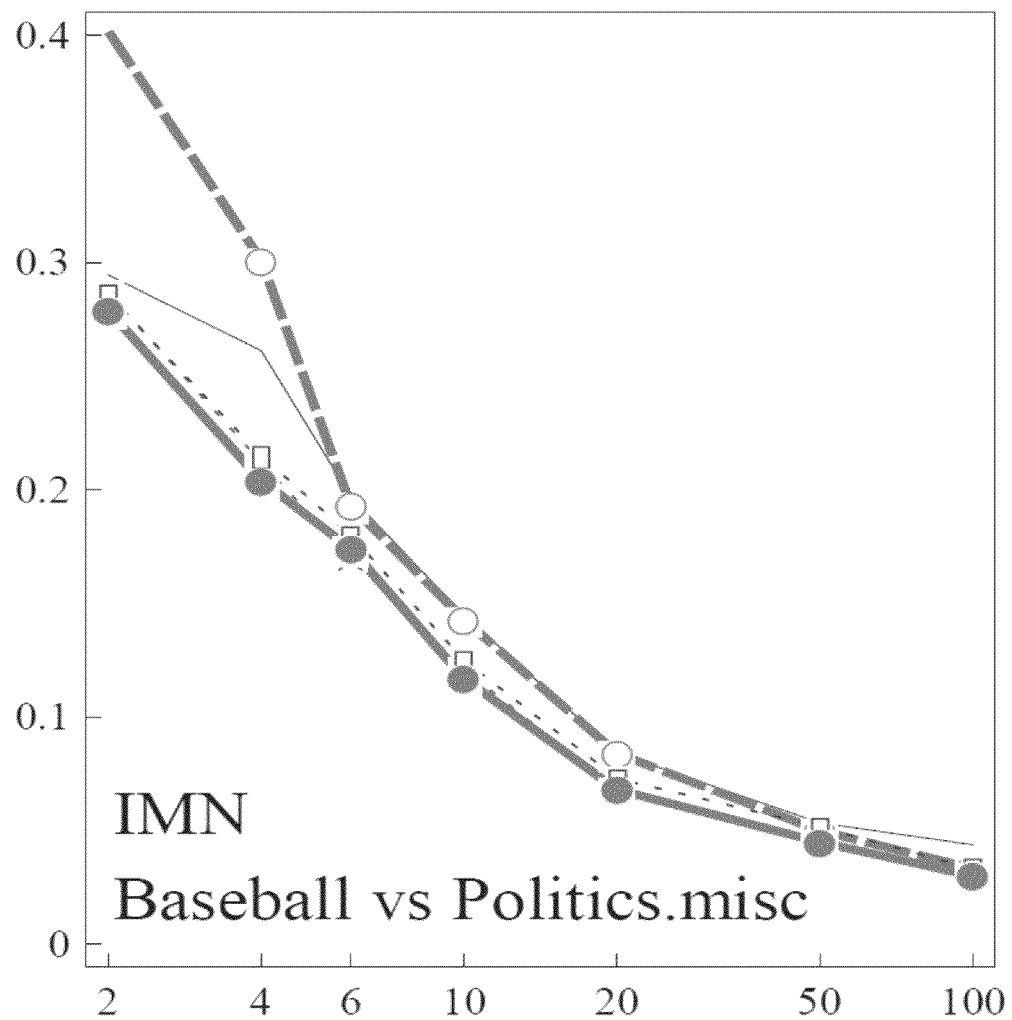
Figure 7:
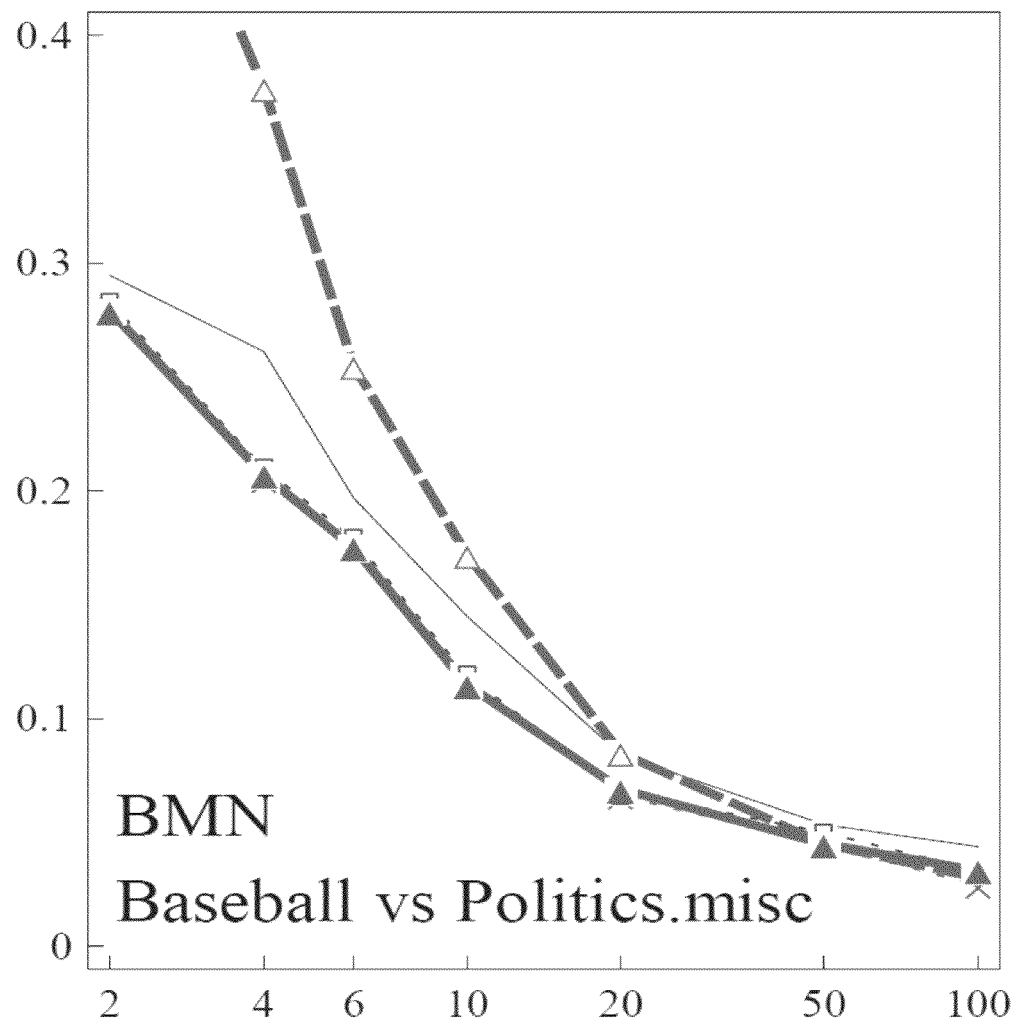
Figure 8:
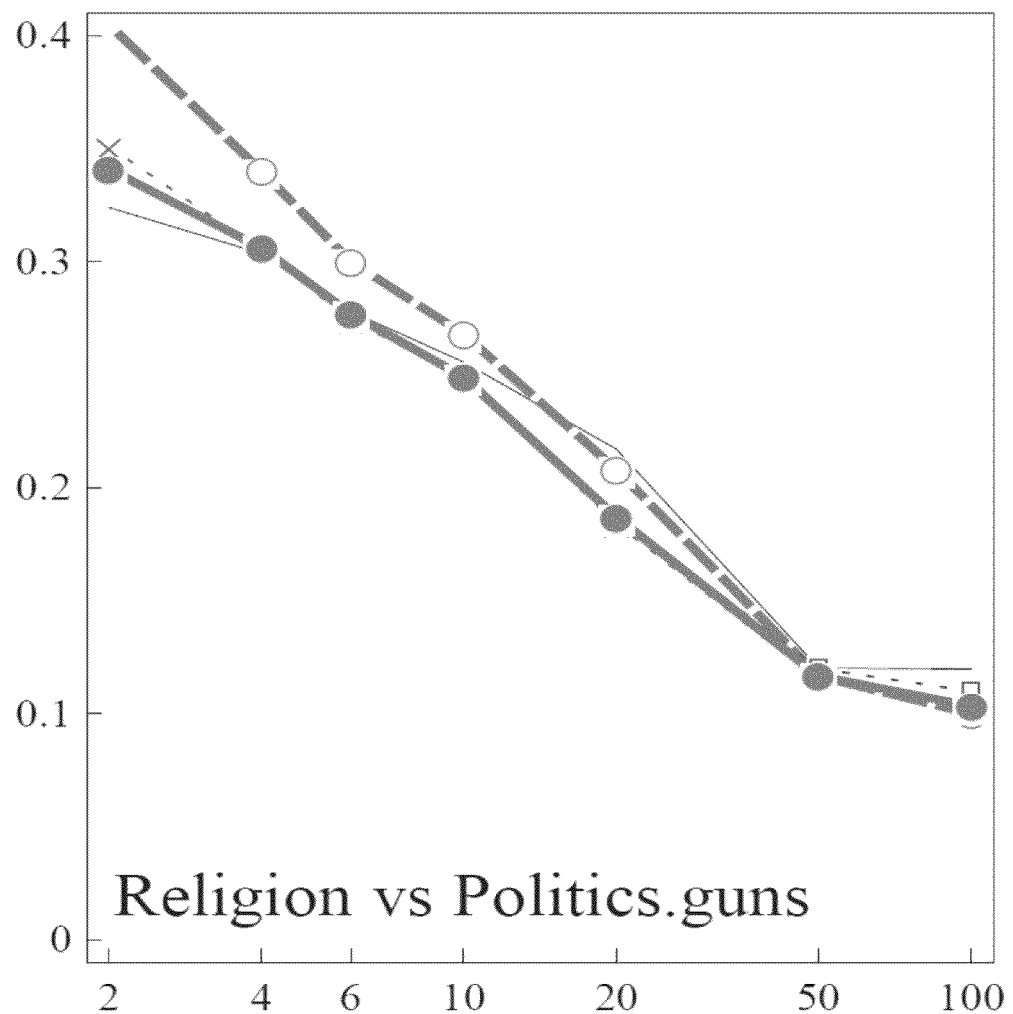
Figure 9:
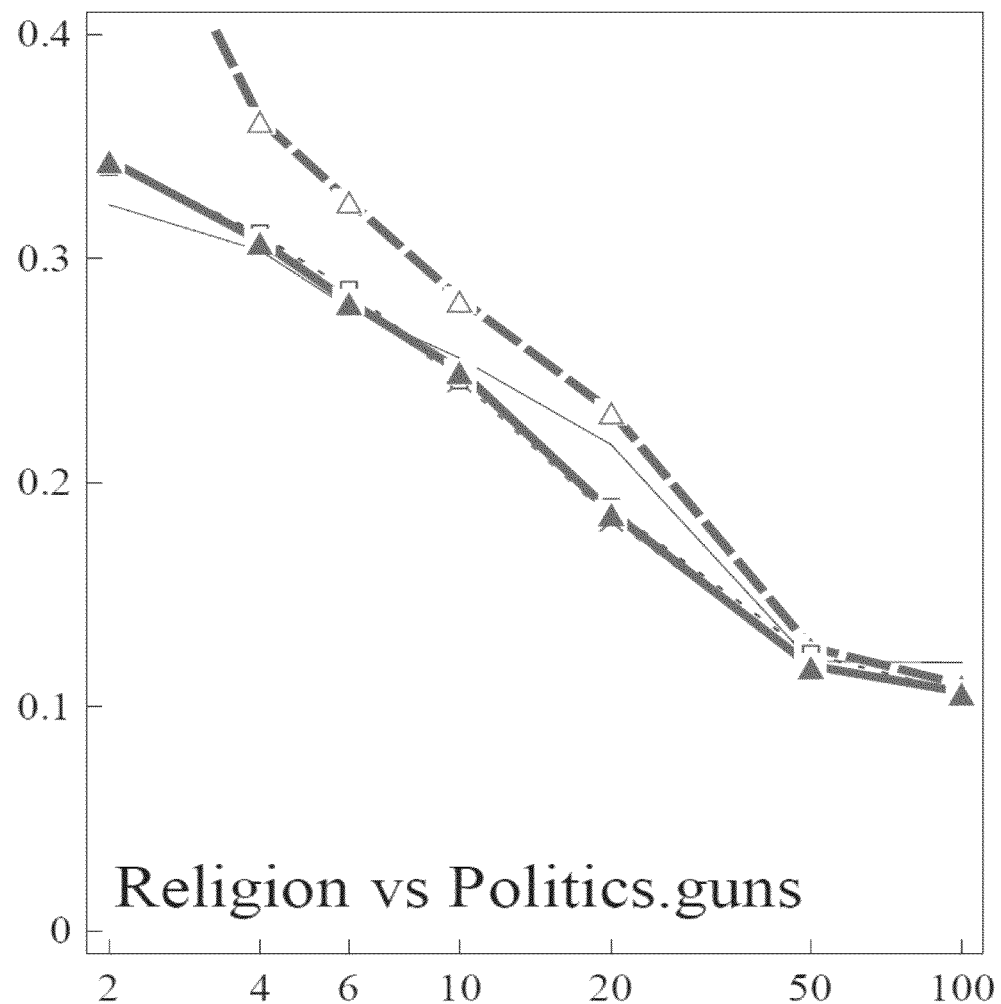
Figure 10:
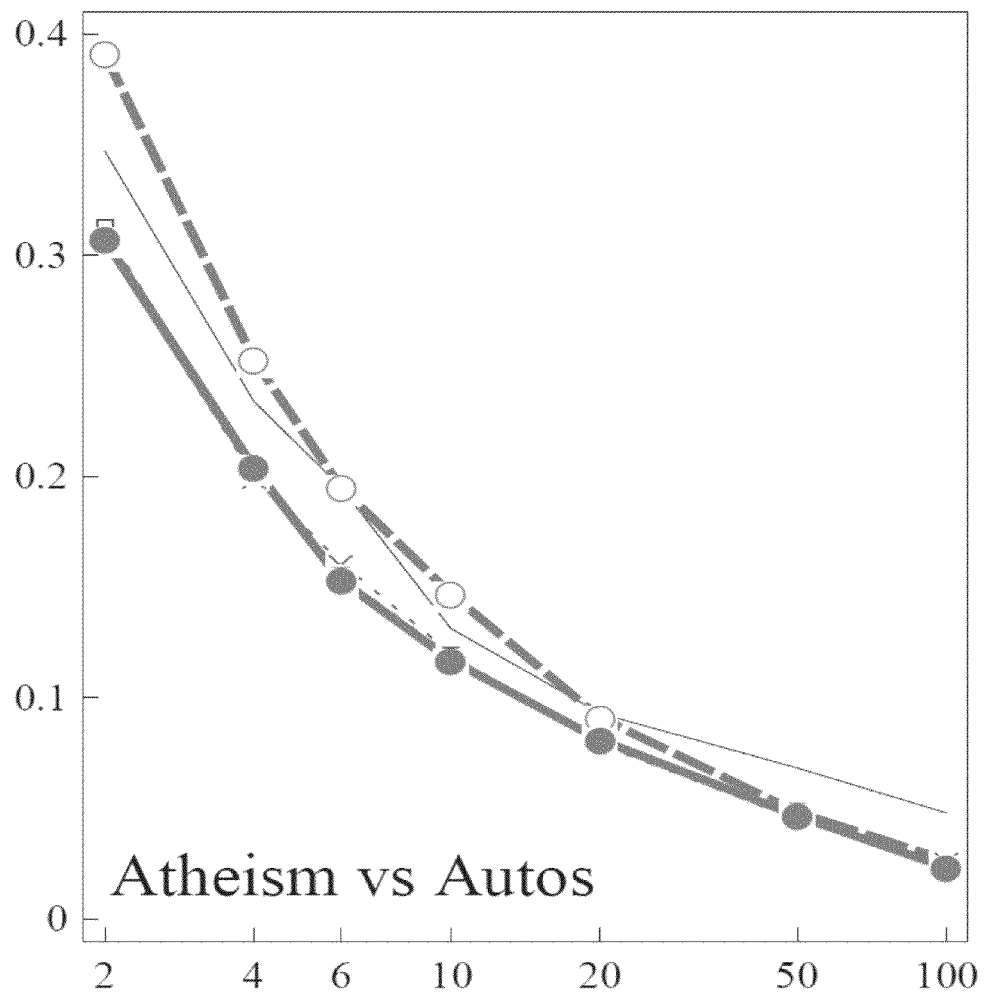
Figure 11:
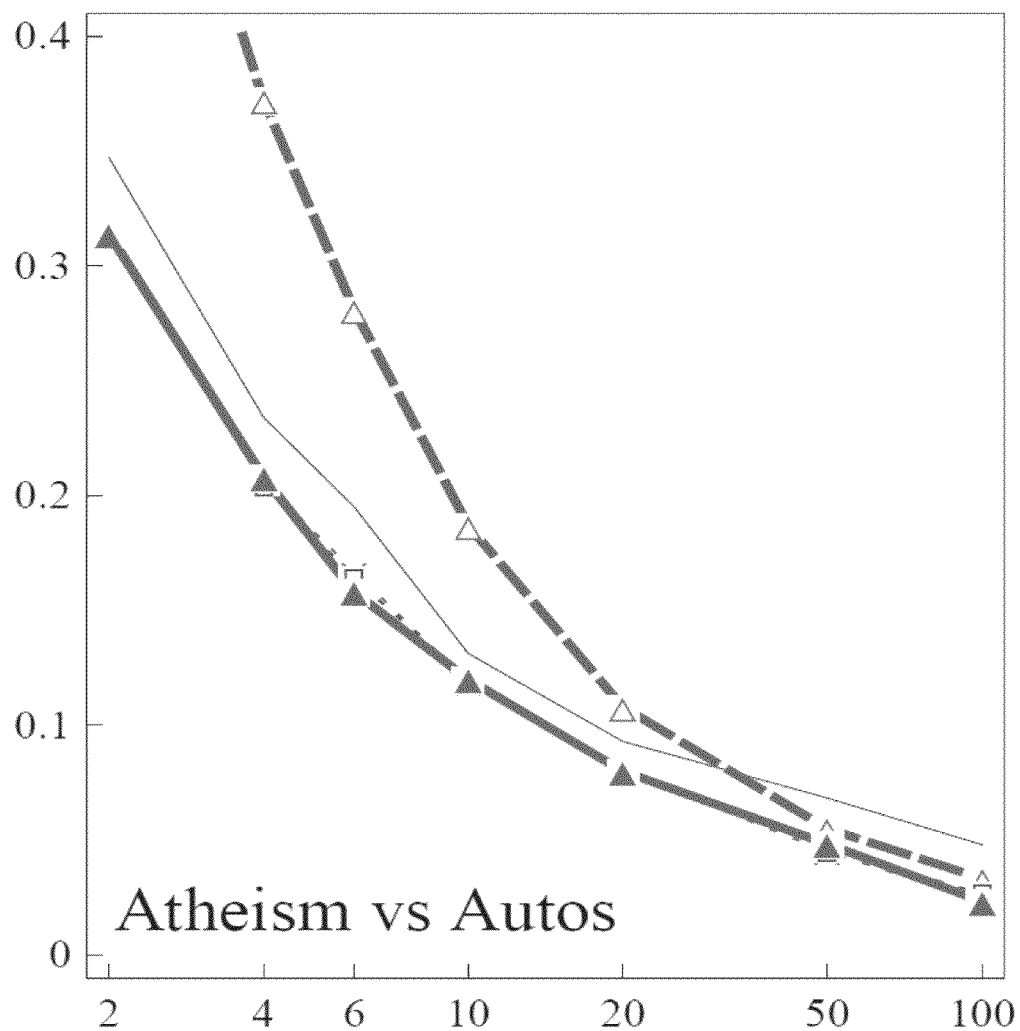
Figure 12:
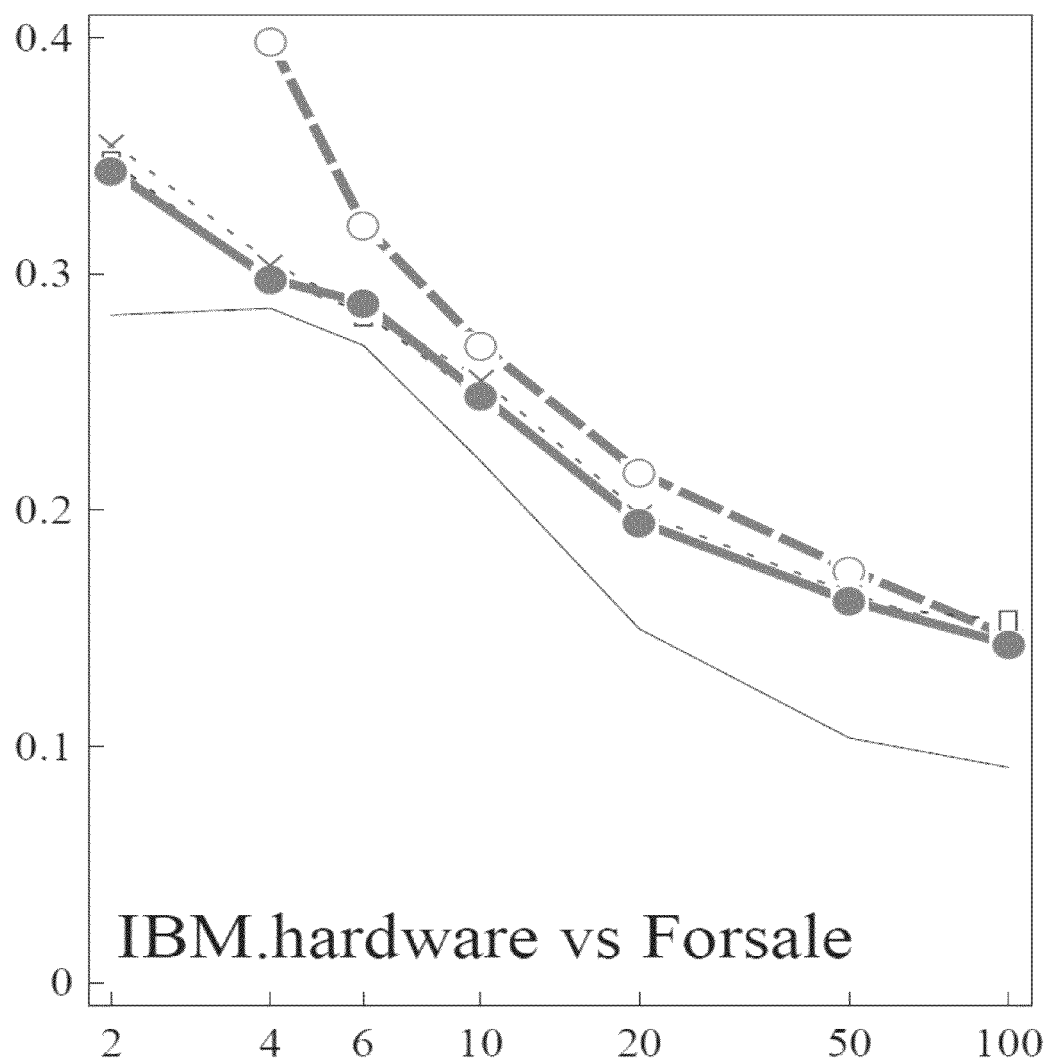
Figure 13:
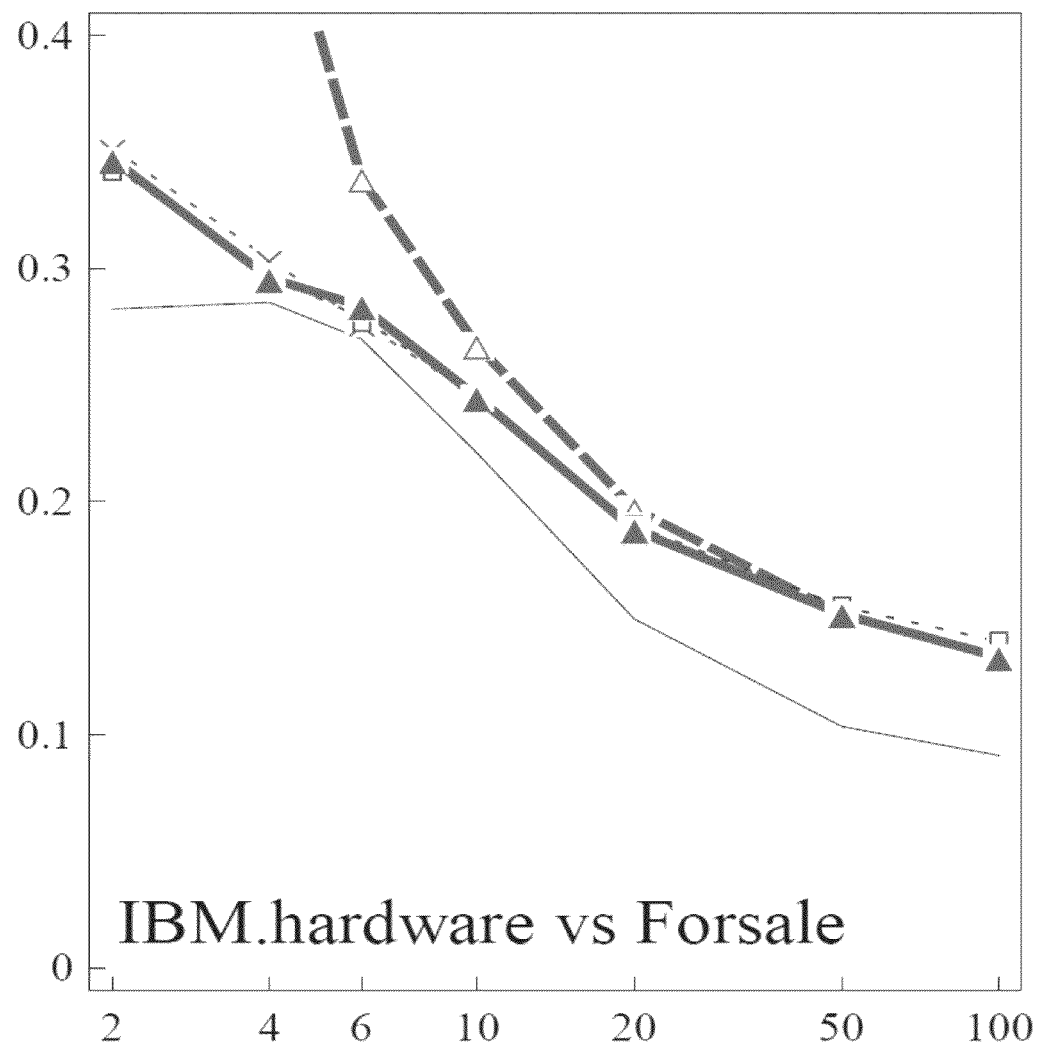
Figure 14:
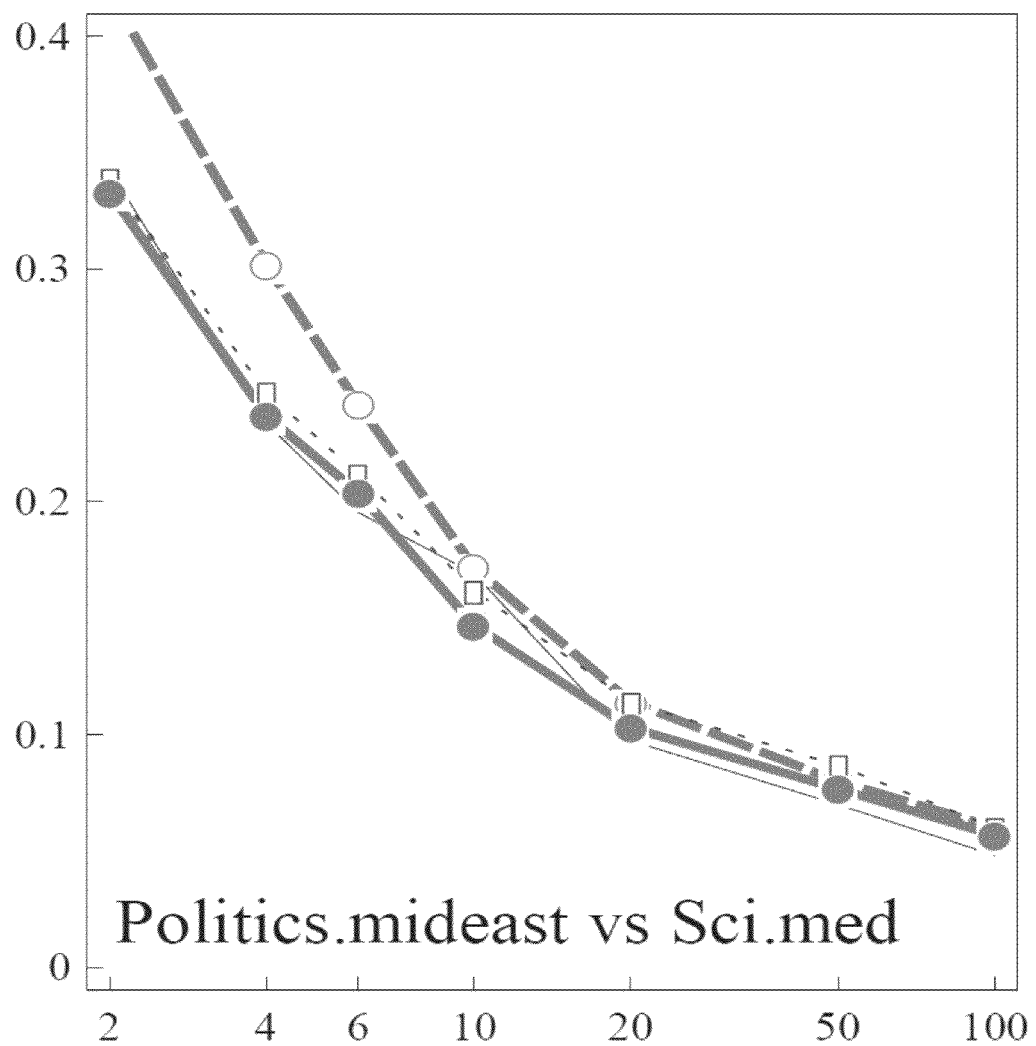
Figure 15:
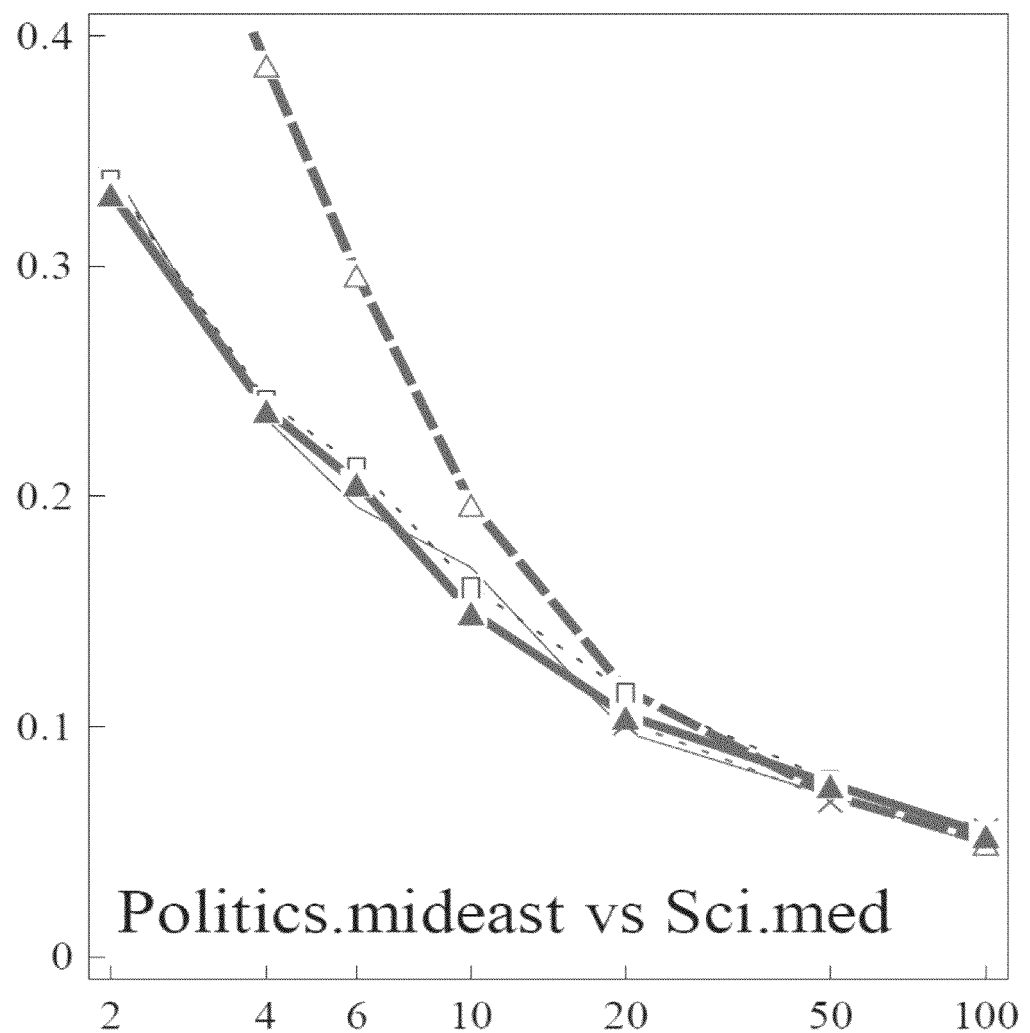
Figure 16:
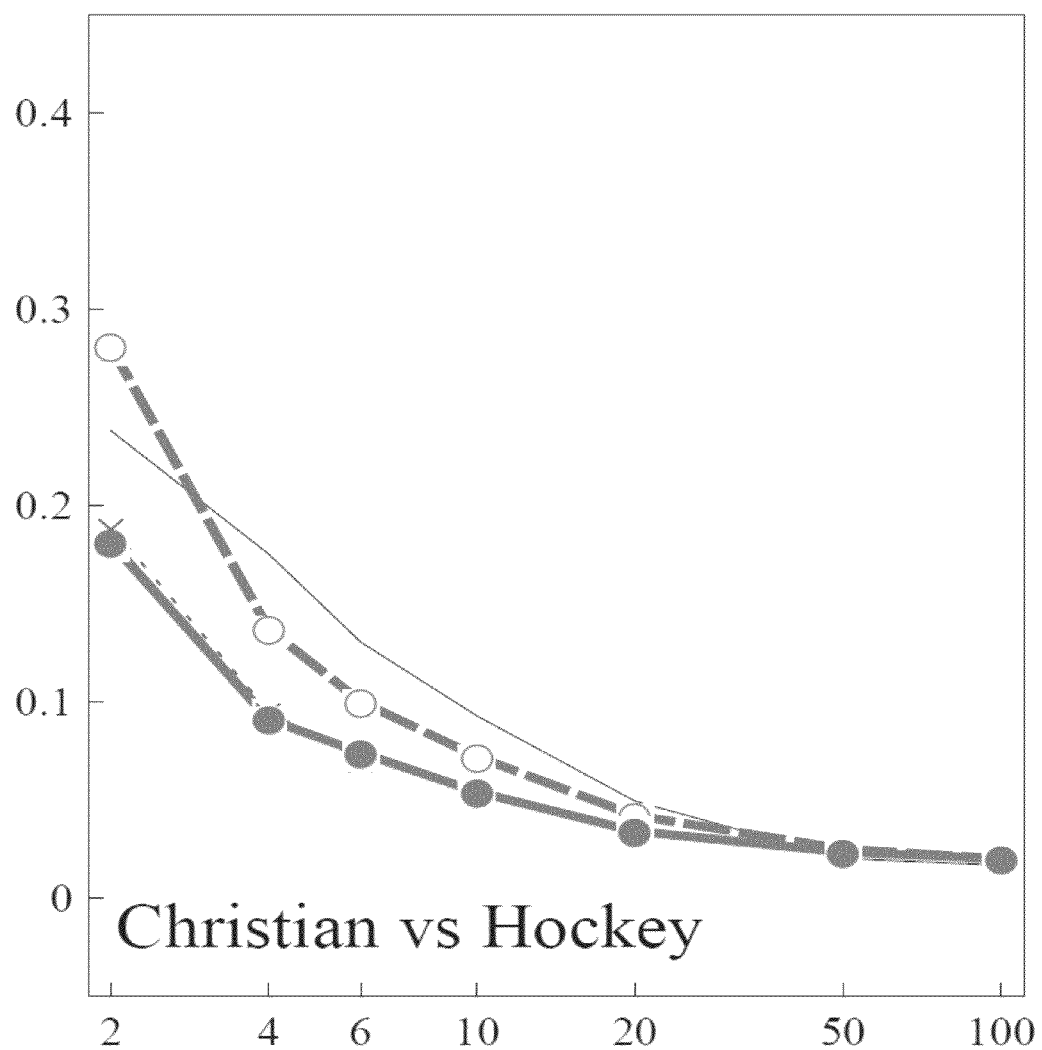
Figure 17:
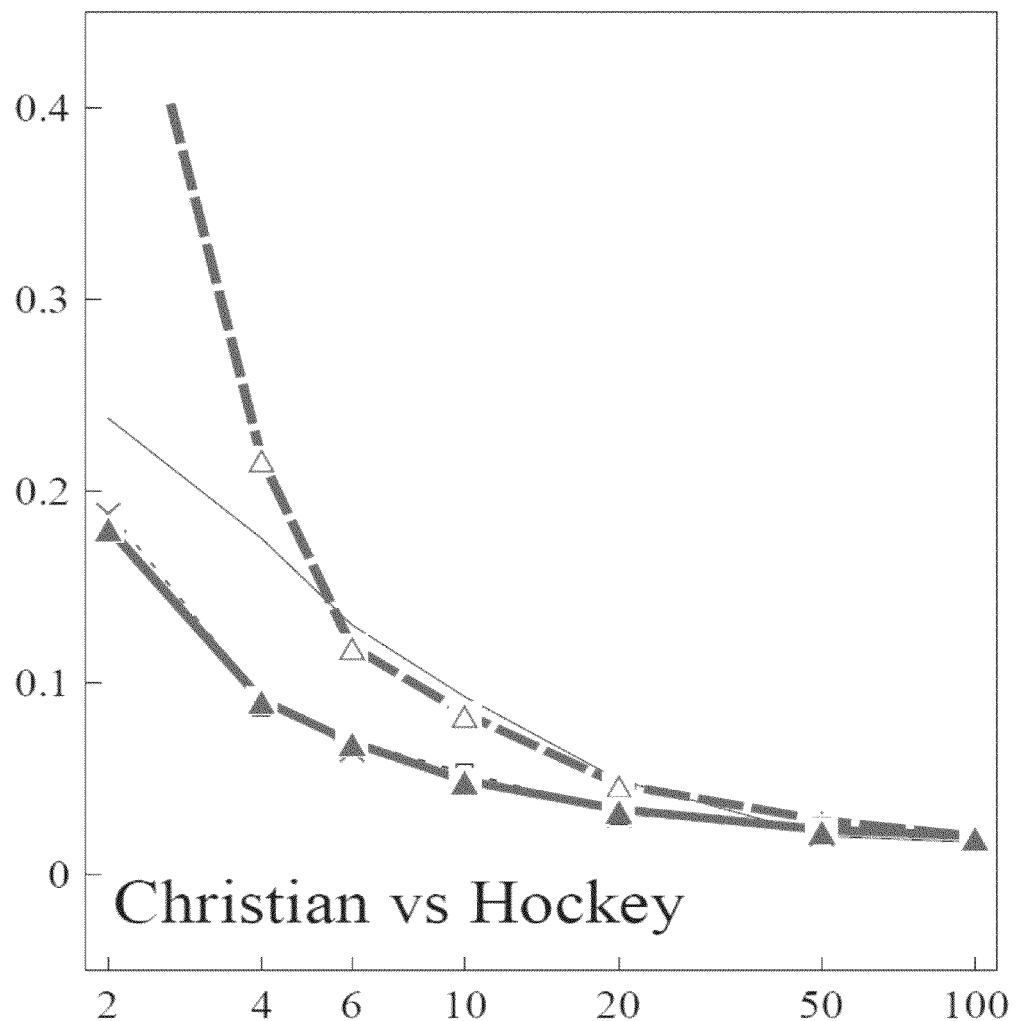
Figure 18:
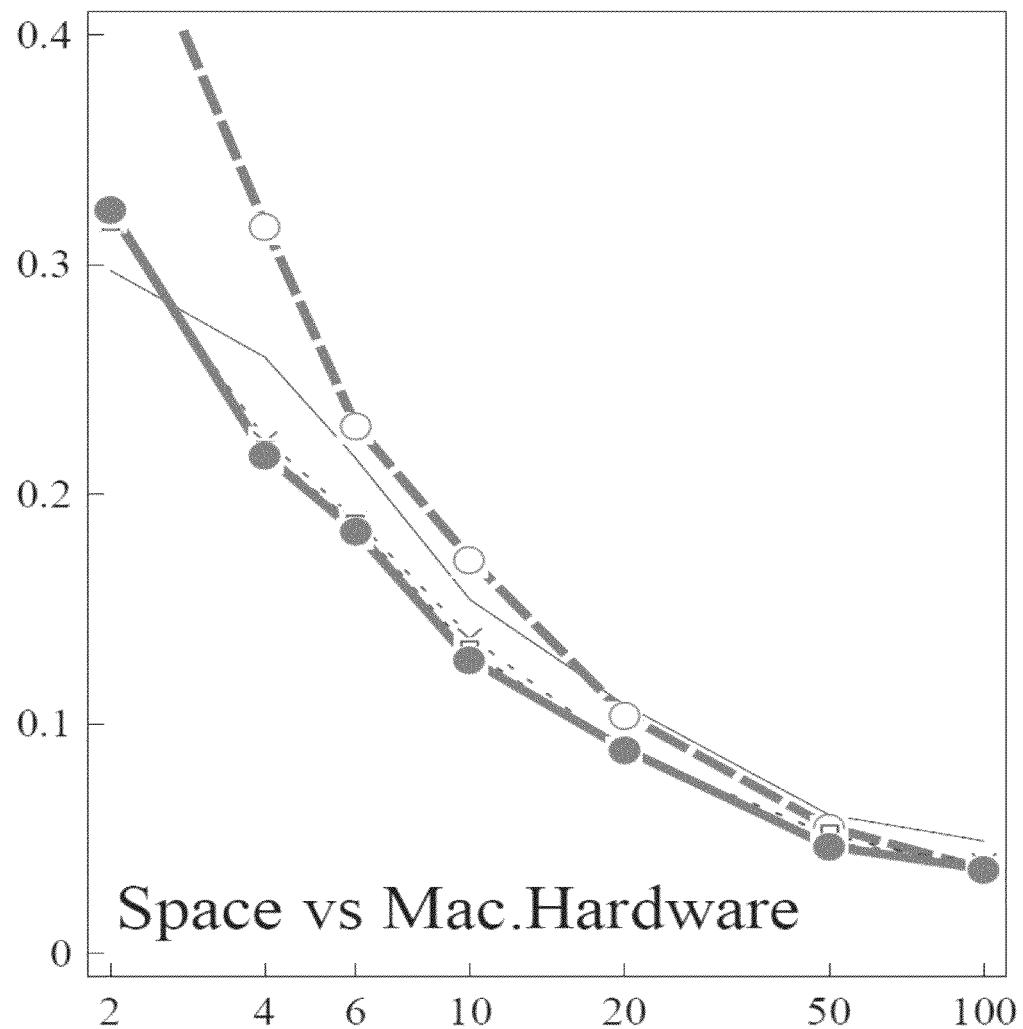
Figure 19:
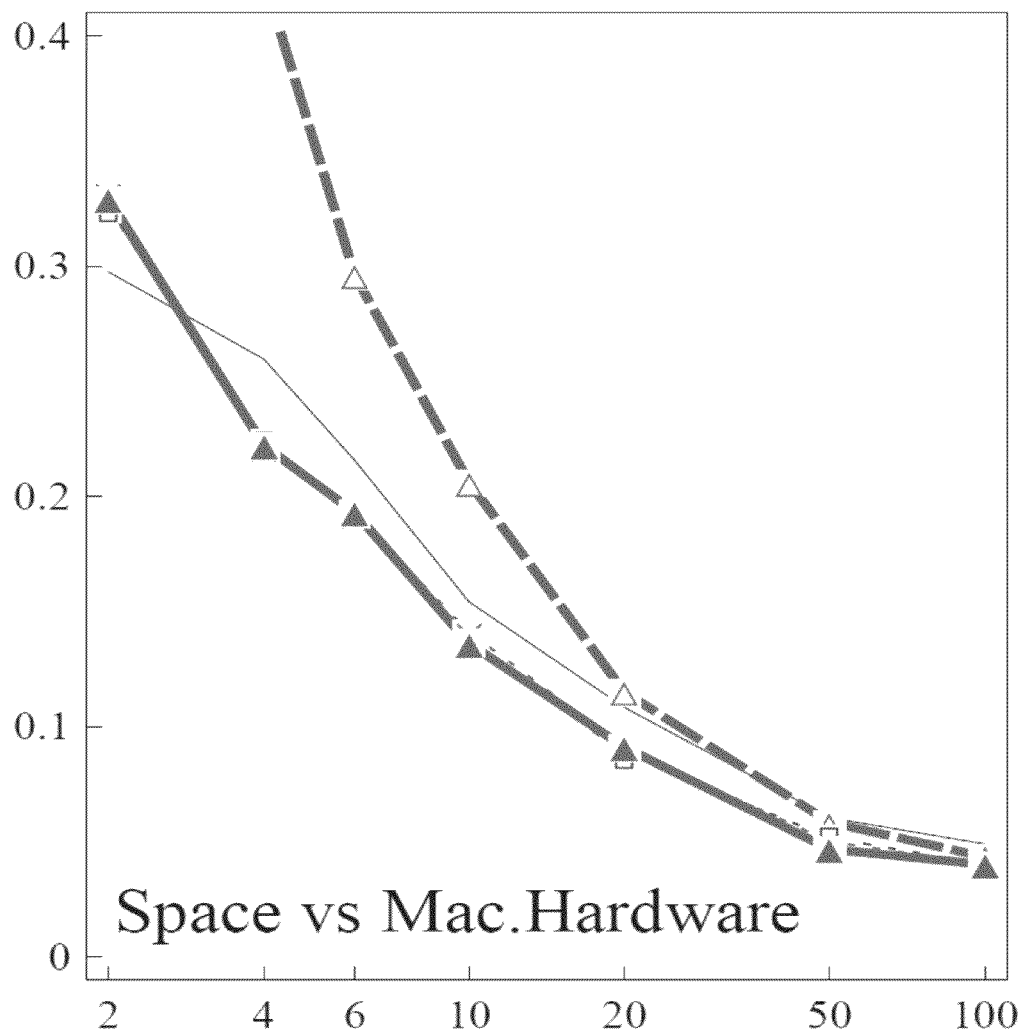
Figure 20:
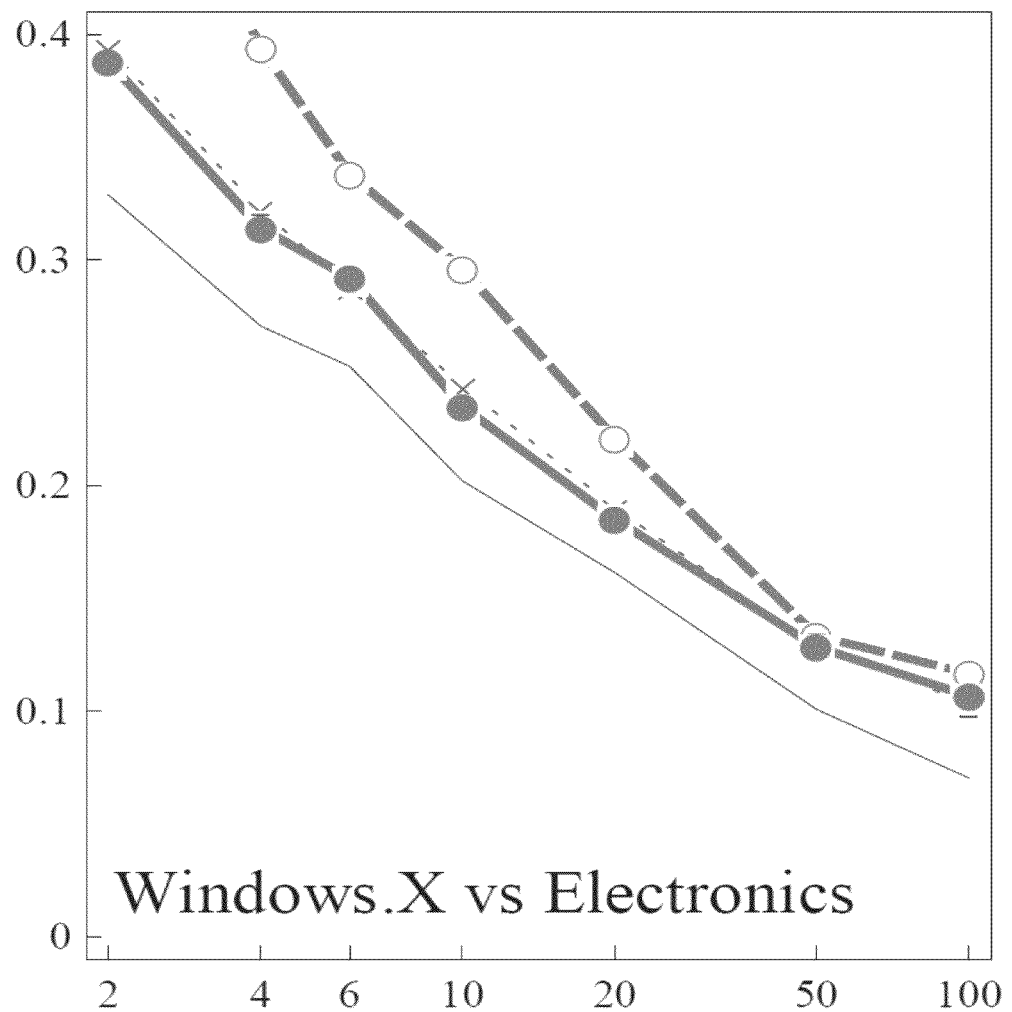
Figure 21:
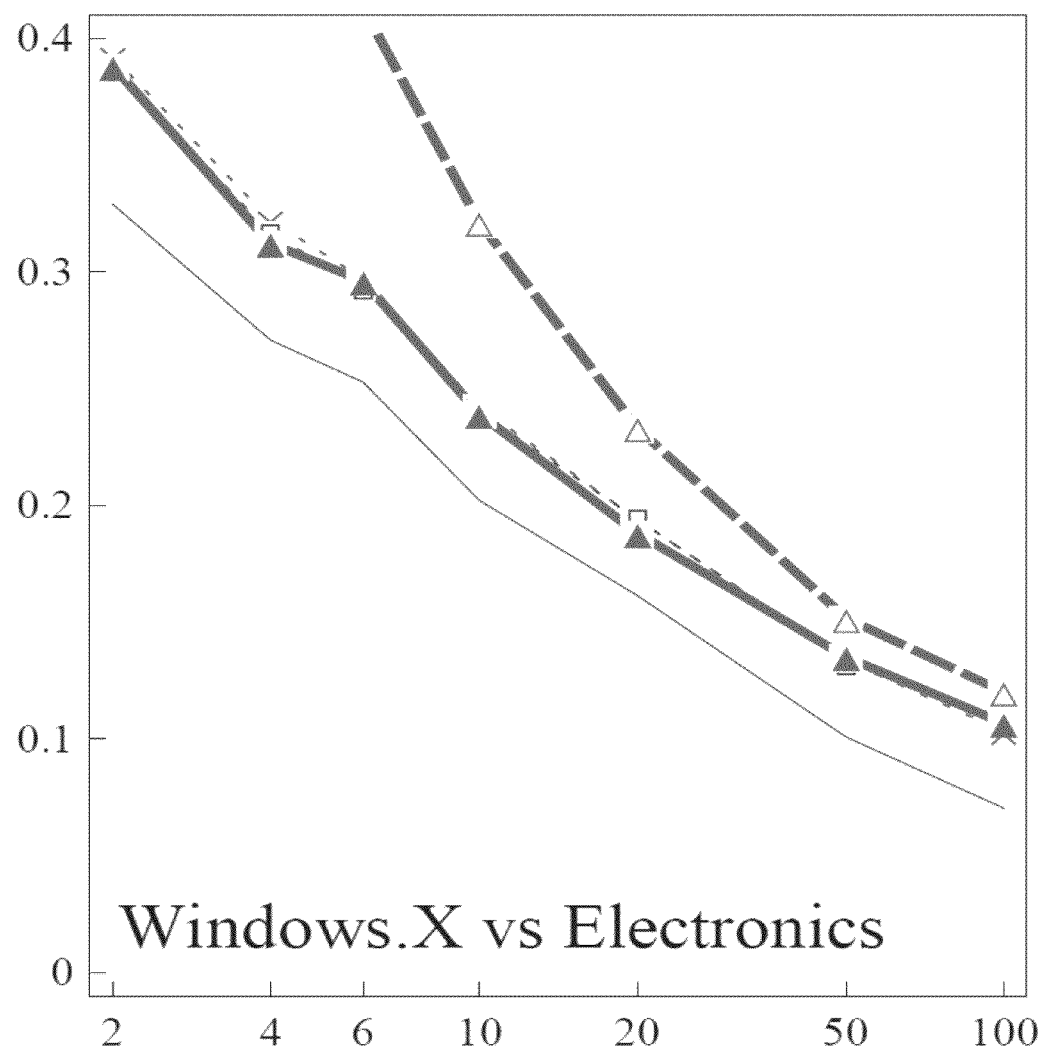
Figure 22:
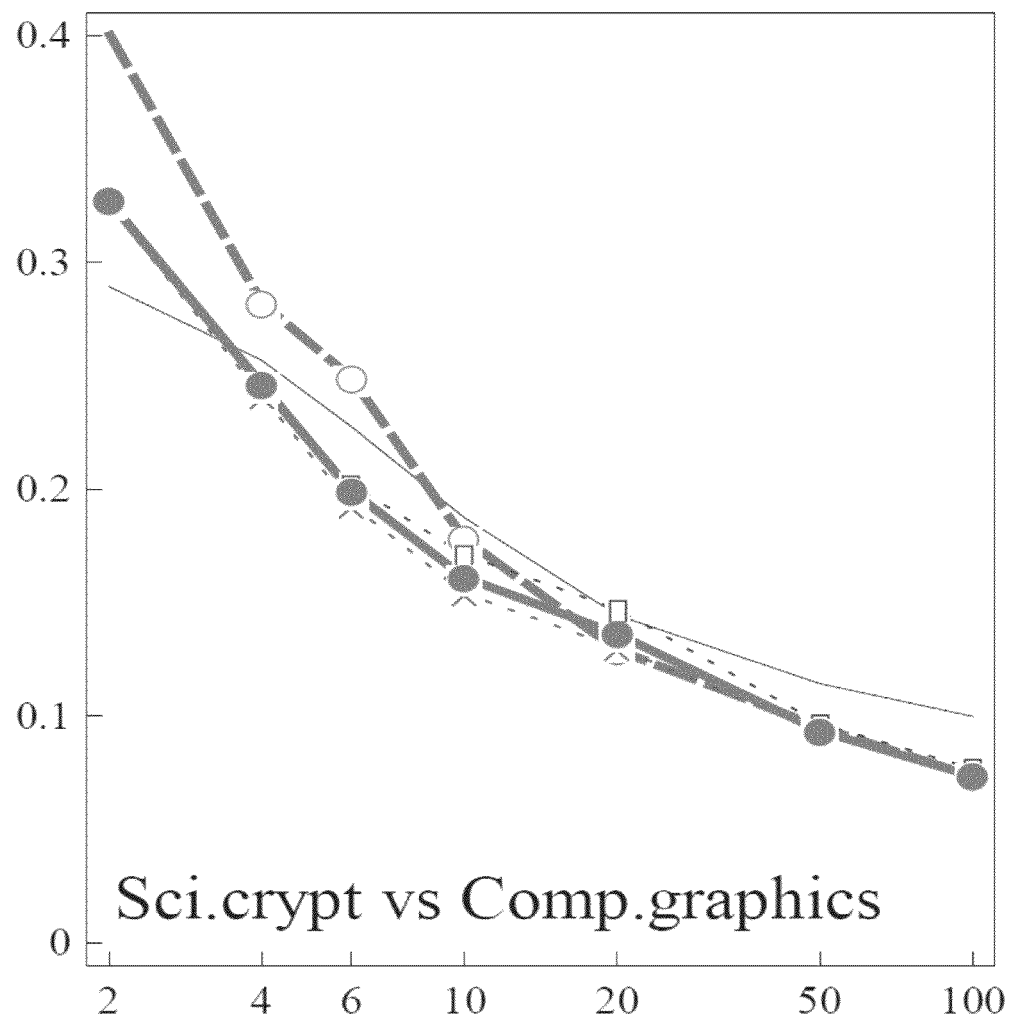
Figure 23:
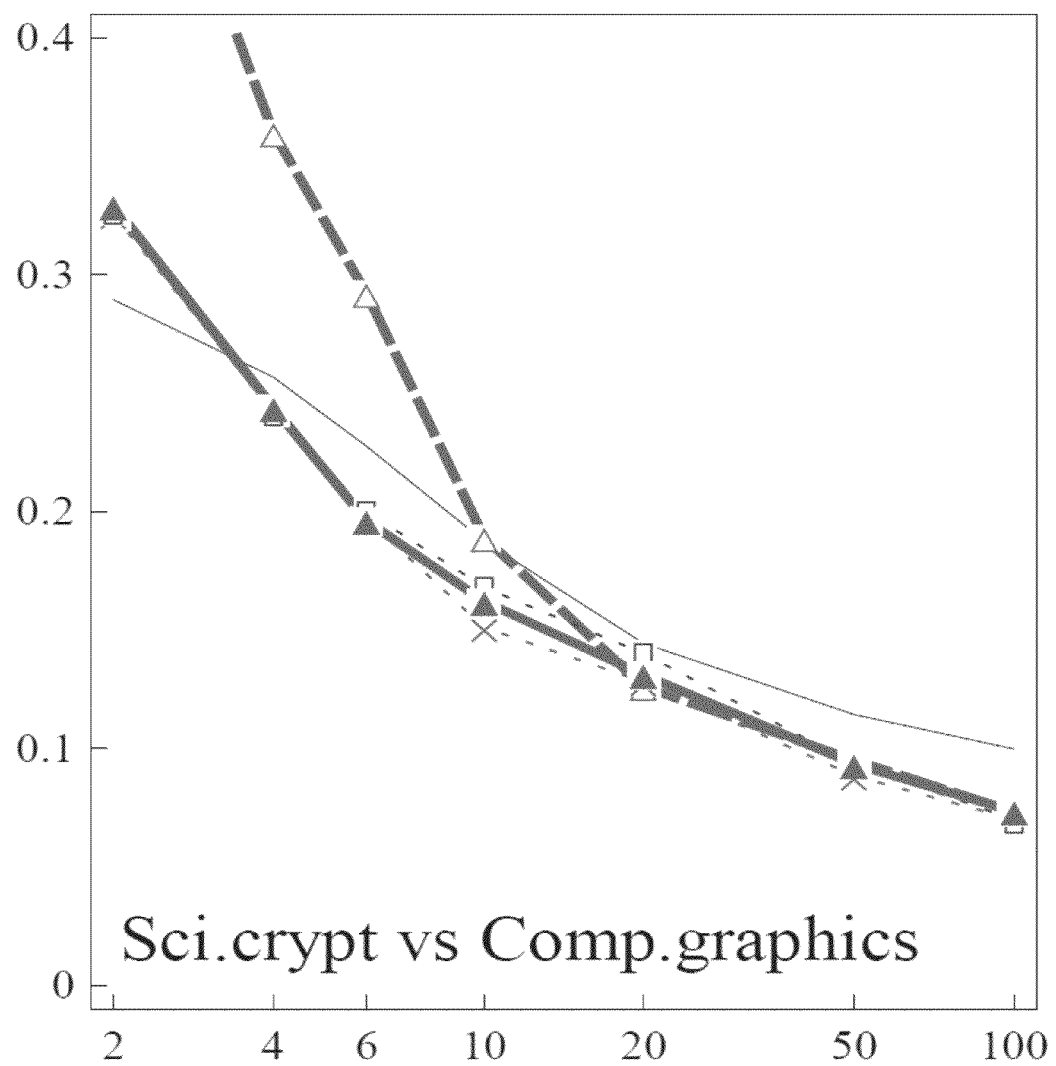
Figure 24:
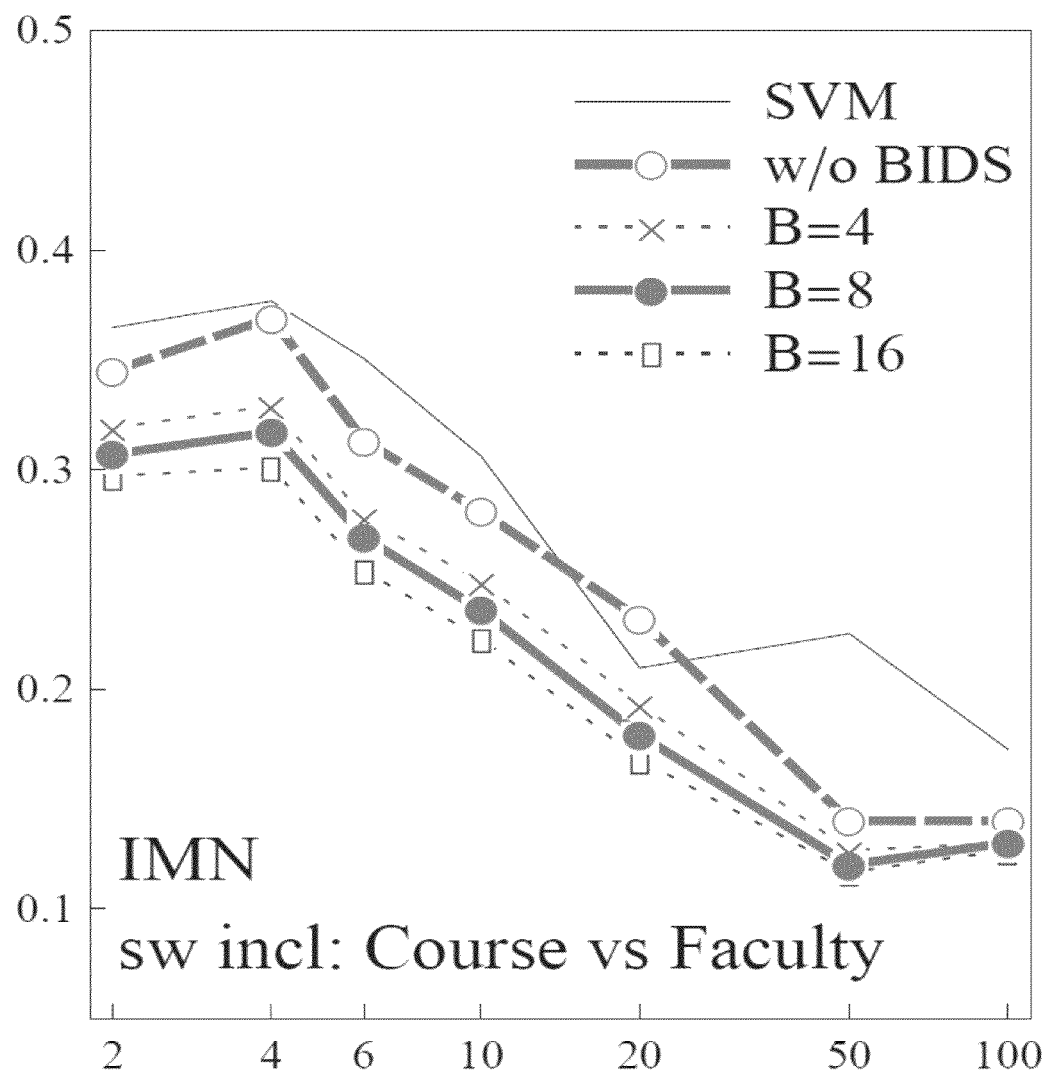
FIGS. 24 through 43 show a number of charts depicting the results for binary problems for a WebKB data set, and for the multiclass problem for both 20Newsgroups and WebKB, according to another example of the principles described herein.
Figure 25:
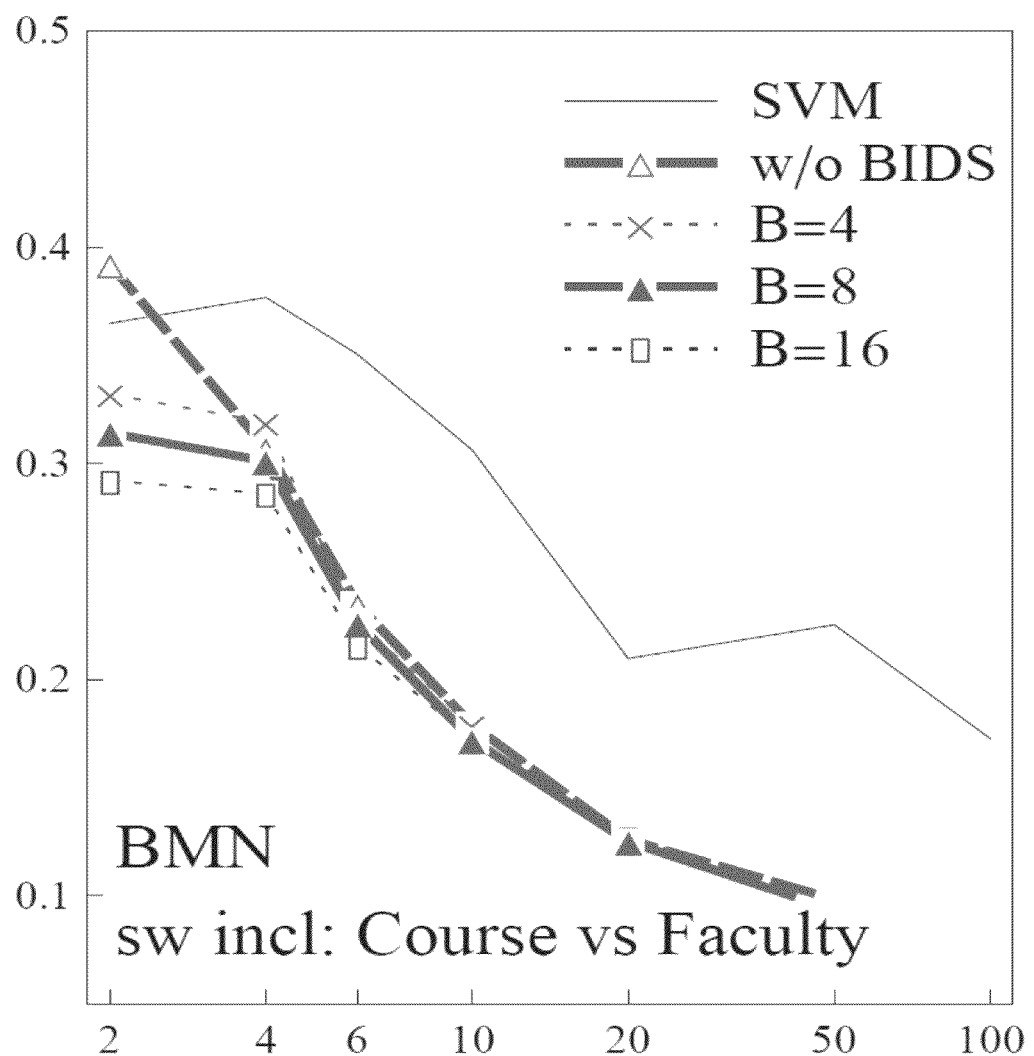
Figure 26:
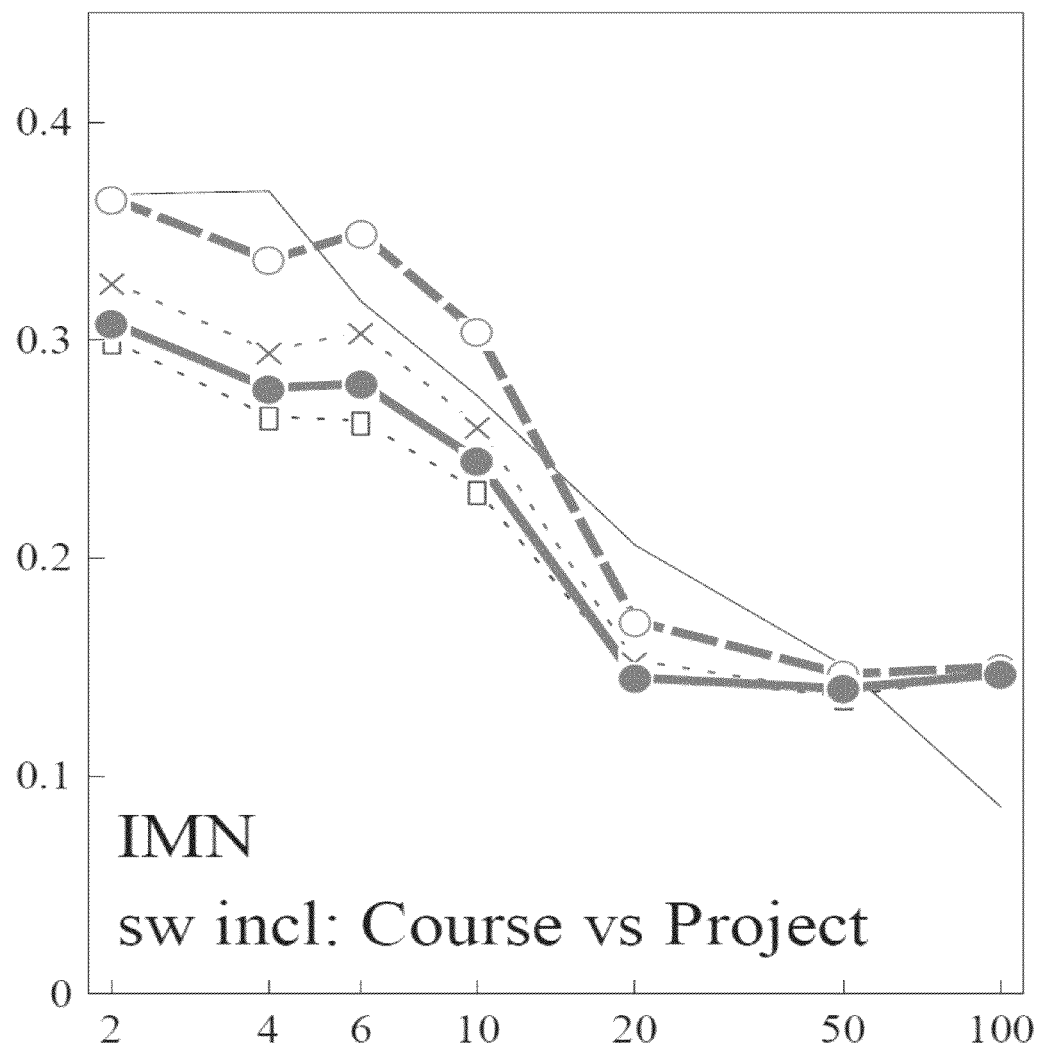
Figure 27:
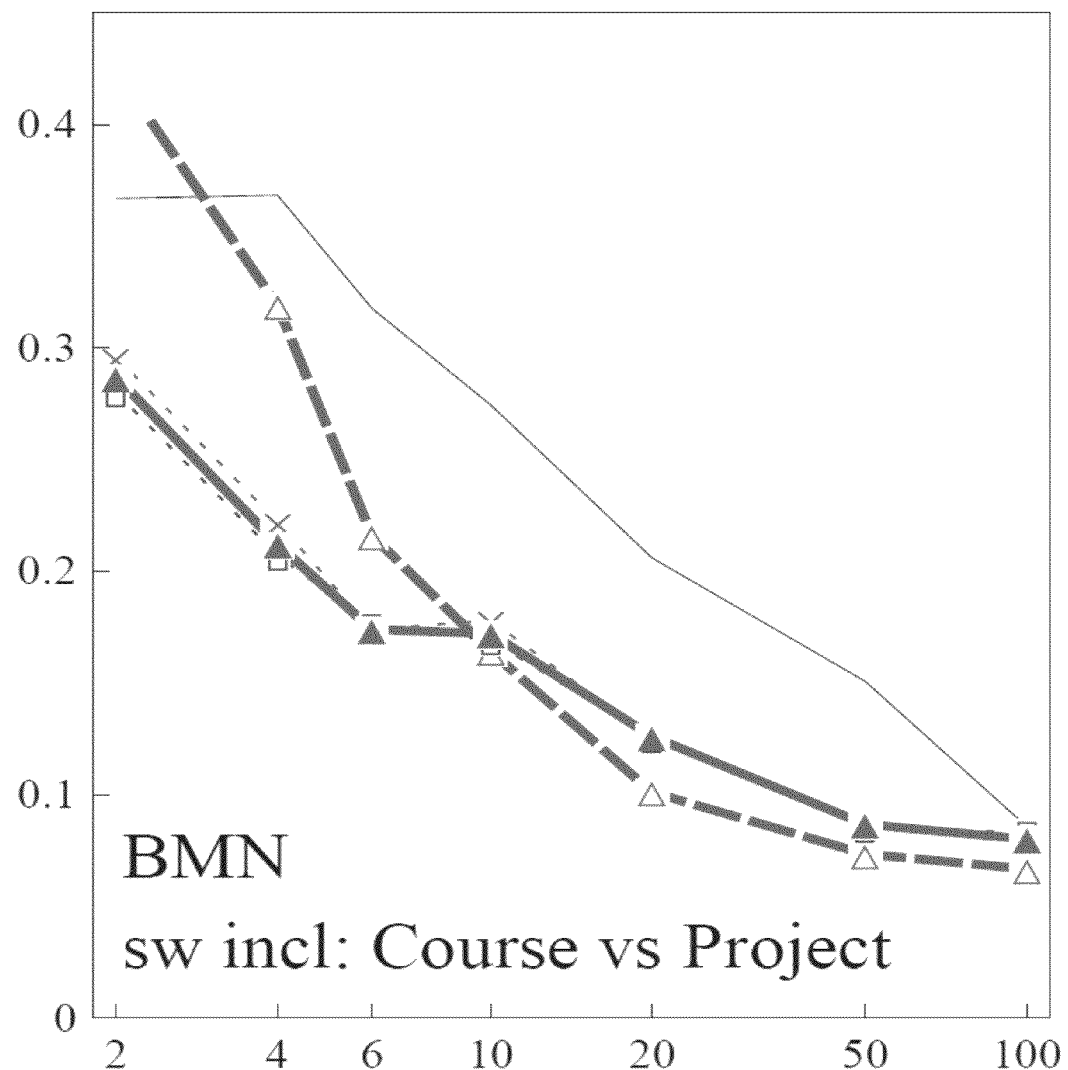
Figure 28:
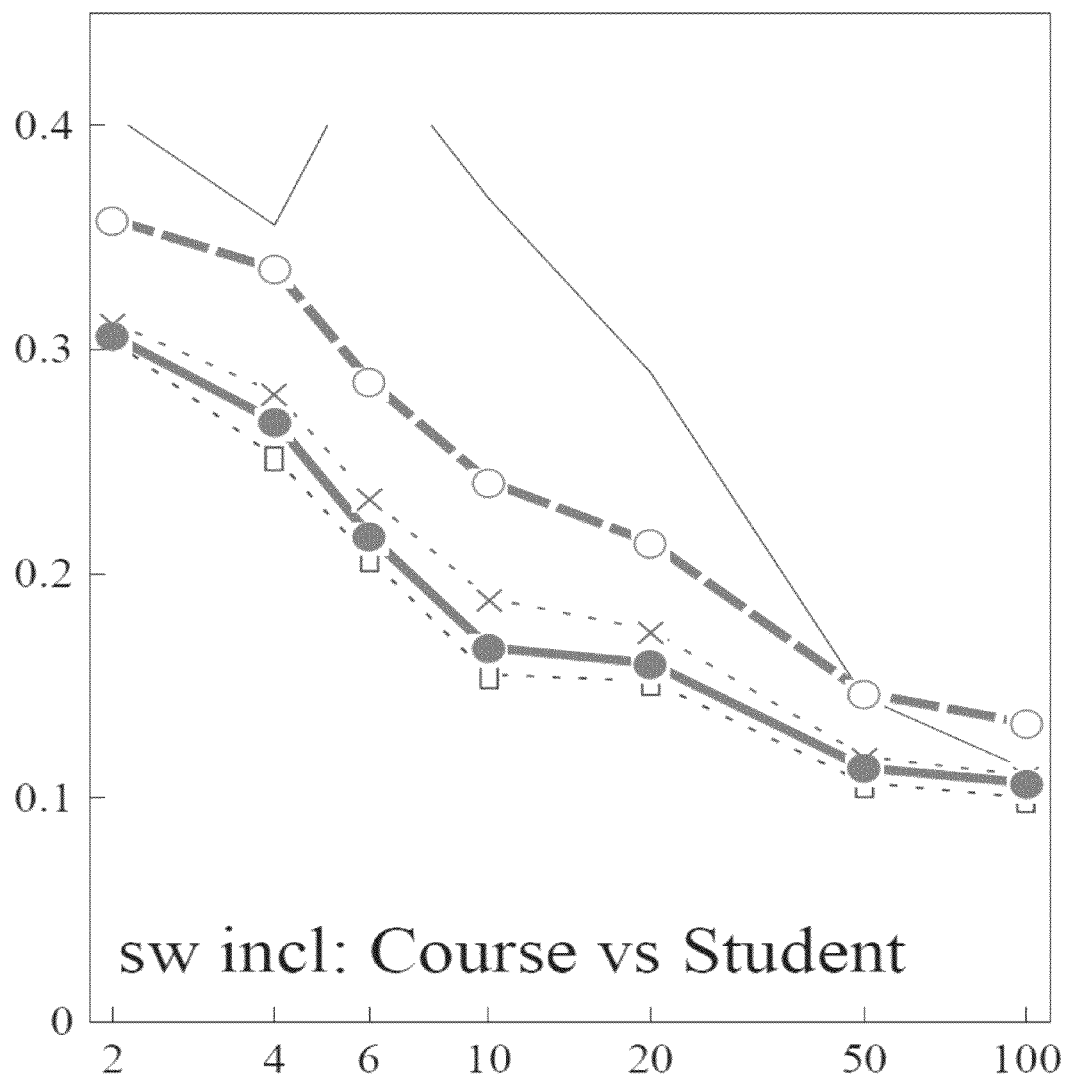
Figure 29:
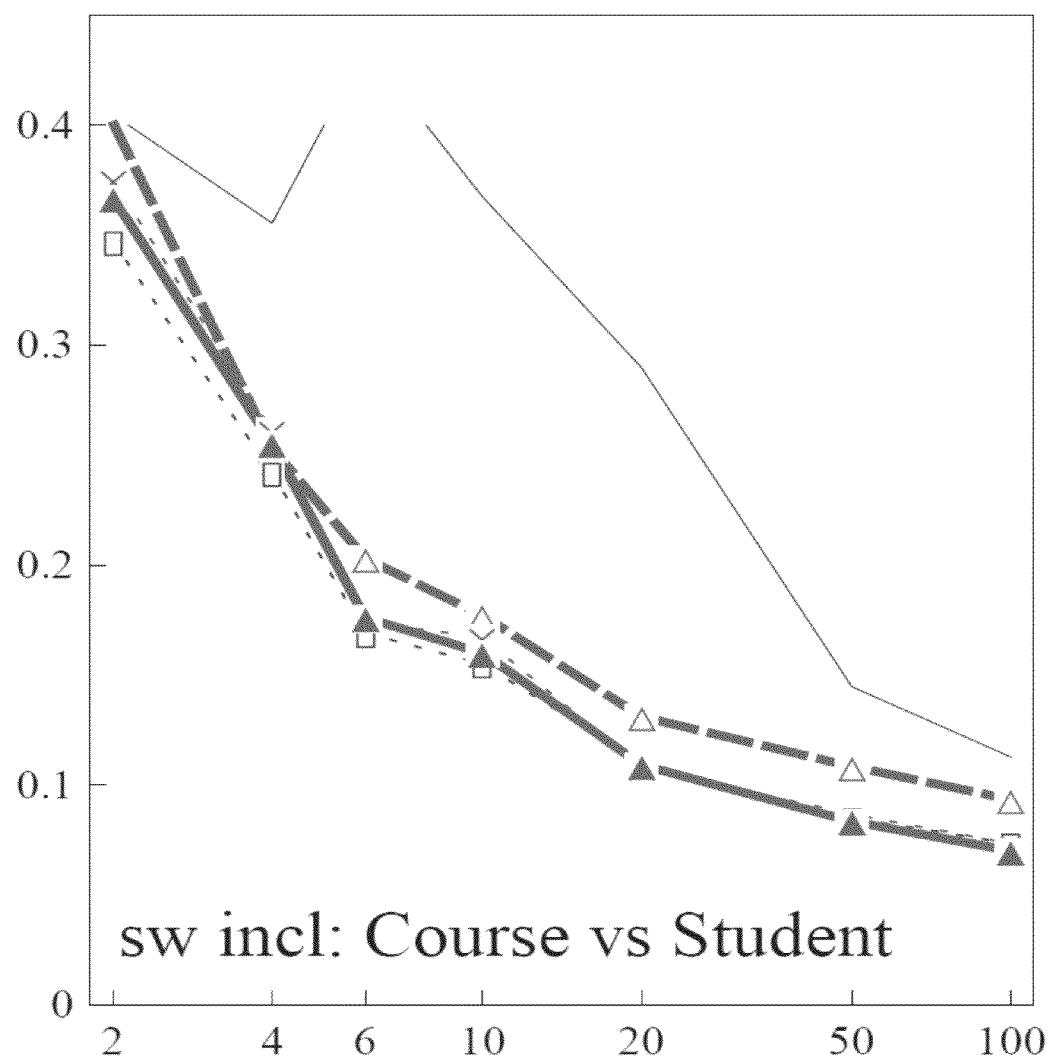
Figure 30:
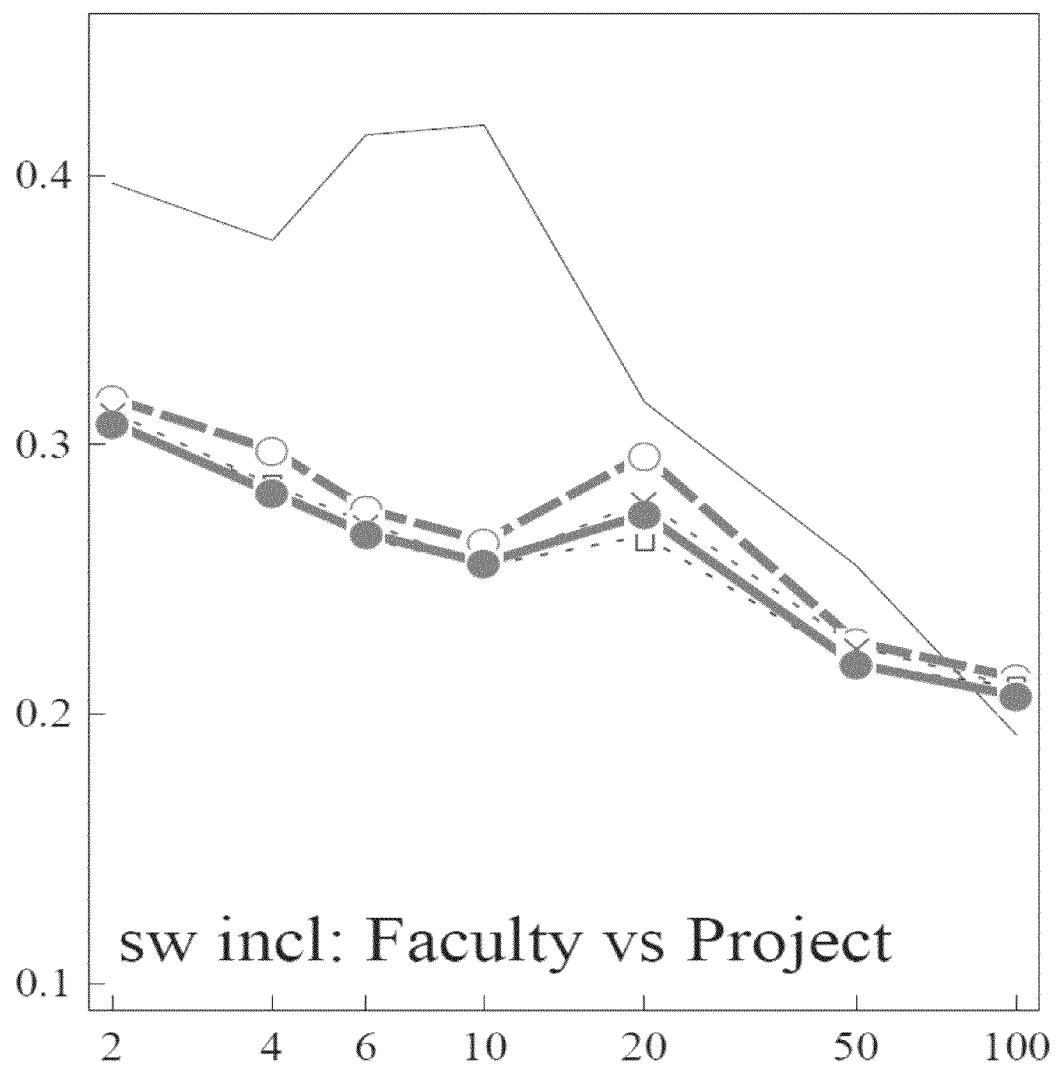
Figure 31:
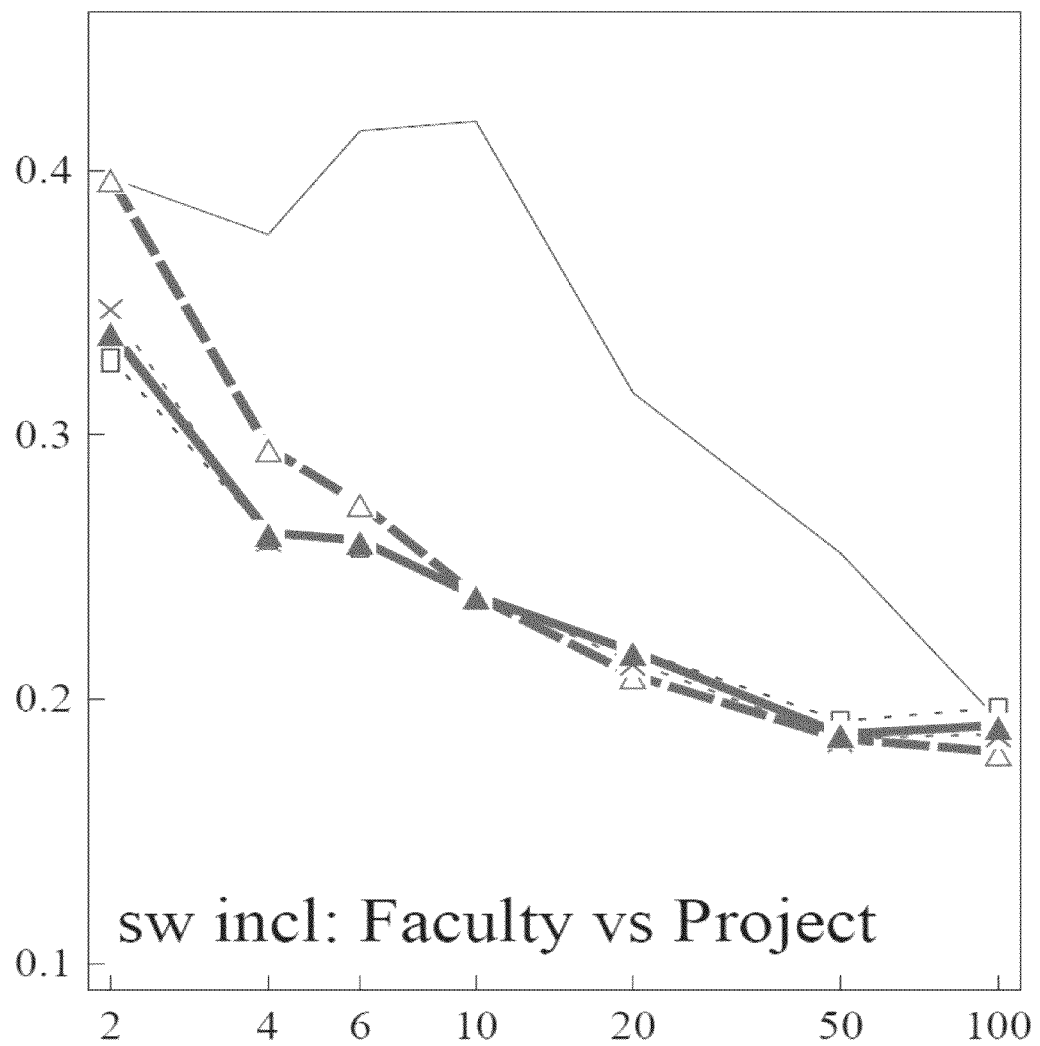
Figure 32:
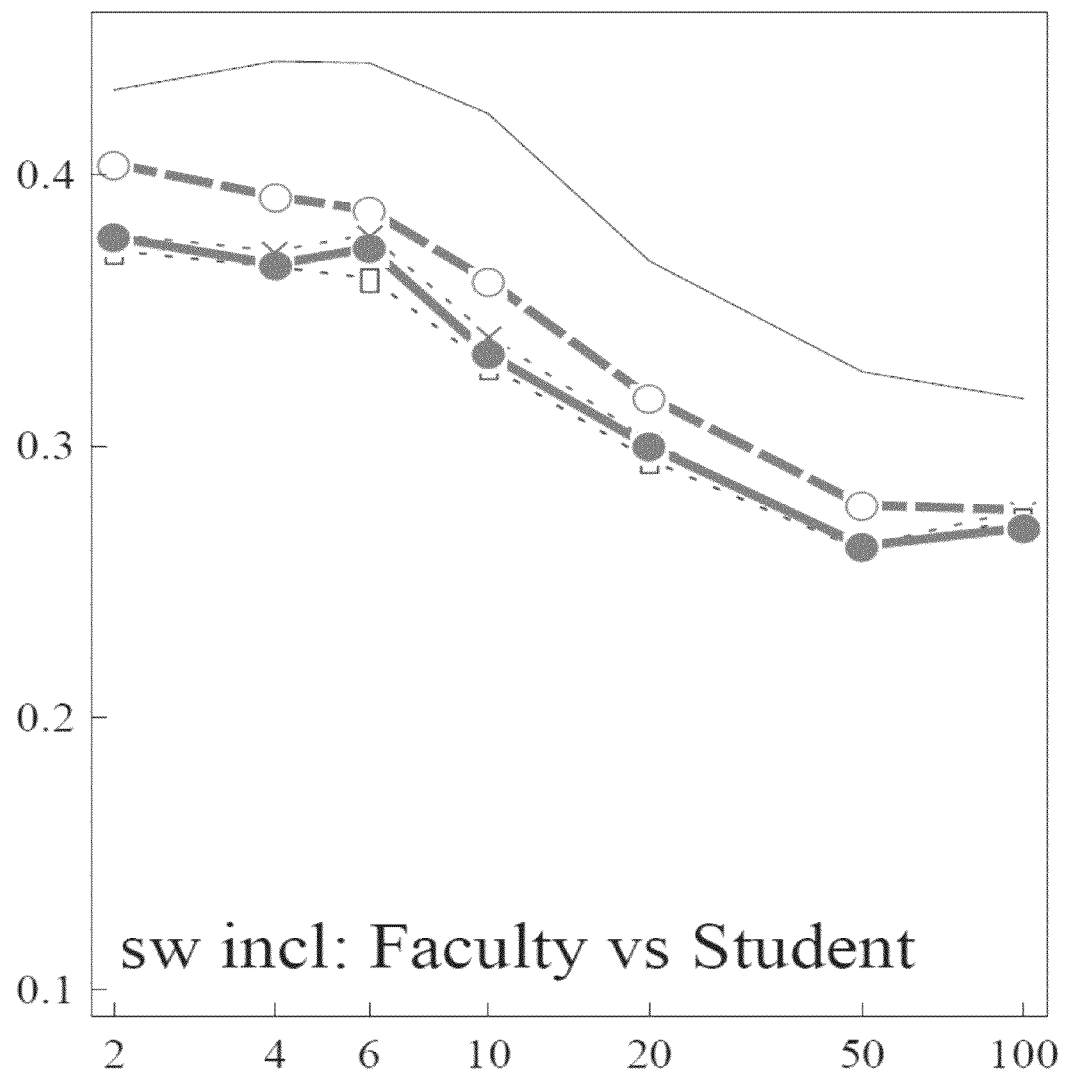
Figure 33:
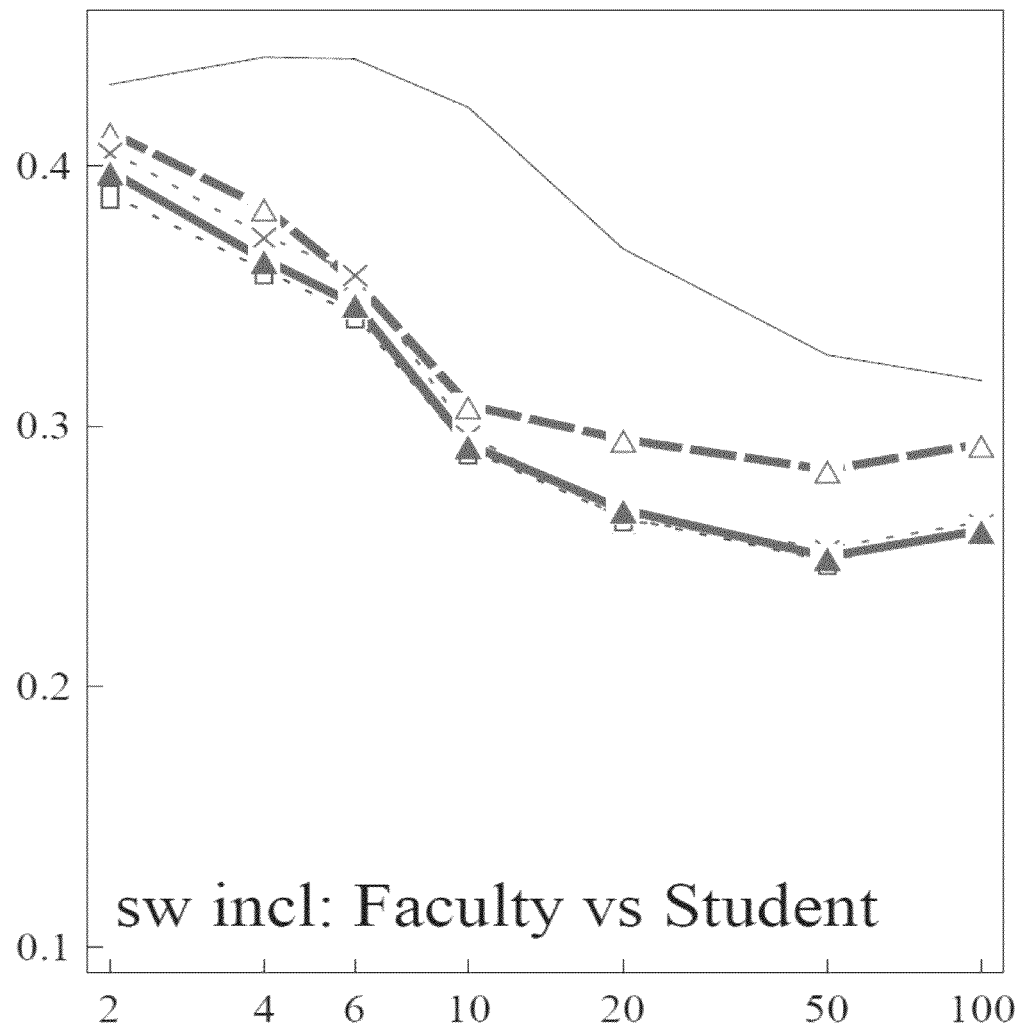
Figure 34:
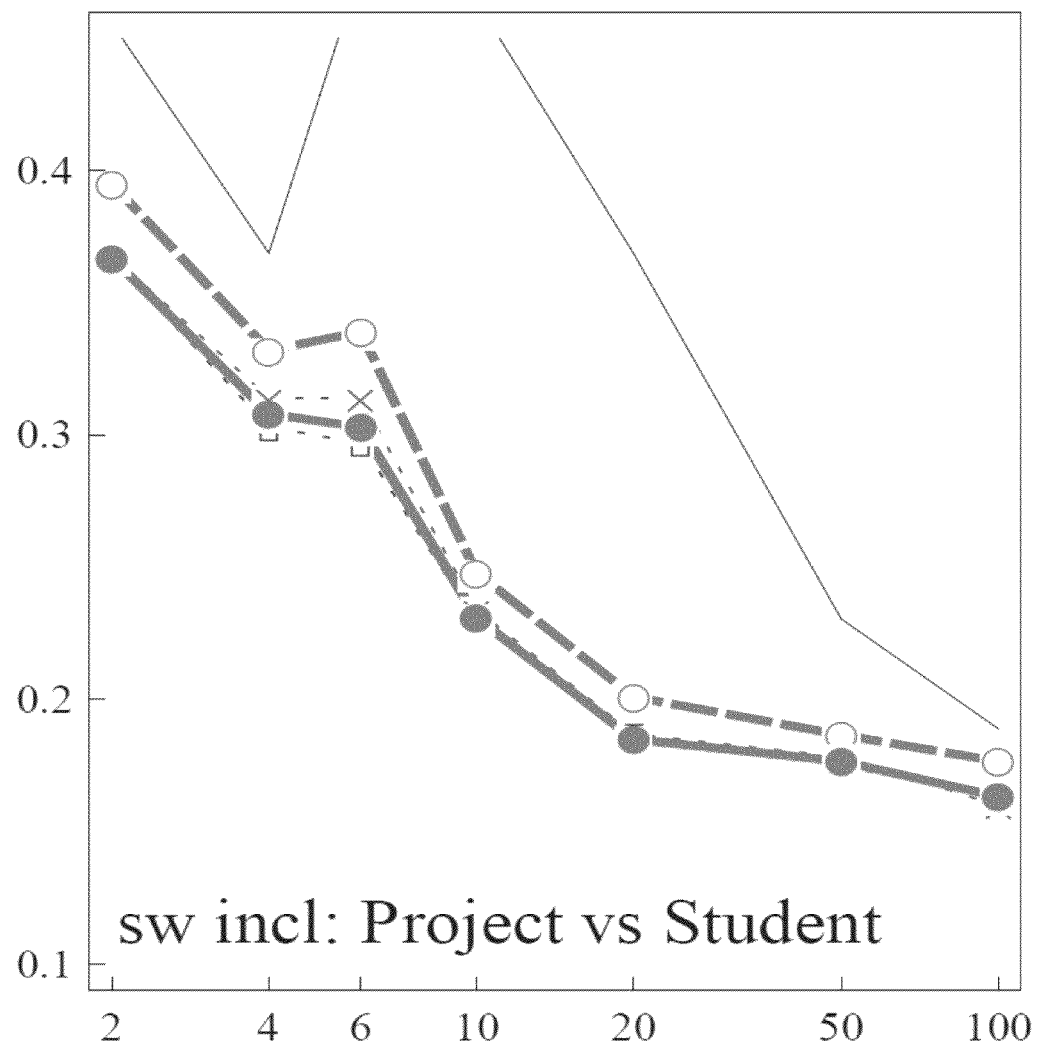
Figure 35:
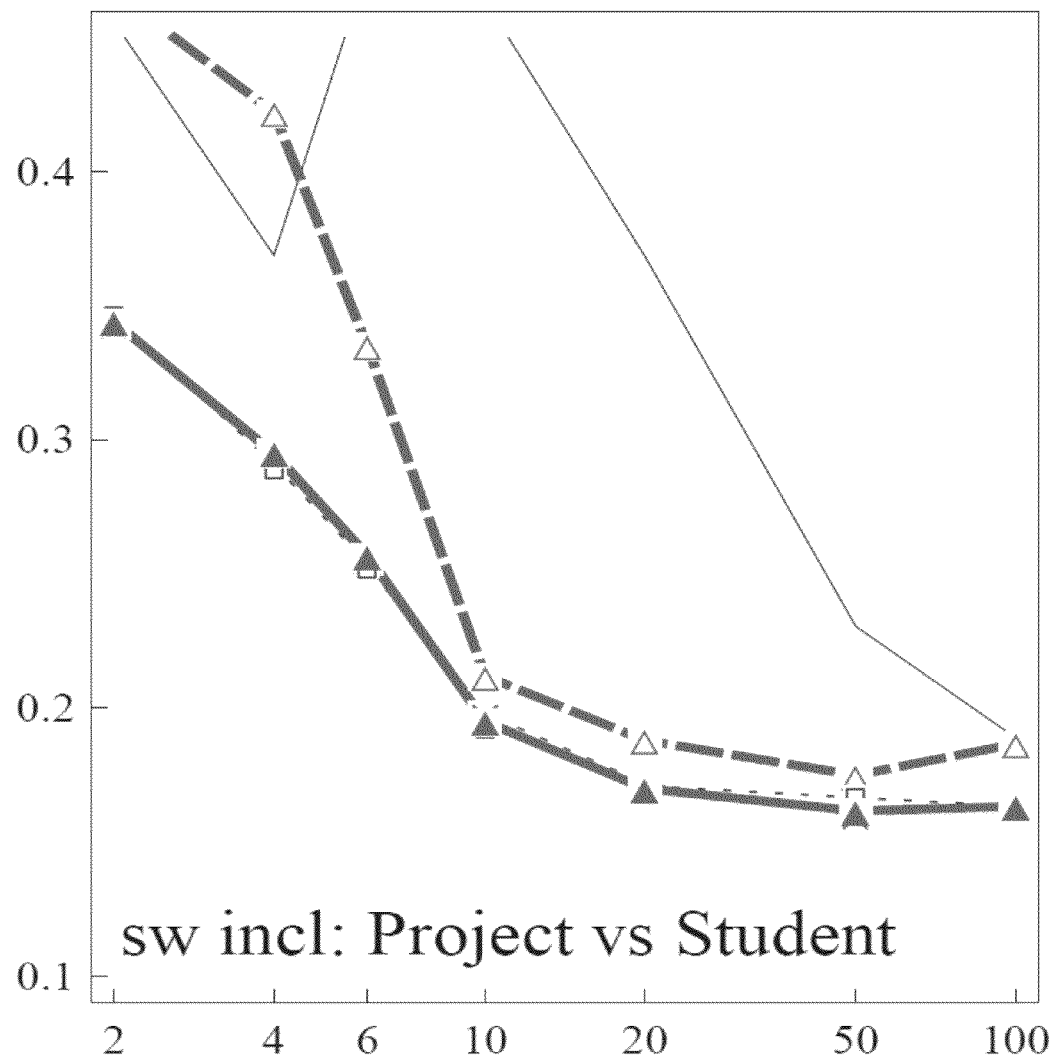

FIG. 3 is a flow chart (300) showing a method of generating training documents for training a classifying device (100), according to another example of the principles described herein. The method of FIG. 3 may begin with the processor (102) of the machine learning classifying device (100) storing (block 205) a number of original documents. The original documents may be stored in the original document database (142) of the data storage device (104). The original documents may be provided to the machine learning classifying device (100) from a user or administrator that is seeking to teach the machine learning classifying device (100). In another example, the original documents may be searched for and obtained by the machine learning classifying device (100) autonomously.

The method may proceed with the processor (102) of the machine learning classifying device (100) executing the sampling module (140) to sample (block 310) from a distribution of words in a number of original documents executing the pseudo-document creation module (150) to create (block 315) a number of pseudo-documents from the distribution of words obtained at block 310 as similarly described above in connection with FIG. 2.

The processor (102) of the machine learning classifying device (100) may execute the training module (160) to train (block 320) the machine learning classifying device (100) on how to classify test documents as they are presented for classification. Training of the machine learning classifying device (100) may be accomplished by the processor (102) executing Pseudo-code 2 described above.

The processor executes the classification module (170) to classify (block 325) a number of test documents. The test documents are those documents that a user of the machine learning classifying device (100) desires to have categorized. These documents may be received and stored by the processor (102) in the test document database (172) of the data storage device (104).

The above systems and methods were tested extensively on both binary and multiclass problems arising from two standard benchmark datasets for text classification. The first is referred to as a "20Newsgroups dataset." It contains roughly 20,000 articles posted to 20 newsgroups. The articles are more or less evenly divided between the newsgroups. For binary classification, the 10 problems that were randomly chosen by R. Raina, A. Y. Ng, and D. Koller, in their work entitled, "Constructing Informative Priors Using Transfer Learning" found in *Proceedings of the 23rd international conference on Machine learning* (Pittsburgh, Pa., 2006), ACM are used. This reference is hereby incorporated by reference in its entirety. For multiclass classification, the full set of 20 classes defined by the 20 newsgroups is used. Since each article comes with a usenet header, all headers were removed before tokenizing. The RAINBOW computer program toolkit was used to preprocess the data and also implement the Naïve Bayes classifiers. Tokens represent contiguous alphabetic characters. The stoplist supplied by RAINBOW computer program toolkit was used. Stemming was not employed. Words that appear fewer than three times in the dataset were also removed.

The second dataset is the WebKB data set described by M. Craven, D. DiPasquo, D. Freitag, A. McCallum, T. Mitchell, K. Nigam, and S. Slattery in their work entitled, "Learning to Extract Symbolic Knowledge from the World Wide Web," found in *Proceedings of the $15^{th}$ National Conference on Artificial Intelligence* (Menlo Park, Calif., USA, 1998), pp. 509-516. This reference is hereby incorporated by reference in its entirety. The WebKB data set comprises web pages gathered from computer science departments at various universities. Each page falls into one of seven categories: student, faculty, staff, course, project, department, and other. Previous studies have used only the four most populous categories, student, faculty, course, and project, and the below experiments do the same. These four categories consist of 4,199 web pages total. Since there are only four categories, all six binary classification problems are used, and the single multiclass classification problem resulting from using all four categories.

With regard to stoplisting the WebKB dataset, it has been reported that stoplisting can hurt the accuracy of classifiers on WebKB because some stoplisted words such as, for example, the word "my," have high information gain with respect to certain categories such as, for example, the "student" category. To be methodologically rigorous, the experiments are performed both with and without stoplisting. To save space, we show the individual binary classification problems without stoplisting, but show averages for both cases without and with stoplisting.

Since the present experiments focus on training with very scarce data, training data sizes used include [2; 4; 6; 10; 20; 50; 100] on all experiments; binary as well as multiclass. This may reflect real-world enterprise text classification scenarios. The training data for 20Newsgroups is chosen at random from the "training" split of the dataset, and the entire "testing" split is used for testing. On the WebKB corpus, training documents are chosen at random from "Cornell," "Texas," "Washington," and "Wisconsin," and are tested on "Miscellaneous" so as not to over easy instances. Each experiment is run 10 times and the average over the 10 runs are reported. On all experiments, the results are expressed in terms of accuracy of class prediction.

The Reuter's dataset is not used since a high accuracy of binary classification is returned on it even with very limited training data. Thus, Reuter's dataset does not reflect real world enterprise data in this regard.

Finally, a linear support vector machine (SVM) is used as a benchmark. SVMs generally offer the best accuracy in text classification, and linear SVMs are almost as accurate as those with more complex kernels for this task. The SVM-LIGHT package developed at Cornell University was used for the experiments. For tuning, the single "penalty factor" C is varied through the values $[10^{-4}; 10^{-3}; 10^{-2}; 10^{-1}; 1; 10^1; 10^2; 10^3; 10^4]$ and adopt the value with the highest accuracy.

The effect of BIDS was tested extensively on both binary and multiclass problems as detailed above. The results for the binary problems in 20Newsgroups and WebKB, are shown graphically in FIGS. 4 through 49. Throughout FIGS. 4 through 49, the x-axis of the graphs indicates the size of the training set, drawn in log scale. Specifically, the x-axis of FIGS. 4 through 49 depict training data sizes of 2; 4; 6; 10; 20; 50; and 100. The y-axis of FIGS. 4 through 49 indicate the error as a fraction of the test set (i.e., error rate). Specifically, the y-axis of FIGS. 4 through 49 depicts values of 0, 0.1, 0.2, 0.3, and 0.4. Individual graphs are shown in order to demonstrate the consistency of BIDS.

Figure 42:
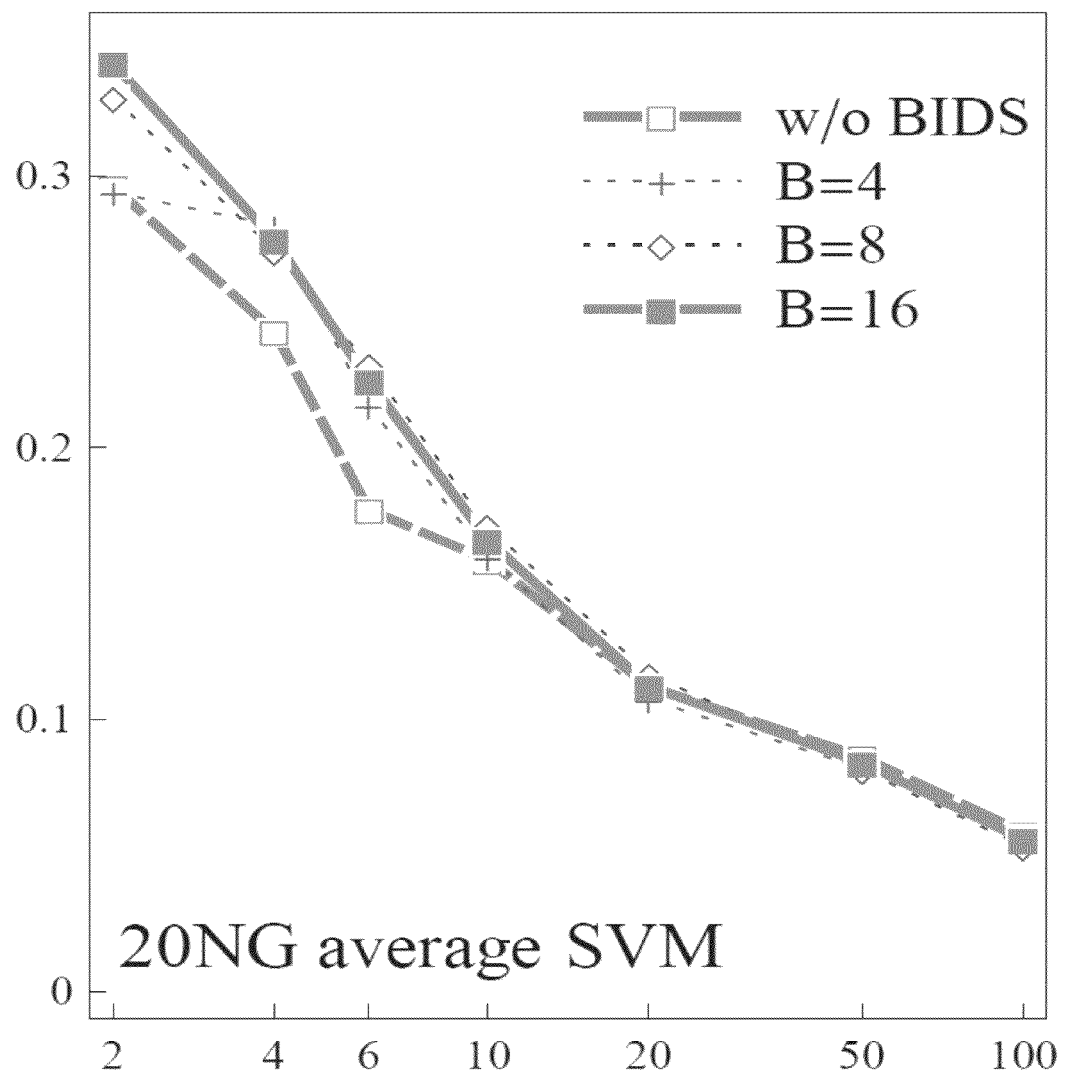
Figure 43:
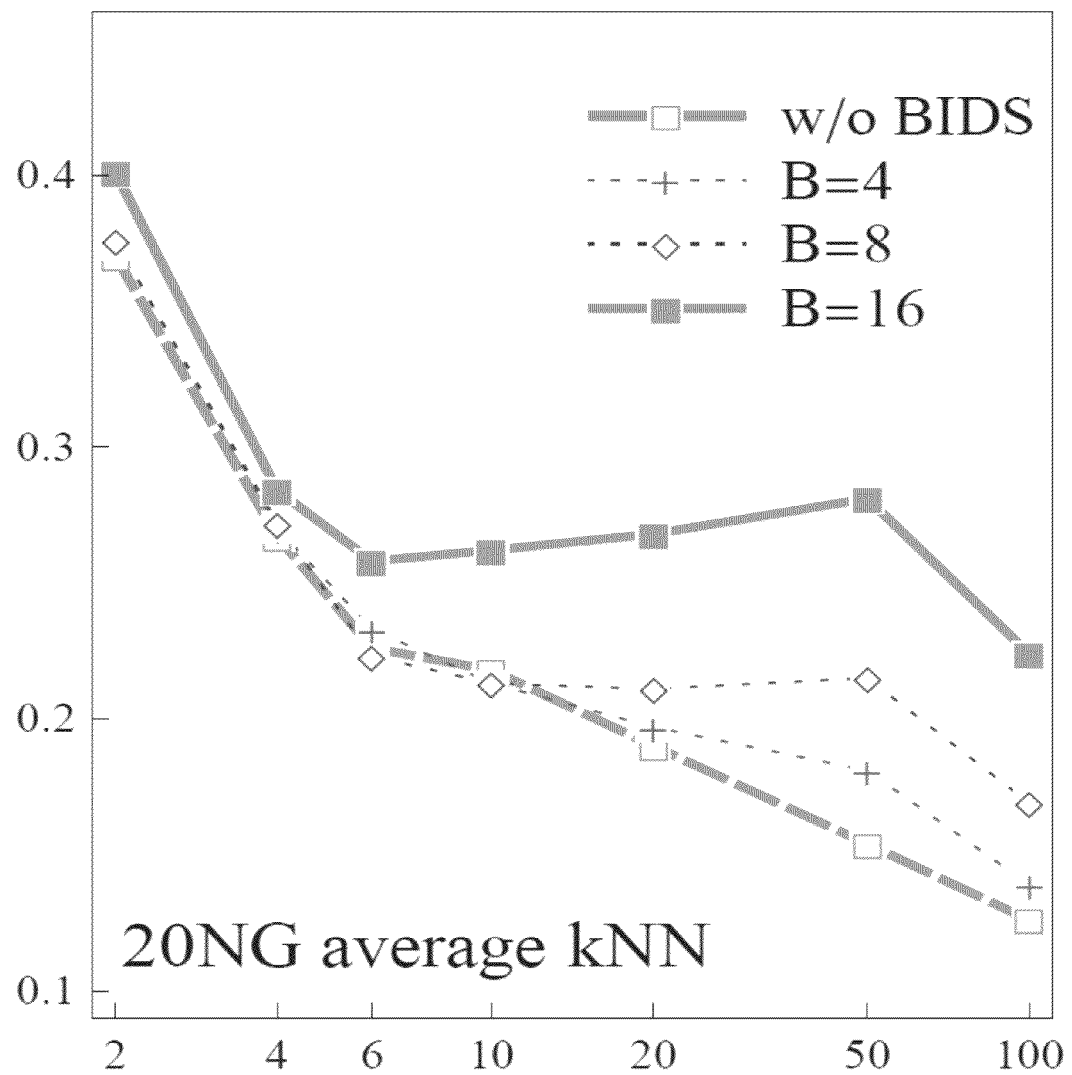

Further, throughout FIGS. 4 through 49, the solid line indicates the linear SVM, and is drawn for comparison to the experimental results of the present disclosure; the linear SVM being a benchmark as described above. IMN-BMN experiments pairs are depicted in alternating figures for comparison purposes. Thus, FIGS. 4, 6, 8, 10, 12, 14, 16, 18, 20, 22, 24, 26, 28, 30, 32, 34, 36, 38, 40, 44, 46, and 48, referred to as the "even figures," depict IMN event models. Similarly, FIGS. 5, 7, 9, 11, 13, 15, 17, 19, 21, 23, 25, 27, 29, 31, 33, 35, 37, 39, 41, 45, 47, and 49, referred to as the "odd figures," are the BMN model event pairs of their respective IMN event models. The remaining figures, FIGS. 42 and 43, depict SVM and kNN classifiers, respectively, both with and without BIDS as indicated by the legends.

FIGS. 4 through 23 specifically show a number of charts depicting the results for binary problems for a 20Newsgroups data set, according to an example of the principles described herein. FIGS. 4 through 23 depict the IMN and BMN event models both without BIDS and with BIDS[D,B] for B=[4, 8, 16] for the 10 binary problems chosen from 20Newsgroups data set as described above. In the even figures of FIGS. 4 through 23, the IMN event model not utilizing BIDS is depicted as a solid line with open circles. Further, in the even figures, the IMN event model utilizing BIDS for B=4 is depicted with a dotted line with x's. Still further, in the even figures, the IMN event model utilizing BIDS for B=8 is depicted with a solid line with closed circles. Even further, in the even figures, the IMN event model utilizing BIDS for B=16 is depicted with a dotted line with open squares.

Similarly, in the odd figures of FIGS. 4 through 23, the BMN event model not utilizing BIDS is depicted as a solid line with open triangles. Further, in the odd figures, the BMN event model utilizing BIDS for B=4 is depicted with a dotted line with x's. Still further, in the odd figures, the BMN event model utilizing BIDS for B=8 is depicted with a solid line with closed triangles. Even further, in the odd figures, the BMN event model utilizing BIDS for B=16 is depicted with a dotted line with open squares.

FIGS. 24 through 43 show a number of charts depicting the results for binary problems for a WebKB data set, and for the multiclass problem for both 20Newsgroups and WebKB, according to another example of the principles described herein. Specifically, FIGS. 24 through 35 depict the IMN and BMN event models both without BIDS and with BIDS[D,B] for B=[4, 8, 16] for the 6 binary problems chosen from the WebKB data set as described above.

In the even figures of FIGS. 24 through 35, the IMN event model not utilizing BIDS is depicted as a solid line with open circles. Further, in the even figures, the IMN event model utilizing BIDS for B=4 is depicted with a dotted line with x's. Still further, in the even figures, the IMN event model utilizing BIDS for B=8 is depicted with a solid line with closed circles. Even further, in the even figures, the IMN event model utilizing BIDS for B=16 is depicted with a dotted line with open squares.

Similarly, in the odd figures of FIGS. 24 through 35, the BMN event model not utilizing BIDS is depicted as a solid line with open triangles. Further, in the odd figures, the BMN event model utilizing BIDS for B=4 is depicted with a dotted line with x's. Still further, in the odd figures, the BMN event model utilizing BIDS for B=8 is depicted with a solid line with closed triangles. Even further, in the odd figures, the BMN event model utilizing BIDS for B=16 is depicted with a dotted line with open squares.

Figure 36:
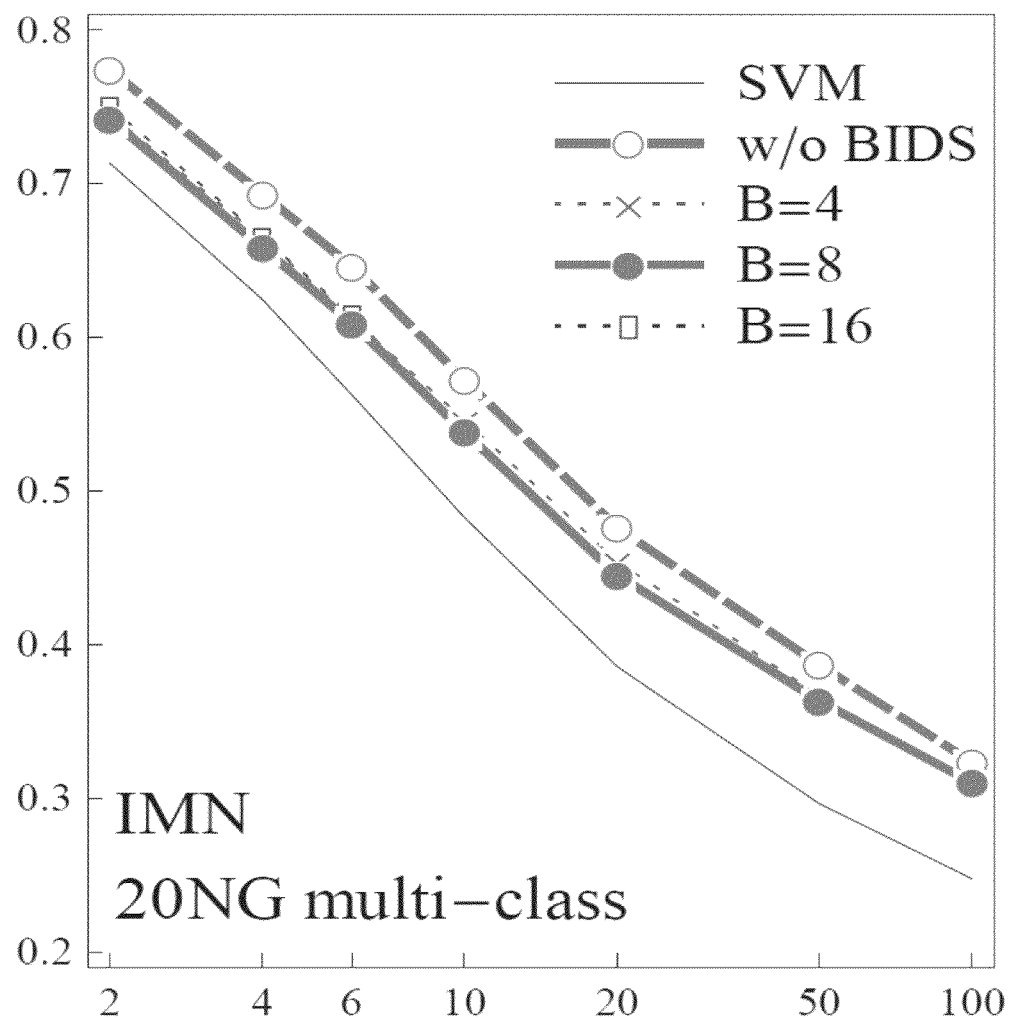
Figure 37:
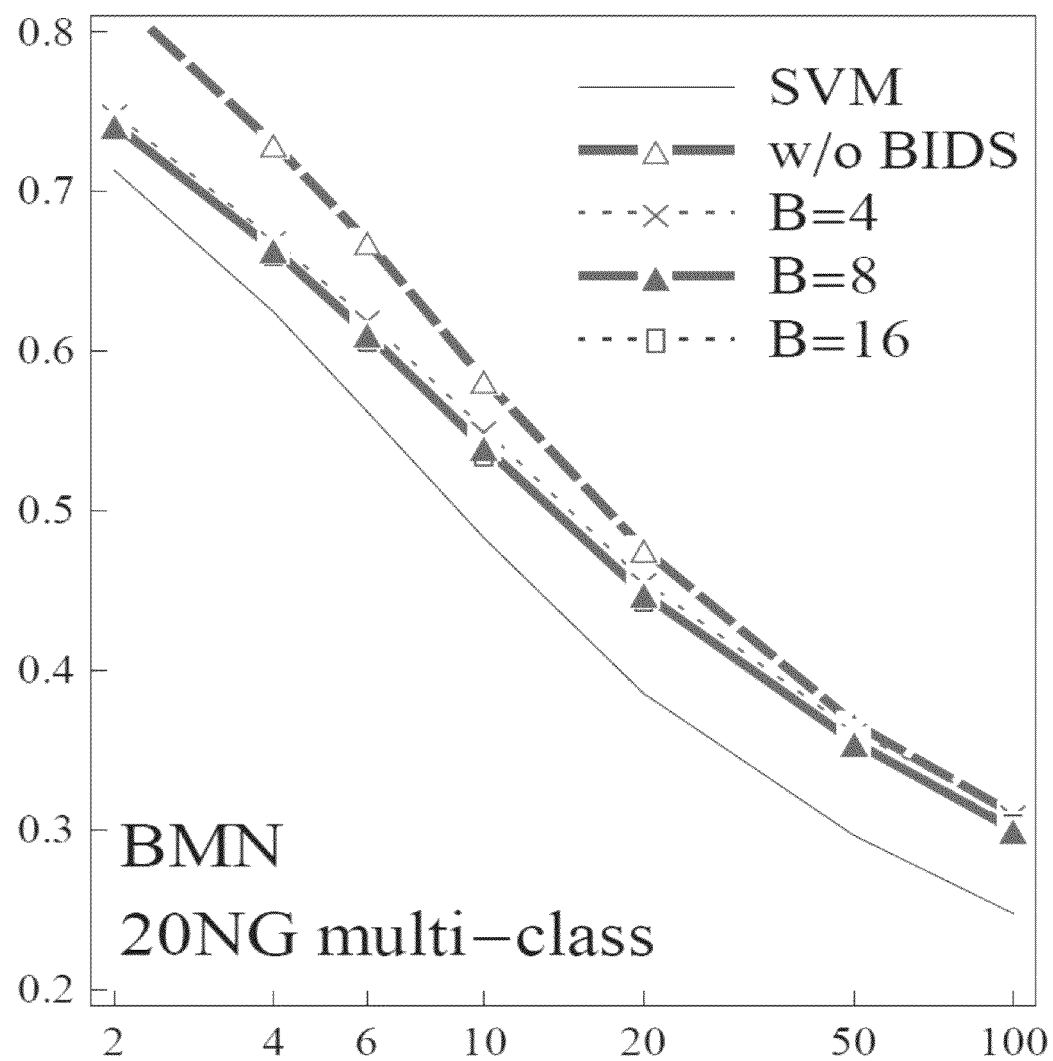
Figure 38:
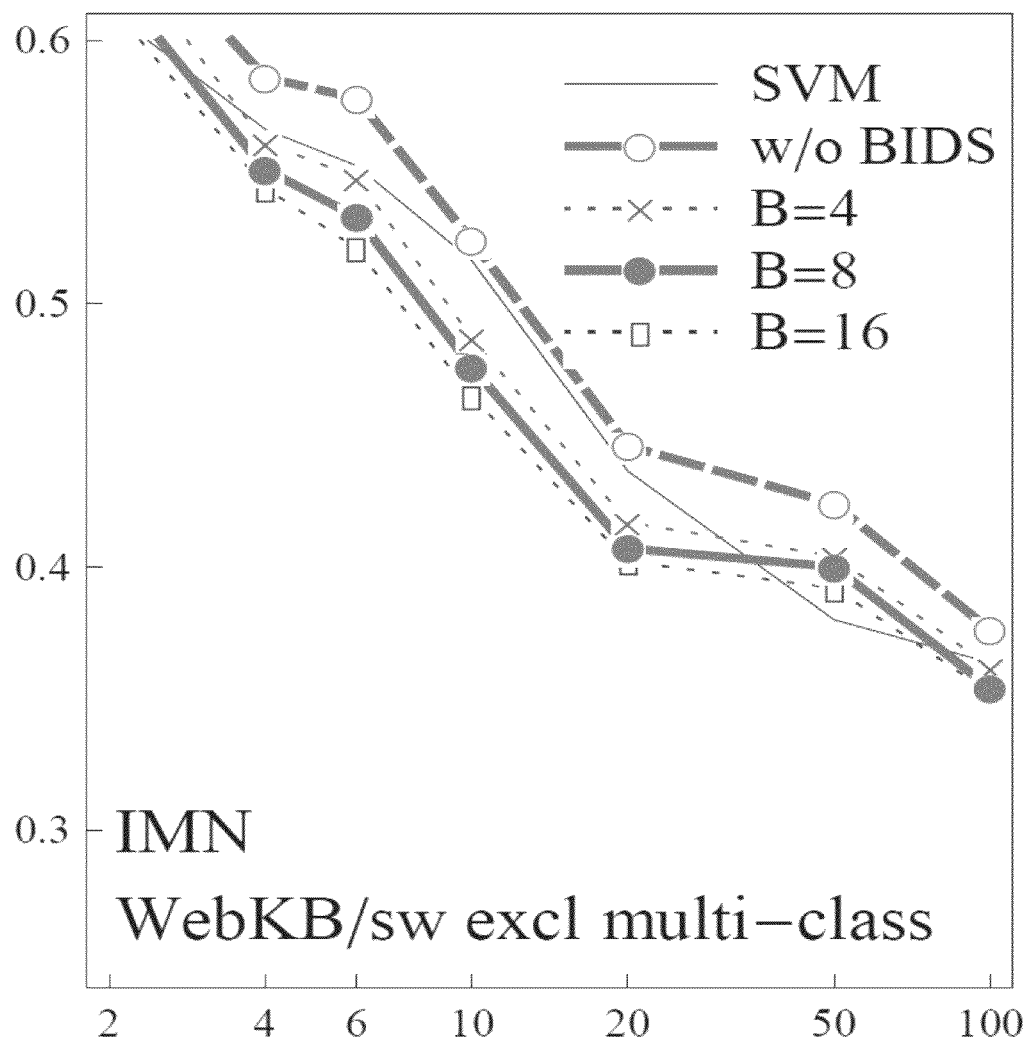
Figure 39:
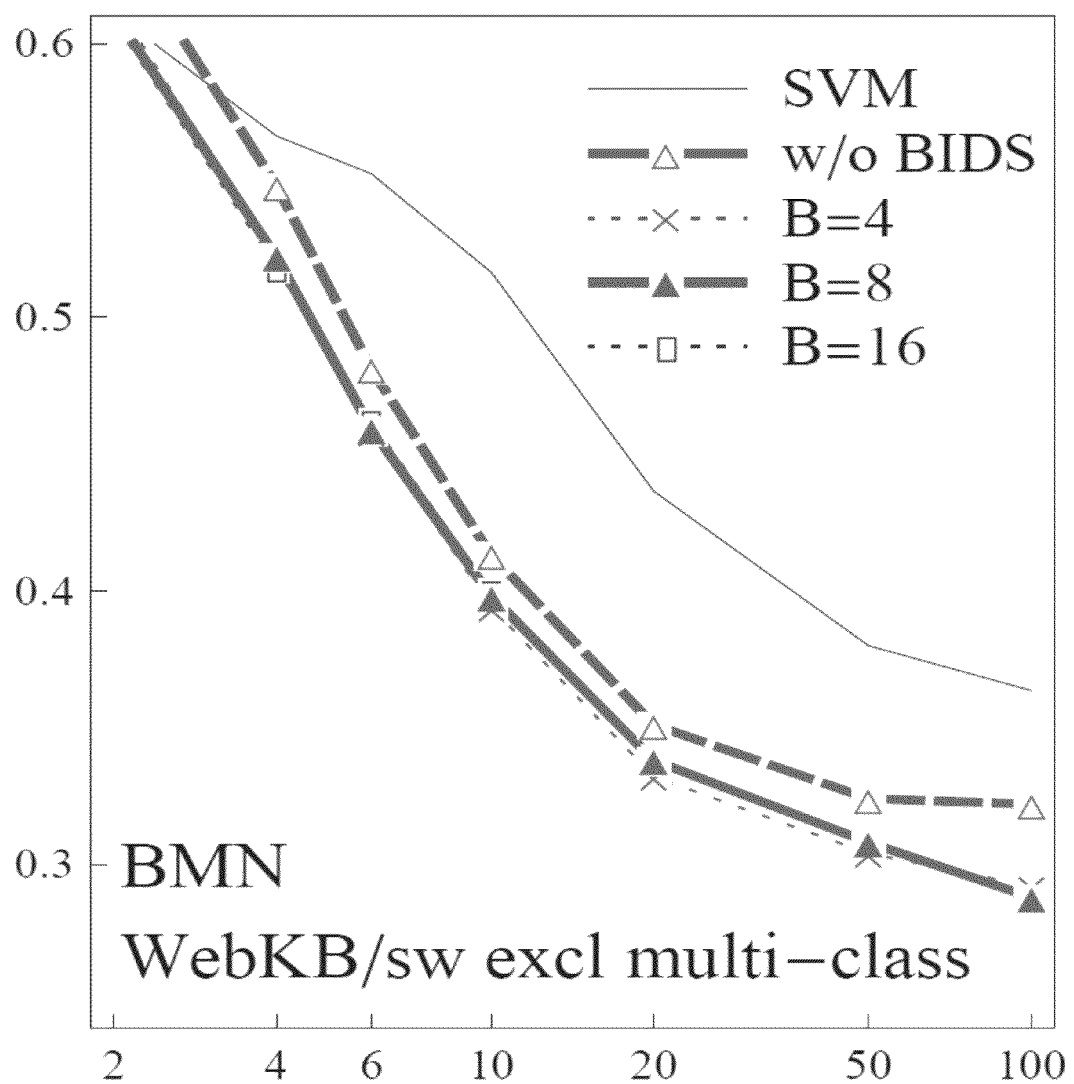
Figure 40:
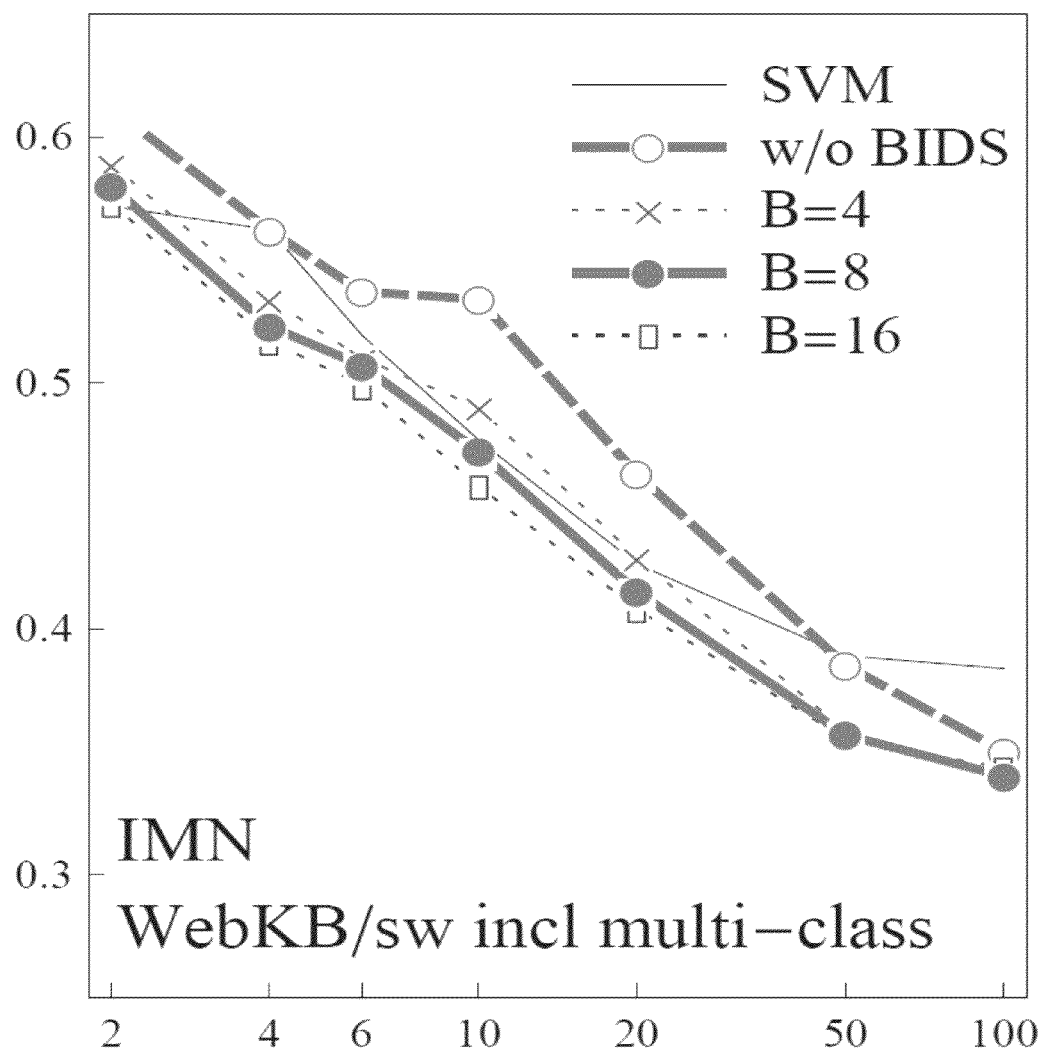
Figure 41:
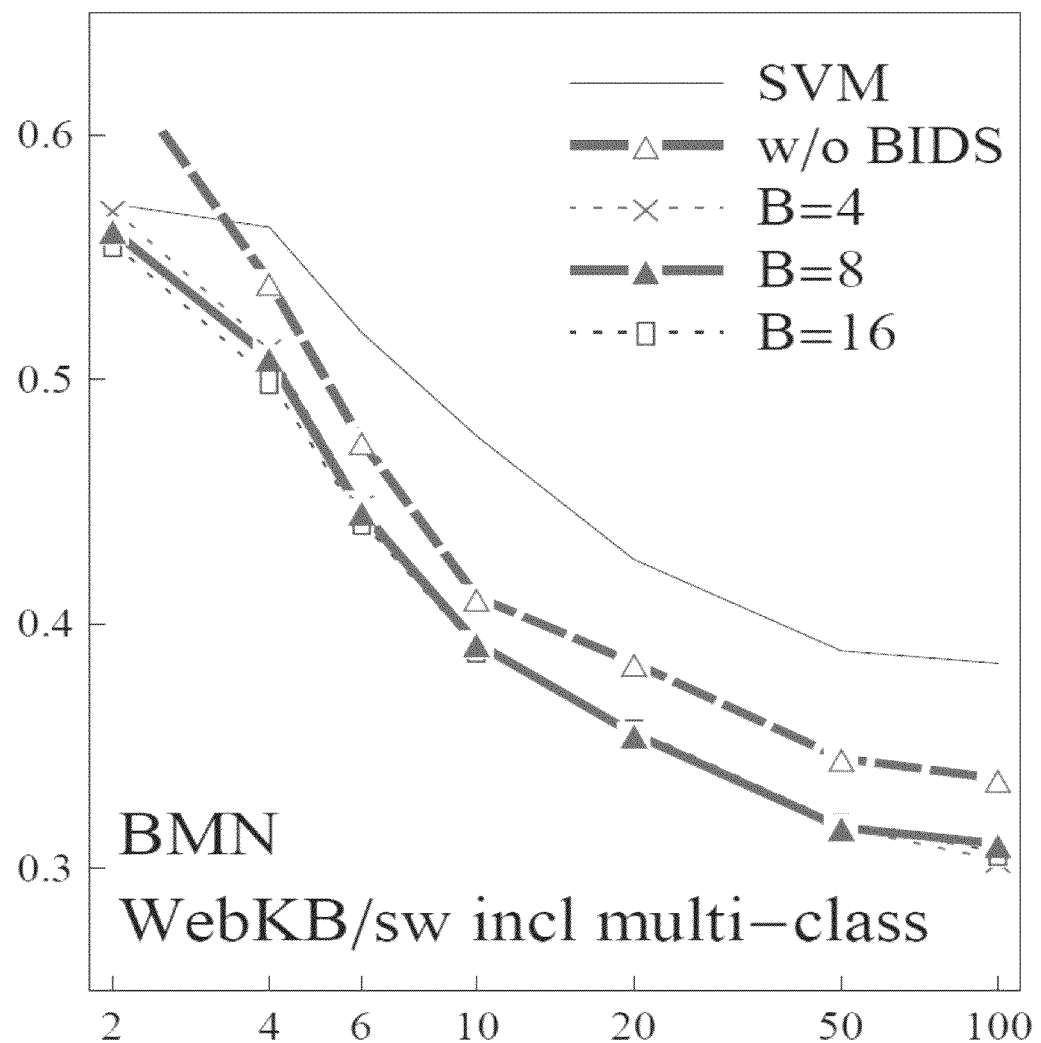

FIGS. 36 through 41 depict three multi-class problems. FIGS. 36 and 37 depict the results for binary problems for a 20Newsgroups data set. FIGS. 38 through 41 depict the results for binary problems chosen from the WebKB data set with stopwords (abbreviated "sw") included and excluded.

Figure 44:
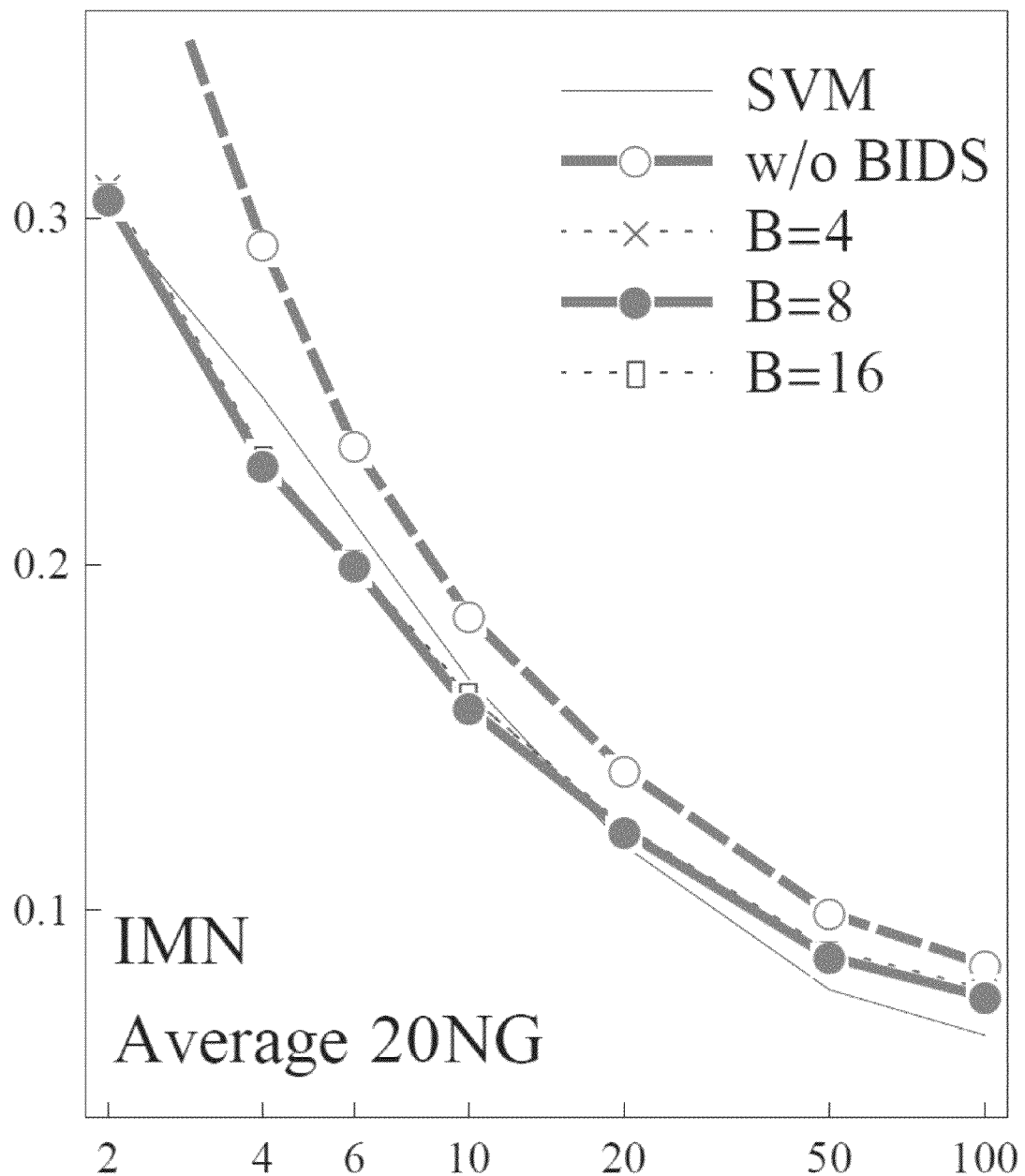
FIGS. 44 through 49 show a number of charts depicting the error rate average over all binary problems in the data sets of FIGS. 4 through 45, according to another example of the principles described herein.
Figure 45:
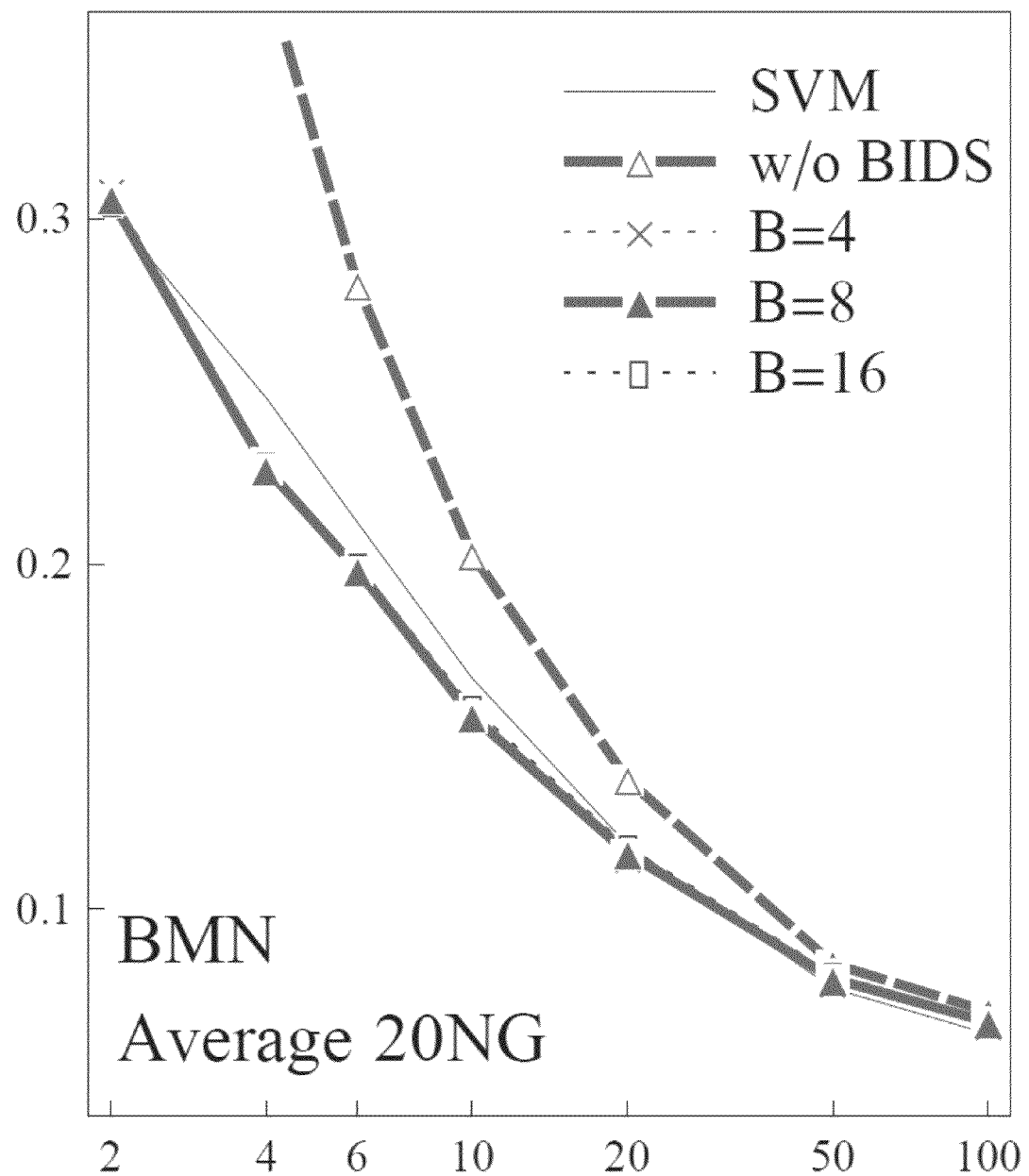
Figure 46:
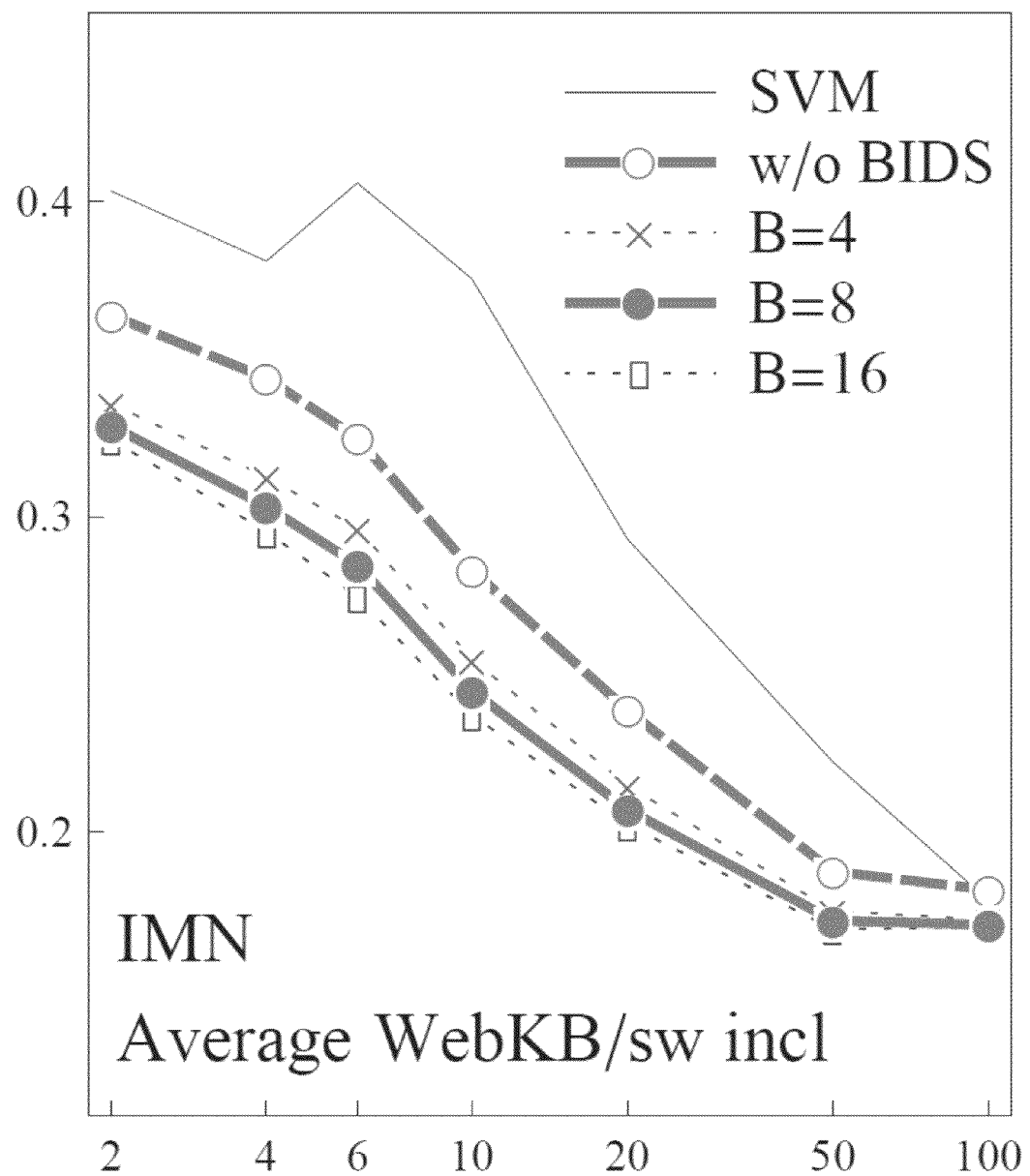
Figure 47:
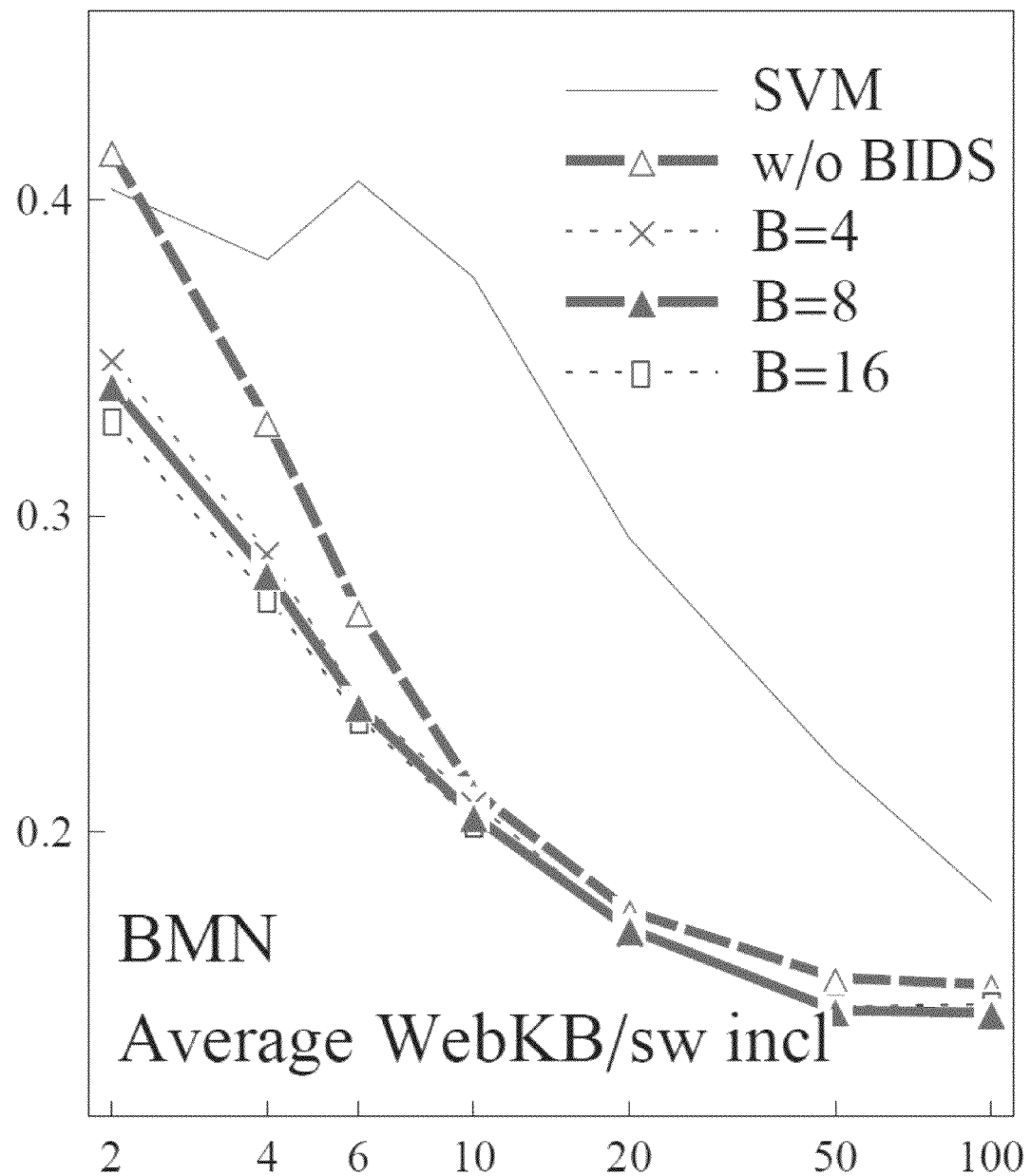
Figure 48:
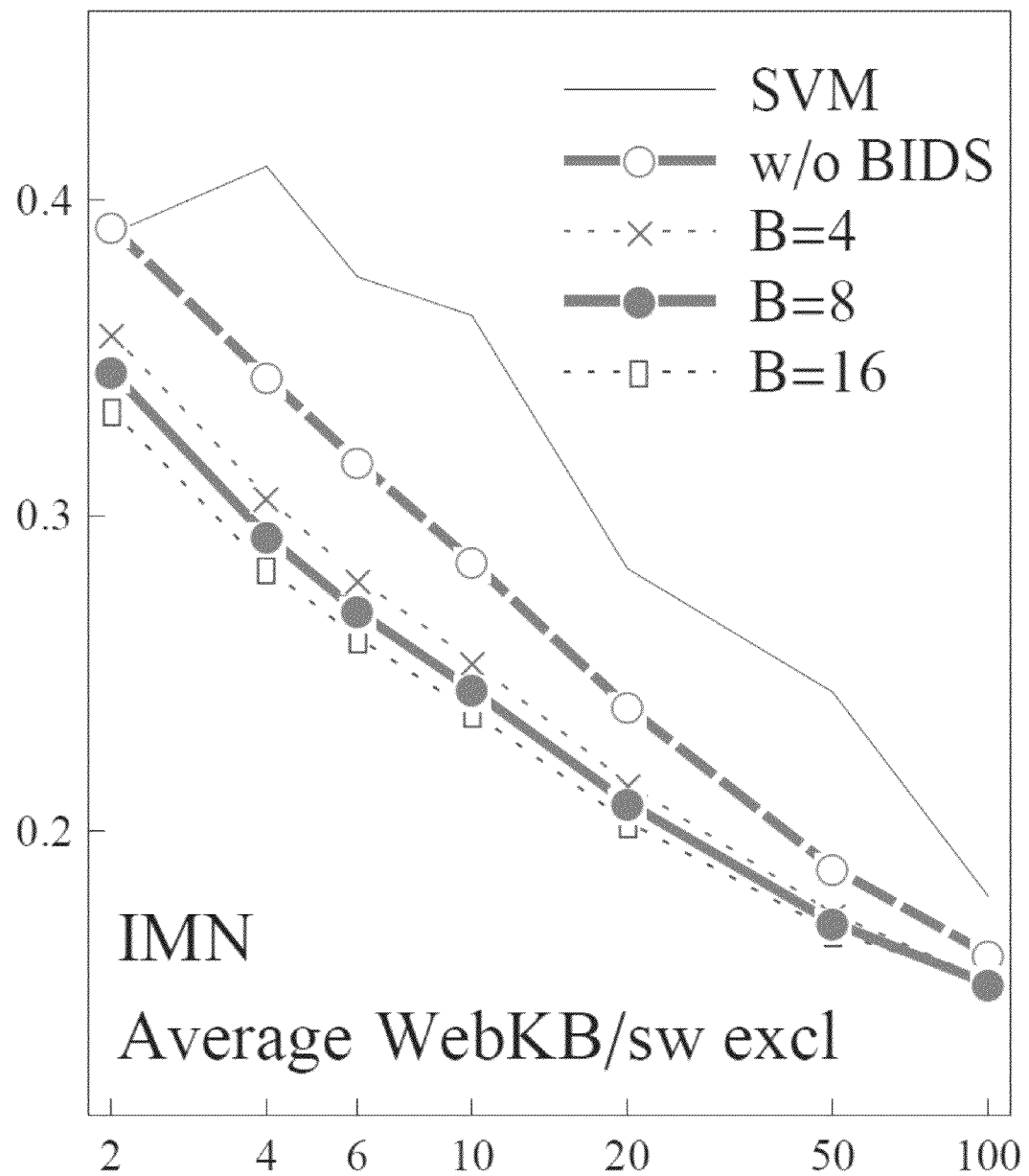
Figure 49:
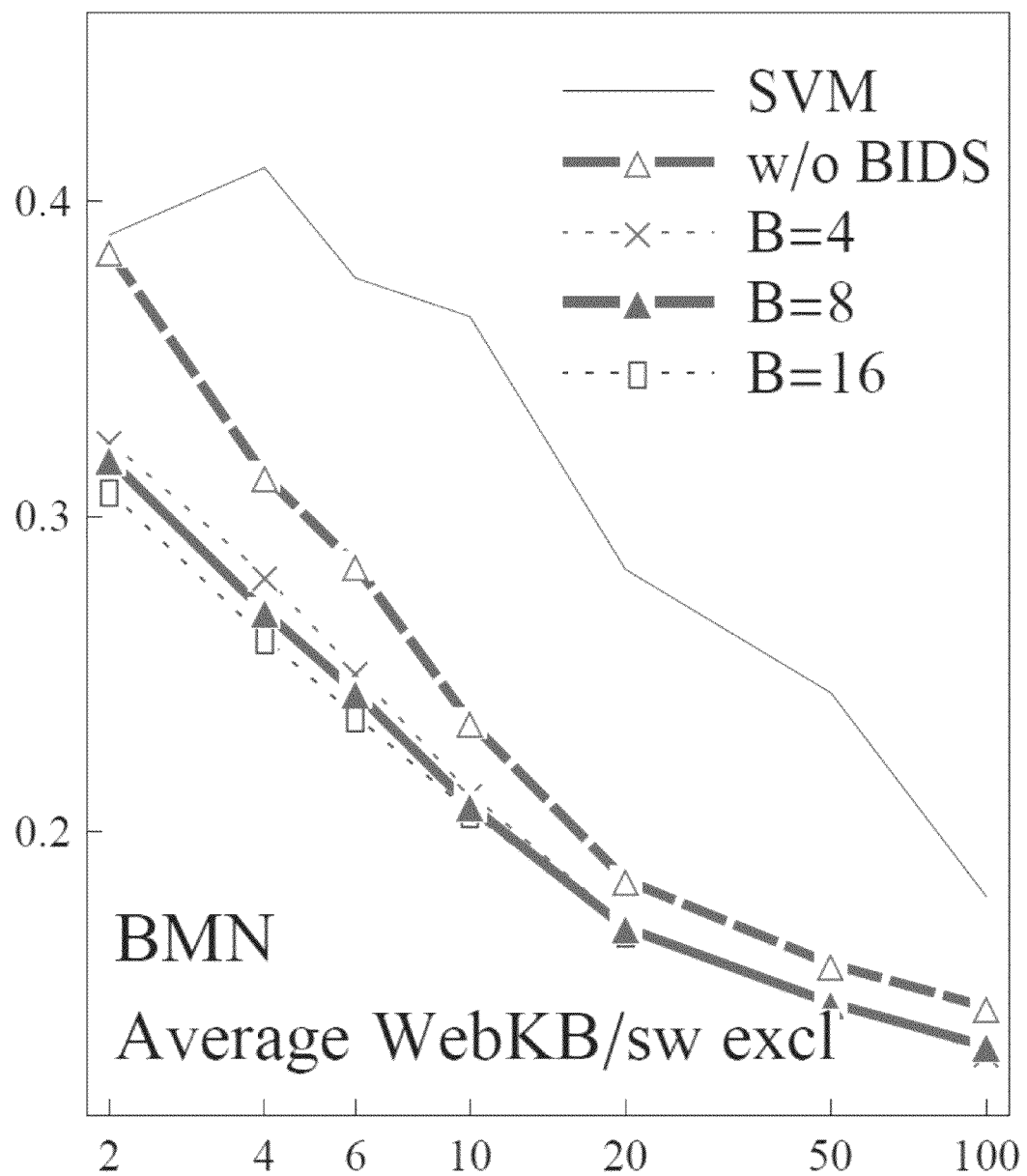

FIGS. 44 through 49 show a number of charts depicting the error rate averaged over all binary problems in the data sets of FIGS. 4 through 45, according to another example of the principles described herein. The graphs depicted in FIGS. 44 through 49 follow the same general conventions as described above for FIGS. 4 through 43. FIGS. 44 and 45 specifically depict the average error rate over all binary problems in the 20Newsgroups data set. FIGS. 46 and 47 specifically depict the average rate over all binary problems in the WebKB data set with stopwords included. Similarly, FIGS. 48 and 49 specifically depict the average rate over all binary problems in the WebKB data set with stopwords excluded.

The results of the experiments demonstrate that BIDS achieves consistent and significant improvements for both IMN and BMN. Improvements may be dramatic when data is very scarce. First, some statistics from the individual graphs shown earlier are gathered. Below, Table 2 depicts the percentage improvements in accuracy using BIDS for the INB and MNB classifiers, for 20Newsgroups and WebKB, and for both binary and multiclass classification. Furthermore, Table 2 also shows the results for the WebKB dataset both with and without stopword removal.

TABLE 2

Improvement in accuracy after using BIDS as percentage for IMN and BMN event models.

| IMN # | 20Newsgroups | | WebKB stopwords incl | | WebKB stopwords excl | |
|---|---|---|---|---|---|---|
| | binary | mult-cls | binary | mult-cls | binary | mult-cls |
| 2 | 20.0 | 14.0 | 5.2 | 10.0 | 9.6 | 11.0 |
| 4 | 9.5 | 11.0 | 7.5 | 10.0 | 9.5 | 10.0 |
| 6 | 5.0 | 10.0 | 7.5 | 8.2 | 8.4 | 14.0 |
| 10 | 3.5 | 7.9 | 6.4 | 16.0 | 6.7 | 12.0 |
| 20 | 2.6 | 5.9 | 4.8 | 10.0 | 4.8 | 7.9 |
| 50 | 1.8 | 3.8 | 2.2 | 4.9 | 2.7 | 5.6 |
| 100 | 1.5 | 2.0 | 1.6 | 1.5 | 1.3 | 3.8 |

TABLE 2-continued

Improvement in accuracy after using BIDS as
percentage for IMN and BMN event models.

| BMN # | 20Newsgroups | | WebKB stopwords incl | | WebKB stopwords excl | |
|---|---|---|---|---|---|---|
| | binary | mult-cls | binary | mult-cls | binary | mult-cls |
| 2 | 71.0 | 46.0 | 15.0 | 20.0 | 12.0 | 9.2 |
| 4 | 24.0 | 25.0 | 8.7 | 8.7 | 7.9 | 6.6 |
| 6 | 12.0 | 18.0 | 4.7 | 6.3 | 7.1 | 4.4 |
| 10 | 6.2 | 11.0 | 1.3 | 3.6 | 4.1 | 3.2 |
| 20 | 2.8 | 5.7 | 1.0 | 4.7 | 2.4 | 2.9 |
| 50 | 0.7 | 1.8 | 1.5 | 4.3 | 1.9 | 3.0 |
| 100 | 0.5 | 1.4 | 1.3 | 5.0 | 2.0 | 5.0 |

Region with very scarce training data (<20 training samples) is shaded.
Improvements in accuracy greater than 10% are shown in bold.

To follow are observations made from FIGS. 4-49, and Table 2. Findings may be categorized as follows: (1) BIDS results in consistent improvement in accuracy for all classification experiments, both in individual problems (with the few exceptions detailed shortly), and on the average; (2) BIDS yields larger improvements for smaller training sample sizes. In particular, for the case of very small training samples (≤20) which are common in enterprise applications, BIDS gives substantial improvements to accuracy; (3) Improvements can be dramatic when training samples are less than 5. For example, for 2 samples per class, the improvement to BMN is 71% for binary, and 46% for multiclass. Note that this is sometimes the mode for enterprise class problems; (4) Both IMN and BMN classifiers benefit from BIDS. The sample sizes and the type of problem (binary or multiclass) where each benefits the most depends on the dataset.

As to the few cases where BIDS did not yield improvement in accuracy the following was observed: (1) In only two problems out of the 38 studied did BIDS have a region of lower accuracy than the baselines without BIDS. Both these binary problems for the BMN model: WebKB "Course vs. Project" and "Faculty vs. Project"; (2) Of these two problems only "Course vs. Project" had a significant decrease in accuracy. The decrease in the case of "Faculty vs. Project" was nominal.

Among the 38 classification benchmarks used, in 36 (94.7%) a definite advantage to using BIDS is demonstrated. Even in the remaining two cases, only in one case was accuracy actually lost to a significant degree; in the region of >10 training samples. Therefore, using BIDS is almost always beneficial. The chances of causing any damage by using BIDS are far outweighed by the chance of doing significant good by using BIDS. From the above, it may be concludes that there appears to be no reason to forego using BIDS when training data is scarce.

The SVM may be used as a benchmark for classification accuracy. As to how Naïve Bayes with BIDS compares with the SVM, the following was observed: (1) Of the 32 binary problems experimented with the SVM was more accurate than the baseline Naïve Bayes without BIDS in 20 of them. Of these 20, on 15, the use of BIDS pushed Naïve Bayes above SVM in accuracy for a majority of the scarce training data regime of interest. That yields a 75% rate of success in beating SVM when using BIDS in the scarce training data regime; (2) Of the 6 multiclass problems tested, in four the SVM was better than the Naïve Bayes baseline. Of these, in two, Naïve Bayes with BIDS beat SVM, while in the remaining two, both of which are from 20Newsgroups, it bridges some of the gap.

Based on the above, out of the 24 binary and multiclass problems where Naïve Bayes lagged behind SVM, the use of BIDS allowed it to outperform SVM in 17, yielding a 70.8% success rate.

The present systems and methods also provide, inter alia, a comparison of classifiers at low training data. Some observations in this regard will now be discussed. Several studies have been performed that demonstrate the effectiveness of SVMs for text classification. However, none of these studies are done at the low training data regime in which the present systems and methods operate. Some studies compare SVMs against multinomial models, but the results are heavily dependent on the feature selection. The present systems and methods do not use feature selection. Furthermore, the metrics used in other studies are different from the present disclosure and more suited to information retrieval.

SVM may be an effective classifier on the average for 20Newsgroups, but for WebKB, both IMN and BMN are more accurate. Given that on 20Newsgroups, the use of BIDS allows both IMN and BMN to beat SVM in a majority of the problems, it would appear that the best choice of classifier, overall, for low training data should be Naïve Bayes with BIDS. This should count as a surprising conclusion given how poorly Naïve Bayes has performed on tests with more data, and an important one given how often the scarce training data regime occurs in applications.

Previous studies claim that the multinomial model offers higher accuracy than the multi-variate Bernoulli model since the former takes into account the frequency of occurrence of words, while the latter only accounts for their presence or absence. However, it may be shown that word frequency harms accuracy, presumably due to the large posterior log-odds ratios occurring due to burstiness of terms. Neither types of studies consider the low training data regime. The present disclosure suggests that taking into account word frequency does lead to slightly lower accuracies, especially at the higher end of the 2-100 training samples scale.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (102) of the machine learning classifying device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product.

The specification and figures describe generation of training documents for training a classifying device. The method may comprise, with a processor, sampling from a distribution of words in a number of original documents, and creating a number of pseudo-documents from the distribution of words, the pseudo-documents comprising a similar distribution of words as the original documents. The systems and methods of generating training documents may have a number of advantages. First, BIDS makes no assumptions about the model: it is truly non-parametric. This is in contrast with semi-supervised learning, where some assumptions about the underlying model must be made to match unlabelled data to it. Second, BIDS is conceptually simple and extremely easy to implement. The present implementation took 85 lines in PERL programming language. Although PERL is described here as being the program language used to write the present implementation, any other programming language may be used. Third, BIDS is fast. Specifically, BIDS adds $O(\Sigma_{D \in T}|D|)$ time to training the classifier, and nothing to testing or running the trained classifier. Other advantages are described herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of generating training documents for training a classifying device comprising, with at least one processor:
sampling from a distribution of words in a number of original documents; and
creating a number of pseudo-documents from the distribution of words, the pseudo-documents comprising a same distribution of words as the original documents, wherein creating the number of pseudo-documents comprises creating a pseudo-document of the number of pseudo-documents based on a combined distribution of words from at least two original documents.

2. The method of claim 1, further comprising determining the distribution of words by determining a frequency of occurrence of individual words, phrases, or a combination of individual words and phrases within the original documents.

3. The method of claim 1, further comprising training the classifying device to classify textual documents based on the pseudo-documents.

4. The method of claim 1, further comprising training the classifying device to classify textual documents based on the original documents, the pseudo-documents, or a combination of the original documents and the pseudo-documents.

5. The method of claim 3, further comprising classifying, using the trained classifying device, the textual documents.

6. A non-transitory computer readable storage medium storing instructions that upon execution cause a system to:
sample from a distribution of words in a number of original documents; and
create a number of pseudo-documents from the distribution of words, the pseudo-documents comprising a same distribution of words as the original documents, wherein creating the number of pseudo-documents comprises creating at least 10 pseudo-documents per original document.

7. The non-transitory computer readable storage medium of claim 6, wherein the instructions upon execution cause the system to further determine the distribution of words by determining a frequency of occurrence of individual words, phrases, or a combination of individual words and phrases in the original documents.

8. The non-transitory computer readable storage medium of claim 6, wherein the instructions upon execution cause the system to train a classifying device to classify textual documents based on the original documents, the pseudo-documents, or a combination of the original documents and the pseudo-documents.

9. A device comprising:
at least one processor; and
a memory communicatively coupled to the at least one processor, the memory comprising:
a sampling module to, when executed by the at least one processor, determine a distribution of words in a number of original documents;
a pseudo-document creation module to, when executed by the at least one processor, create a number of pseudo-documents from the distribution of words, the pseudo-documents comprising a similar distribution of words as the original documents, wherein the creating of the number of pseudo-documents comprises creating a pseudo-document of the number of pseudo-documents based on a combined distribution of words from at least two original documents.

10. The device of claim 9, wherein the at least one processor is to further store the original documents and the pseudo-documents in the memory.

11. The device of claim 9, further comprising:
a training module to, when executed by the at least one processor, train the device to classify textual documents based on the pseudo-documents.

12. The device of claim 9, wherein the distribution of words includes a frequency of occurrence of individual words, phrases, or a combination of individual words and phrases within the original documents.

13. The device of claim 11, further comprising:
a classification module to, when executed by the at least one processor, classify a number of test documents.

14. The device of claim 13, wherein the classification module classifies the test documents based on the training provided by the training module.

15. The non-transitory computer readable storage medium of claim 6, wherein the instructions upon execution cause the system to further train a classifying device to classify textual documents based on the pseudo-documents; and classify a number of test documents.

* * * * *